US011292594B2

(12) United States Patent
Valente et al.

(10) Patent No.: US 11,292,594 B2
(45) Date of Patent: Apr. 5, 2022

(54) SYSTEM OF PLAY PLATFORM FOR MULTI-MISSION APPLICATION SPANNING ANY ONE OR COMBINATION OF DOMAINS OR ENVIRONMENTS

(71) Applicant: Airgility, Inc., College Park, MD (US)

(72) Inventors: Evandro Gurgel do Amaral Valente, Sykesville, MD (US); Eduardo Gurgel do Amaral Valente, Adelphi, MD (US); Tanner Ray Miller, Mount Gretna, PA (US); Bryan Phillip Jensen, Silver Spring, MD (US)

(73) Assignee: Airgility, Inc., Reston, VA (US)

( * ) Notice: Subject to any disclaimer, the term of this patent is extended or adjusted under 35 U.S.C. 154(b) by 0 days.

(21) Appl. No.: 16/840,361

(22) Filed: Apr. 4, 2020

(65) Prior Publication Data

US 2020/0398982 A1 Dec. 24, 2020

Related U.S. Application Data

(63) Continuation of application No. 16/520,261, filed on Jul. 23, 2019, now Pat. No. 10,618,648.

(Continued)

(51) Int. Cl.
*G01C 23/00* (2006.01)
*G05D 1/00* (2006.01)
(Continued)

(52) U.S. Cl.
CPC ........ *B64C 29/0033* (2013.01); *B64C 39/024* (2013.01); *G05D 1/0858* (2013.01); *B64C 2201/126* (2013.01)

(58) Field of Classification Search
CPC .............. B64C 29/0033; B64C 39/024; B64C 2201/126; G05D 1/0858
See application file for complete search history.

(56) References Cited

U.S. PATENT DOCUMENTS 1,981,700 A 11/1934 Hoffman
1,981,701 A 11/1934 Hoffman
(Continued)

FOREIGN PATENT DOCUMENTS

GB 2446589 A 8/2008
WO 2014/081082 A1 5/2014

OTHER PUBLICATIONS

PCT International Search Report (PCT/US 19/43046), dated Oct. 17, 2019 (2 pages).

(Continued)

*Primary Examiner* — Harry Y Oh
(74) *Attorney, Agent, or Firm* — Darrin A. Auito; HEA Law PLLC

(57) ABSTRACT

A vehicle is described having an aerodynamically contoured lifting body comprising a plurality of cooperating body modules, wherein at least two of the modules are displaceably secured to each other. The modules include a thrust vectoring module operatively coupled to a propulsive mechanism. The thrust vectoring module is dynamically controlled to affect positioning and actuation of the propulsive mechanism to attain a desired positioning of the vehicle and at least one of a plurality of modes of operation thereof. The thrust vectoring module includes a nacelle module carrying the propulsive mechanism thereon and rotatably displaceable about one or more axes extending from the lifting body. The propulsive mechanism is positioned externally, internally, or in combinations thereof of the nacelle module and is tiltably displaceable about one or more axes of the nacelle module.

27 Claims, 34 Drawing Sheets

Related U.S. Application Data

(60) Provisional application No. 62/702,151, filed on Jul. 23, 2018.

(51) Int. Cl.

| | | |
|---|---|---|
| *G05D 3/00* | (2006.01) | |
| *G06F 7/00* | (2006.01) | |
| *G06F 17/00* | (2019.01) | |
| *B64C 29/00* | (2006.01) | |
| *B64C 39/02* | (2006.01) | |
| *G05D 1/08* | (2006.01) | |

(56) References Cited

U.S. PATENT DOCUMENTS

| | | | |
|---|---|---|---|
| 2,062,148 A | 11/1936 | Snyder | |
| 2,108,093 A | 2/1938 | Zimmerman | |
| 2,430,820 A | 11/1947 | Lightfoot | |
| 2,438,309 A | 3/1948 | Zimmerman | |
| 2,481,379 A | 9/1949 | Zimmerman | |
| 2,926,869 A | 3/1960 | Sullivan | |
| 2,989,269 A | 6/1961 | Le Bel | |
| 4,676,545 A | 6/1987 | Bonfilio | |
| 5,799,900 A | 9/1998 | McDonnell | |
| 7,520,466 B2 | 4/2009 | Bostan | |
| 8,167,234 B1 | 5/2012 | Moore | |
| 8,646,720 B2 | 2/2014 | Shaw | |
| 9,550,577 B1* | 1/2017 | Beckman | B64C 27/08 |
| 2004/0256519 A1 | 12/2004 | Ellis et al. | |
| 2009/0008499 A1 | 1/2009 | Shaw | |
| 2010/0006695 A1 | 1/2010 | Aguilar | |
| 2011/0315806 A1* | 12/2011 | Piasecki | B64C 39/00 244/2 |
| 2012/0119016 A1 | 5/2012 | Shaw | |
| 2013/0006448 A1* | 1/2013 | Callou | A63H 27/12 701/5 |
| 2013/0175390 A1* | 7/2013 | Woodworth | B64C 1/30 244/54 |
| 2013/0307274 A1* | 11/2013 | Sia | F03D 9/008 290/55 |
| 2014/0231593 A1* | 8/2014 | Karem | B64C 1/065 244/45 R |
| 2014/0350748 A1* | 11/2014 | Fisher | B64D 47/08 701/2 |
| 2015/0298799 A1* | 10/2015 | Bertrand | B64C 27/20 701/23 |
| 2016/0189549 A1 | 6/2016 | Marcus | |
| 2016/0272314 A1* | 9/2016 | Radu | B60K 6/20 |
| 2016/0311529 A1* | 10/2016 | Brotherton-Ratcliffe | B64D 35/06 |
| 2017/0072755 A1 | 3/2017 | Zhou | |
| 2017/0158320 A1* | 6/2017 | Bosch | B64C 27/52 |
| 2017/0193707 A1* | 7/2017 | Seiler | B64D 31/06 |
| 2017/0197709 A1* | 7/2017 | Fink | B64C 1/26 |
| 2017/0355453 A1* | 12/2017 | Kim | B64D 31/06 |
| 2017/0374276 A1* | 12/2017 | Veeramani | G06F 3/017 |
| 2018/0155021 A1 | 6/2018 | Patterson | |
| 2018/0244367 A1* | 8/2018 | Kiesewetter | B64C 27/20 |
| 2018/0281941 A1* | 10/2018 | Hutson | B64C 29/0033 |
| 2018/0362146 A1 | 12/2018 | Klein | |
| 2018/0370640 A1* | 12/2018 | Toyama | B64D 25/00 |
| 2019/0009876 A1* | 1/2019 | Toyama | B64B 1/30 |
| 2019/0031331 A1* | 1/2019 | McCullough | B64D 27/24 |
| 2019/0047695 A1 | 2/2019 | Boudville | |
| 2019/0127063 A1 | 5/2019 | Gozluklu | |
| 2019/0130889 A1* | 5/2019 | Matus, Jr | G10K 11/178 |
| 2019/0369641 A1* | 12/2019 | Gillett | G05D 1/0088 |
| 2020/0047906 A1* | 2/2020 | Keennon | B64C 39/028 |
| 2020/0148348 A1* | 5/2020 | Bradley | G05D 1/0094 |
| 2020/0262550 A1* | 8/2020 | Dailey | B64D 17/72 |
| 2020/0317332 A1* | 10/2020 | Didey | B64C 29/0033 |

OTHER PUBLICATIONS

PCT Written Opinion of the International Searching Authority (PCT/US 19/43046), dated Oct. 17, 2019 (9 pages).

\* cited by examiner

RIDE HEIGHT MANIPULATION

SET VARIABLE LEAN ANGLES, DUAL SIDE

COMBINED LEAN ANGLE WITH CONTACT POINT LIFT-OFF, DUAL SIDE

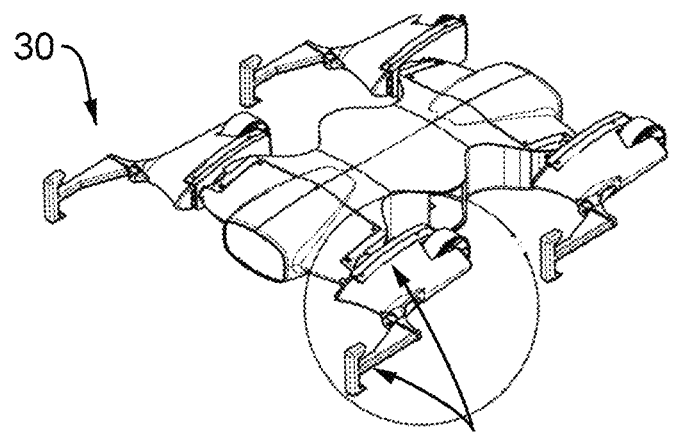
FIG. 11A
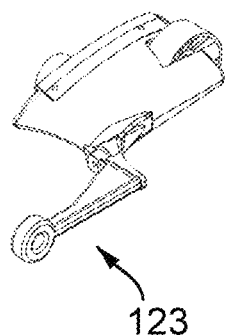 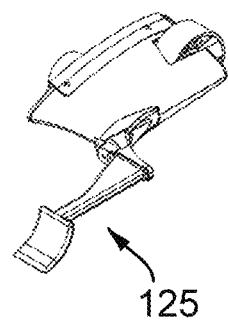 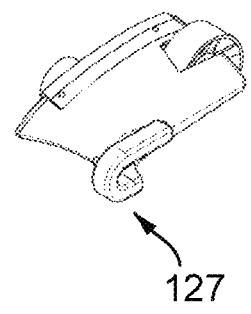
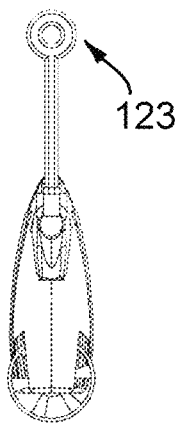 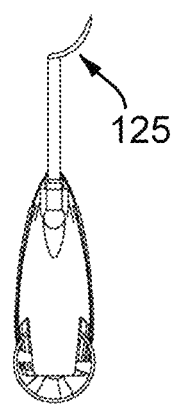 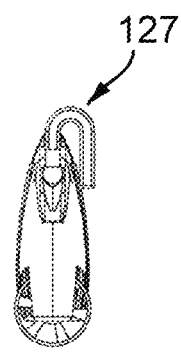
FIG. 11B     FIG. 11C     FIG. 11D

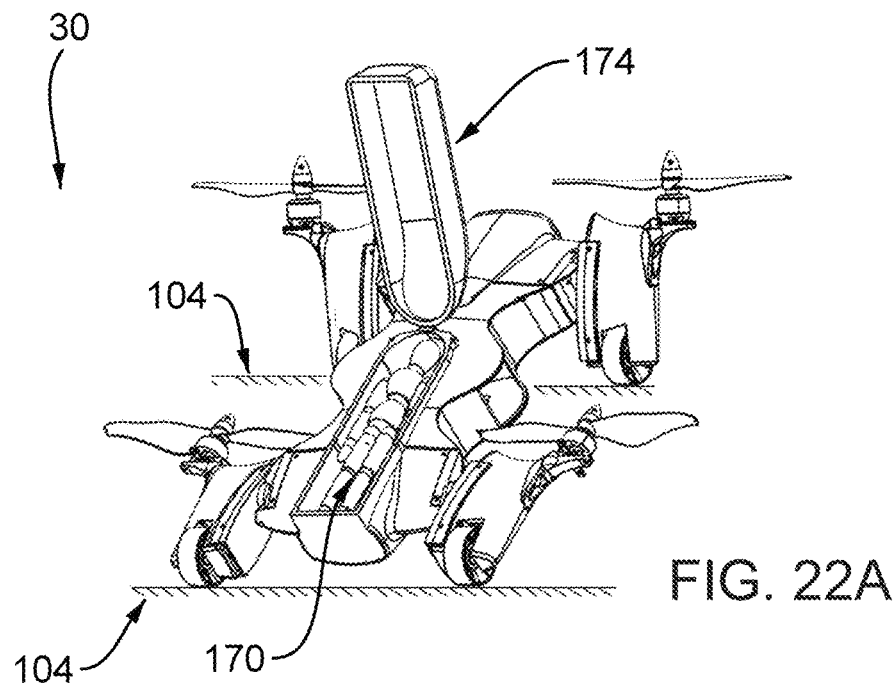
FIG. 22A
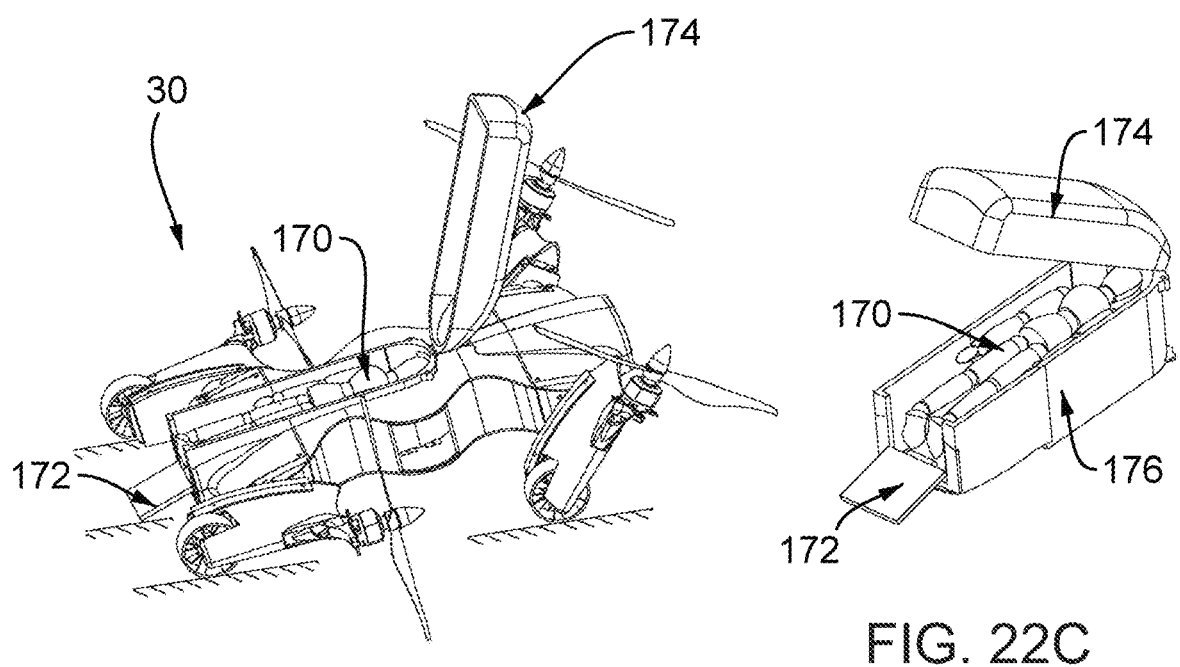
FIG. 22B
FIG. 22C

SYSTEM OF PLAY PLATFORM FOR MULTI-MISSION APPLICATION SPANNING ANY ONE OR COMBINATION OF DOMAINS OR ENVIRONMENTS

CROSS-REFERENCE TO RELATED APPLICATIONS

This application claims priority to and is a continuation of pending U.S. application Ser. No. 16/520,261 filed on Jul. 23, 2019, which claims benefit to provisional 62/702,151, filed Jul. 23, 2018. The contents of the above documents are incorporated herein by reference in entirety.

FIELD OF THE INVENTION

The present disclosure relates to a wide range of industries enabled by unmanned and manned vehicles dynamically adaptable for travel in aerial, terrestrial, subterranean, indoor, enclosed, irregular, blended, and marine domains, having any constant or dynamic environmental conditions, in a wide range of autonomous or semi-autonomous control regimes implemented either on-board, off-board, or in cooperative fashion.

The present disclosure also relates to a system scalability and modularity capability that creates a system of play whereby manufacturing flexibility, customer need adaptation, and multi-market adoption is achievable.

The present disclosure also relates to a vehicle with improved stability and safety of operation in aerial, terrestrial, subterranean, indoor, enclosed, irregular, blended, and marine domains, having any constant or dynamic environmental conditions, provided with a plurality of dynamically controlled mechanisms for real-time control either of pitch, roll, yaw moments, or combinations thereof by dynamically manipulating (passively and/or actively) the vehicles' characteristics which may include either of center of thrust, moment arm of center of thrust related to the center of gravity, thrust orientation, aerodynamic center of the vehicle, center of airflow pressure, and the vehicle's center of gravity, or any combinations thereof.

In addition, the present disclosure relates to a universal vehicle system designed with mostly or entirely a lifting body which is composed of a plurality of interconnected modules which are configured to form an aerodynamically viable contour of a lift generating body (lifting body), and including a central module, a plurality of modules, and a plurality of thrust vectoring modules displaceably connected to any other existing module(s) and operatively coupled to respective propulsive mechanisms (devices). The plurality of thrust vectoring modules are dynamically displaced (in tilting and/or translating fashion) to direct and actuate the propulsive mechanism(s) as needed for safe and stable operation in various modes of operation and transitioning therebetween in aerial, terrestrial, subterranean, indoor, enclosed, irregular, blended, and marine domains, having any constant or dynamic environmental conditions.

According to one aspect, the present disclosure relates to a universal vehicle for uncompromised aerial, terrestrial, subterranean, indoor, enclosed, irregular, marine, or combinatorial modes of operation with safe or risk calculated transitioning therebetween. The universal vehicle includes a mostly lift generating body, a mostly structural body, or both composed of a plurality of cooperating modules, each configured to form the blended body, having an aerodynamically/hydrodynamically viable contour, a structurally vehicle contour, or both.

The present disclosure also relates to a universal vehicle designed with propulsive capability of changing acceleration, of holding zero acceleration, of increasing acceleration, or of decreasing acceleration (deceleration) in either two-dimensional or three-dimensional space, with or without blended propulsion capability for one or more environments or domains in combinations thereof. Further, the scope of this invention includes acceleration that is linear, angular, or combined/coupled.

In addition, the present disclosure relates to unmanned or manned vehicles, and particularly, to vehicles which mostly use lifting body aerodynamics or hydrodynamics for achieving a desired regime of operation while attaining a seamless safe transition between the vertical, lateral, and horizontal flight modes of operation with or without the assistance of a plurality of inertial measurement unit, compass, magnetometer, guidance and navigation supporting sensors, path planning supporting sensors, state estimator, controller, command and control architecture, operator/pilot, low level algorithm, low level algorithm supporting sensors, higher level algorithm, higher level algorithm supporting sensors, artificial intelligence, onboard cooperative computing, off-board cooperative computing, transponder, collision avoidance, in combinations thereof; without or without assistance from a one or more cooperative external positioning system, internal positioning system, global positioning system, or combinations thereof; heretofore the previously listed plurality of components is generally included, but not limited to, as existing components of the guidance and navigation system of the vehicle.

The present disclosure also relates to leveraging a morphological variability whereby one, two, or three-dimensional operability merge stationary attitude, translational, and rotational/angular dynamics such that when activated by the guidance and navigation system, the vehicle can hold any selected or commanded body angle of attack relative to the horizon as observed from any perspective, ranging from negative, zero, and positive angles, in any combination of vertical, lateral, and horizontal operating modes.

The present disclosure also relates to leveraging a morphological variability whereby two dimensional operability merge stationary attitude, translational, and rotational/angular dynamics such that, when activated by the guidance and navigation system, the vehicle can hold any selected or commanded body angle of attack relative to the horizon as observed from any perspective, ranging from negative, zero, and positive angles, in any combination of vertical, lateral, and horizontal operating modes.

The present disclosure also relates to leveraging a morphological variability whereby either in three dimensions or two dimensional operability merge stationary, translational, and rotational/angular dynamics such that, when activated by the guidance and navigation system, the vehicle propels itself, by generating its own forces, manipulating external forces, leveraging gravity, or in any combinations thereof, to either accelerate or decelerate in any combination of translational or angular locomotion.

The present disclosure also relates to a universal vehicle having aerodynamic and/or vectored propulsion qualities permitting the vehicle to perform with short runways (or no runway whatsoever), high vehicle density, and high throughput.

BACKGROUND

Aerial vehicles capable of vertical and horizontal flight are commonly categorized as VTOL (Vertical Take-off and Landing), STOL (Short Take-off and Landing), STOVL (Short Take-off and Vertical Landing), VTOSL (Vertical Take-off and Short Landing) or V/STOL (Vertical and/or Short Take-off and Landing) platforms. These aerial vehicles usually are not capable of using aerodynamic lift forces during transition between the take-off and landing flight regimes. Further, these designs are inherently focused on balancing the tradeoffs between either hovering and forward flight; therefore, attributes and functionalities enabling multi-domain and multi-environment operability are seldom considered as part of the built-in design intention. On the contrary, it is more likely that past helicopter-like and airplane-like hybrids diminished the operational breadth of their invention as far as multi-domain and multi-environmental applicability.

U.S. Pat. Nos. 005823468A, 2011001020A1, 20130105635A1, W.O. Pat. No. 2018071970A1, and U.S. Pat. No. 20160114887A1 describe air vehicles with varying forms of thrust-vectoring. However, they do not capture the system-wide hybridization of multi-axis enabled locomotion with multi-directional tilt-actuation and aerodynamic lift generation. Additionally, they are deficient in sub-system modularity, multi-domain applicability, and multi-environment operability.

VTOL aircrafts are sometimes designed with tilt wings, tilt rotors, or include multirotor-like propulsion installed ad hoc to a fixed-wing aircraft. However, these vehicles have shortfalls derived from compromising aerodynamic based flight (the airplane mode of flight) and powered lift (the helicopter mode of flight). On one hand, the requirements for an efficient aerodynamic lift typically come from large effective lift producing surface areas as well as forward speed. On the other hand, in the hovering flight mode of operation, where the vehicle's ground speed is zero, the entire lift generation results from the powered lift system. Vehicles that use wing-like structures require a large operating footprint while those directly leveraging rotors for powered lift have limited forward flight speed and limited payload capacity.

The scope of the present disclosure combines best-of attributes such that not only a diverse operational capacity that is scalable and modular is achieved, but also diversity in mission applicability, in environment and domain applicability, and in market fit.

The overall fusion of a mostly lift generating body via aerodynamic/hydrodynamic effects or structural frame body with thrust vectoring allows for significant sub-system consolidation and modularity, and provides a wide operational range that is highly attractive to end-users in numerous industries, including but not limited to, the Unmanned Autonomous System Industry, Urban Mobility Industry, Defense Industry, and Manned Aviation Industry.

SUMMARY OF THE INVENTION

One object of the present invention is to provide a multi-domain advanced aviation vehicle with an enhanced operating envelope by introducing effective V/STOL capability of uncompromised and balanced operation in and safe transitioning between the airplane and the helicopter modes of operation with optional or pre-installed additional modes of operation, in combinations thereof, for terrestrial, subterranean, indoor, enclosed, irregular, blended, and marine domains, having any constant or dynamic environmental conditions. As such, it is within the scope of this invention, pertinent to the 'system of play' theme, that some embodiments may divert from the airborne domain entirely and only operate in the other subsequent combination of domains listed above.

According to one embodiment, one or more lifting body modules may be removably and displaceably connected each to the other to form modular lifting body. The cooperating modules of the lifting body include at least one thrust vectoring module and at least one propulsive mechanism operatively coupled to the thrust vectoring module. The thrust vectoring module is configured to be dynamically controlled to affect the positioning and actuation of the propulsive mechanism, thus attaining the dynamic (substantially in real-time) control of the positioning and mode of operation of the vehicle, as well as transitioning between the modes of operation thereof.

According to one embodiment, at least one (or more) thrust vectoring module(s) may include a tilting nacelle module carrying the propulsive mechanism thereon and rotatively displaceable about an axis extending from the optionally lift generating main body and/or its cooperative modules.

Another object of the present invention is to provide an aerial vehicle capable of short take-off, short landing, vertical take-off, and/or vertical landing, that is compact, easy to manufacture, capable of both sustained vertical and horizontal flight, of hovering, efficiently and safely transitioning in any sequence between vertical and horizontal flight regimes, launchable from either stationary and/or moving platform, and that is indifferent to launching/landing zone surface qualities and/or terrain types utilized during take-off and/or landing.

Another object of the present invention is to provide an aerial vehicle capable of V/STOL which is based on merging the lifting body concept with thrust vectoring while solving the tilt wing and tilt rotor deficiencies during the flight mode transition, accomplished substantially in at least the following manners: (a) by harvesting the benefits of the lifting body to create lift at high angles of attack and achieving favorable stall performance, while maximizing lift area to provide useful lift for the vehicle, and (b) by alleviating the requirements for the propulsion system due to the available lift of the lifting body during transition, even at high angles. As a result, the subject system is designed to achieve sustained vertical flight and safe transition with either smaller propeller systems or large diameter blade systems.

Another object of the present invention is to enhance the vehicle's flight envelope such that it can hold any selected or commanded body angle of attack relative to the horizon as observed from any perspective, ranging from negative, zero, and positive angles. As a result, the present invention is its own pan and tilt system such that independent gimbaled actuators are mostly redundant or obsolete. Further, the broad range of angle of attack manipulation allows the vehicle to escape traditional definition of front or rear, left or right, and top or bottom.

Another object of the present invention is to achieve lift generation of the subject vehicle during flight regimes transition which results in less power consumption/draw of the propulsion system, thus benefiting the vehicle range, flight envelope, overall performance, vehicle weight, permissible mission types, on-board electronics, and/or propulsion system.

Another object of the present invention is to achieve a substantial degree of physical module hybridization of the vehicle's mostly lift generating body, mostly structural body, or blended body with one or more generic modules some of whom share specialized functionality with the propulsive vectoring apparatus, that may itself additionally serve as a component of the landing mechanism/apparatus, while also introducing actuation for ride height variability or kneeling capability. Thus, attitude of the vehicle relative to the surface or terrain, while the vehicle is stationary, translating, rotating, or in combinations thereof is variable. The aggregate result of the physical module hybridization is a system of play or interconnectivity of one or more cooperating modules.

Further to the cooperative nature of the propulsive vectoring apparatus, tiling actuation, and landing apparatus, it is another object of the present invention to offer various additional modes of two-dimensional (non-airborne) locomotion. These embodiments may, for example but not limited to, displace themselves forward, backward, turn, climb, and rotate in place by means of actuating or rotating the one or more propulsive modules while optionally providing a net vectored propulsive force from the installed propulsion system.

In an alternate operation, if the vectored or non-vectored net propulsive force includes one or more wheel-based drives, these embodiments support mostly tank-like steering and maneuvering. If, alternatively, only tilt actuation of the one or more propulsive vectoring apparatus is utilized (e.g. without momentum exchange with the surrounding fluid for propulsive purposes whereas air is also considered a fluid), this embodied system may, for example but not limited to, crawl, walk, jump, skip, slide, grip or float.

According to one embodiment, the physical cooperating modules may be designed with light weight cooperating body surfaces and/or structures, such as but not limited to, utilizing materials used in additive manufacturing, which define an internal volume therebetween when displaceably connected one to another. The vehicle body may include a central module, a plurality of other cooperating modules and a plurality of propulsive nacelle modules that may be either affixed rigidly or non-rigidly. The propulsive nacelle modules may be displaceably (e.g. rotatively or translationally) disposed at each side of the central or cooperating modules for symmetric or asymmetric actuation of the propulsive mechanism in a controlled direction.

According to one embodiment, the internal volume may be designed to compartmentalize, in combinations thereof, for example, a plurality of sub-systems, including but not limited to, avionic system, sensing system, weapon system, guidance and navigation system, cooperative computing board system, communication system, power system, energy storage system, payload system, propulsion system, fuel cell system, landing gear system, docking system, tether system, flight assist system, collision avoidance system, deceleration system, flight termination system, ballast system, buoyancy system, mechanical actuation system, electronic systems, and passive systems.

According to one embodiment, at least one motor may be positioned in the internal compartment defined in any of the lifting or structural body modules. For example, the motor may be located within the nacelle module, and be operatively coupled to the propulsive mechanism.

According to one embodiment, the propulsive mechanism may be dynamically controlled to operate in counter rotation regime relative to another propulsive mechanism, for generating the airflows over the mostly lift generating body or structural body modules having opposing vorticity flow fields.

According to one embodiment, the modes of operation affected by the one or more thrust vectoring modules may include short take-off, short landing, conventional take-off, conventional landing, externally assisted take-off, externally assisted landing, and their combinations. The one or more thrust vectoring modules are also configured to control lateral positioning, longitudinal positioning, or vertical positioning of the vehicle, in combinations thereof, by controlling the roll moment, pitch moment, yaw moment and their combinations.

According to one embodiment, the thrust vectoring modules are configured to rotate in clockwise direction and in counterclockwise direction, with the propulsive mechanisms of each thrust vectoring module configured to rotate in any direction. The propulsive mechanism of the thrust vectoring module may operate as a pusher, a tractor, or in combinations thereof.

Another embodiment is a method of operating an universal vehicle travel in aerial, terrestrial, subterranean, indoor, enclosed, irregular, blended, and marine domains, having any constant or dynamic environmental conditions, in various modes of operation and safe or risk calculated transitioning therebetween.

According to one embodiment, the subject method may comprise the following steps:

configuring a mostly lift generating body, structural body, or blended body with one or more cooperating modules with or without a contoured shape to create a substantially aerodynamically contoured lifting body, configuring one or more physical cooperating modules with external compartmentalization, external components, internal compartmentalization, or combinations thereof, configuring selectively one or more physical cooperating modules with thrust vectoring capability, forming a thrust vectoring module, operatively coupled with at least one propulsive device, and controlling the thrust vectoring module to affect positioning and actuation of the one or more propulsive devices to dynamically control mode of operation of the vehicle, and the transitioning between the modes of operation.

According to another embodiment, the subject method may further comprises the step of operating the vehicle in either of vertical flight, forward flight, on-station flight, loitering flight, hovering flight, and combinations thereof, whereby the vehicle s angle of attack relative to the horizon, as observed from one or more perspectives, is commanded, preselected, hard-installed, dynamically selectable, or combinations thereof.

According to another embodiment, the subject method may further comprise the step of operating the vehicle in either of vertical flight, forward flight, on-station flight, loitering flight, hovering flight, and combinations thereof, whereby the one or more thrust vectoring modules angle of attack relative to the horizon, as observed from one or more perspectives, is commanded, preselected, hard-installed, dynamically selectable, or combinations thereof.

According to another embodiment, the subject method may further comprise the step of operating the vehicle in either of vertical flight, forward flight, on-station flight, loitering flight, hovering flight, and combinations thereof, whereby the relative one or more angles created by the vehicle and its one or more cooperating modules one, as observed from one or more perspectives, is commanded, preselected, hard-installed, dynamically selectable, or combinations thereof.

According to another embodiment, the subject method may further comprise the step of operating the vehicle in either of vertical take-off, vertical landing, non-zero velocity take-off, non-zero velocity landing, and combinations thereof, whereby the vehicle's angle of attack relative to the horizon, as observed from one or more perspectives, is commanded, preselected, hard-installed, dynamically selectable, or combinations thereof.

According to another embodiment, the subject method may further include the step of operating the vehicle in either of vertical take-off, vertical landing, non-zero velocity take-off, non-zero velocity landing, and combinations thereof, whereby the one or more thrust vectoring modules' angle of attack relative to the horizon, as observed from one or more perspectives, is commanded, preselected, hard-installed, dynamically selectable, or combinations thereof.

According to another embodiment, the subject method may further comprise the step of operating the vehicle in either of vertical take-off, vertical landing, non-zero velocity take-off, non-zero velocity landing, and combinations thereof, whereby the relative one or more angles created by the vehicle and its one or more cooperating modules one, as observed from one or more perspectives, is commanded, preselected, hard-installed, dynamically selectable, or combinations thereof.

According to another embodiment, the subject method may further comprise the steps of coupling one or more propulsive devices to the one or more thrust vectoring modules for propelling the vehicle in flight, propelling the vehicle on terrain, propelling the vehicle on a fluid medium, propelling the vehicle in a fluid medium, and combinations thereof; coupling a one or more programming algorithm, logic, data structure, or combinations thereof, and path-planning the vehicle in flight, on terrain, on a fluid medium, in a fluid medium, and combinations thereof; coupling a one or more guidance and navigation system to the vehicle, and navigating the vehicle in flight, on terrain, on a fluid medium, in a fluid medium, and combinations thereof; coupling a one or more guidance and navigation system to the vehicle, and controlling the vehicle in flight, on terrain, on a fluid medium, in a fluid medium, and combinations thereof; coupling a one or more guidance and navigation system to the vehicle, and stabilizing the vehicle in flight, on terrain, on a fluid medium, in a fluid medium, and combinations thereof, or combinations thereof.

According to another embodiment, the method further comprises: configuring the one or more thrust vectoring module as a multi-function actuated thrust module, configuring the lifting body with at least one multi-function lift generating body module, at least one multi-function body module, installing at least one component internally or externally, at least one of the multi-function thrust module, wherein the at least one component selected from component includes a component selected from a group including: payload, weaponization, counter measures system, communication system, ballast system, sensing system, suspension system, braking system, dampening system, airbag, parachute, deceleration apparatus, drive apparatus, steering apparatus, vibration apparatus, landing gear apparatus, charging apparatus, discharging apparatus, electromagnet device, flight assisting device, locomotion assisting device, maneuvering assisting device, docking apparatus with or without electrical connectivity to the respective docking base, tether, anchoring device, gripping device, grappling device, clawing device, floating device, retrieving device, and capturing device, guidance and navigation system, and combinations thereof.

According to another embodiment, the method further comprises: operating the vehicle in a loss mitigation mode of operation to diminish damages to the vehicle's modules. The loss mitigation mode of operation is triggered by a mechanism selected from a group including: pilot triggered, autonomous pilot triggered, observer triggered, sensor triggered, deceleration triggered, acceleration triggered, radar triggered, transponder triggered, traffic controller triggered, impact triggered, relative location triggered, artificial intelligence triggered, and combinations thereof.

According to another embodiment, the method further comprises: operating the vehicle in a flight termination mode triggered by a mechanism selected from a group including: pilot triggered, autonomous pilot triggered, observer triggered, sensor triggered, deceleration triggered, acceleration triggered, radar triggered, transponder triggered, traffic controller triggered, impact triggered, relative location triggered, artificial intelligence triggered, and combinations thereof.

According to another embodiment, the method further comprises the step of: applying proofing treatments to one or more body modules, one or more lift generating body module, one or more propulsive modules, one or more structural modules, or combinations thereof. The proofing treatment may be selected from a group including: bullet proofing, fragmentation proofing, explosive proofing, heat proofing, fire proofing, detection proofing, sound proofing, sand proofing, electro-magnetic proofing, conductivity proofing, solar proofing, light proofing, water proofing, humidity proofing, radiation proofing, or combinations thereof.

According to another embodiment, the method further comprises the step of: making obsolete the deployment of traditional gimballed actuation, substantially utilized as a component of a sensing apparatus, manipulation apparatus, or both, or making redundant the deployment of traditional gimballed actuation, substantially utilized as a component of a sensing apparatus, manipulation apparatus.

According to another embodiment, the subject method further comprises: controlling stability of the vehicle by manipulation of the vehicle's center of gravity along the lateral axis, the longitudinal axis, or the lateral and the longitudinal axis via translation, and/or rotation, and/or vibration of internal and/or external masses.

In the methods described above, the one or more physical cooperating modules fabrication, specifically when utilizing preparation techniques stemming from additive manufacturing, may contain internally imprinted patterning, externally imprinted patterning, or print-through imprinted patterning, substantially inherent to the additive manufacturing design and fabrication processes, such that algorithms, including but not limited to, that are sensing-based, vision-based, tensorflow based, artificial intelligence based, or in combinatorial fashion, may identify the presence of one or more other vehicles while identifying friend from foe, vehicle role, vehicle authenticity, vehicle configuration, vehicle status, vehicle distress, vehicle communication, vehicle authority, or combinations thereof. Such imprinted patterning may be further aided by illumination techniques as to allow daytime or nighttime recognition of such collection of patterning. Similarly, imprinted patterns installed in the environment may convey attributes or unique identification markings as to aid the vehicle in the course of its mission.

In the methods described above, the one or more propulsive devices are selected from a group including, but not limited to, propellers, turbines, thrusters, fans, and rockets, capable of accelerating in a gas or a fluid medium, combustion, glow, electric, thermoelectric, self-contained, fuel cell based, hybrid, pump or geared propulsive mechanisms, and are installed internally, externally, combinations thereof, and are rigidly affixed, actuated, or combinations thereof, to control the vehicle translation, rotation, roll moment, pitch moment, yaw moment, and combinations thereof.

In the methods described above, the one or more guidance and navigation system are selected from a group including, but not limited to, inertial measurement unit, compass, magnetometer, guidance and navigation supporting sensors, path planning supporting sensors, state estimator, controller, command and control architecture, operator/pilot, low level algorithm, low level algorithm supporting sensors, higher level algorithm, higher level algorithm supporting sensors, artificial intelligence, onboard cooperative computing, off-board cooperative computing, transponder, collision avoidance, in any combinations thereof; without or without assistance from a one or more cooperative external positioning system, internal positioning system, global positioning system, or combinations thereof.

These and other objects and advantages of design and method described in the present disclosure will be apparent from the further detailed description and drawings contained in this application.

BRIEF DESCRIPTION OF THE DRAWINGS

The following drawings illustrate examples of various components of embodiments of the invention disclosed herein and are for illustrative purposes only. Embodiments of the present invention are illustrated by way of example and not limitation in the figures of the accompanying drawings, and in which:

FIGS. 11A-11D illustrate embodiments showing multi-functionality of modular thrust vectoring modules in a combinatorial fashion, while converting the embodiment of the subject vehicle to non-aerial applications, e.g., suitable for multi-terrain applicability utilizing drive type mechanisms and extension mechanisms, shown with first module (FIG. 11A), second module (FIG. 11B), third module (FIG. 11C) and fourth module (FIG. 11D);

FIG. 22A illustrates one embodiment of a vehicle system adapted for carrying items, e.g., people or animals, additionally supported by tilt actuated thrust vectoring modules for load/unload ease, FIG. 22B and working in cooperation with a quick loading apparatus, FIG. 22C;

DETAILED DESCRIPTION

In the present vehicle design, the effectiveness and versatility of the vehicle, in deriving a modular-enabled system of play 30, results at least from the combined integration of the vehicle's sub-systems and their cross functionality. The concept underlying the design and operation of the subject system is not limited to the use of sub-systems with exclusively dedicated functions, but rather capable of multiple functional systems. For example, some of the disclosed embodiments combine thrust vectoring modules with landing gear and/or a payload compartment, the vehicle body module functions for both assisting lift generation and avionics/payload compartmentalization, the thrust vectoring modules function for directing locomotive effort for in both aerial and non-aerial modes of operation while additionally functioning as a landing apparatus, and so on.

The aircraft of the present disclosure, especially used as an Unmanned Aerial System (UAS), can be used to meet various end-user needs such as, but not limited to, security monitoring, crisis mitigation, disaster relief, scientific sensing, sensory platform for research and development of other sub-systems, transportation, payload delivery, communication, search and rescue, and many other missions.

The following descriptions present embodiments of the subject system with an uninhabited aircraft system detailed as an example. However, the present invention can also be applied to an inhabited (manned) aircraft/vehicle. The figures are not necessarily shown to scale and some features may be shown larger or smaller than they are with respect to other features in order to facilitate their explanation.

Figure 1A:
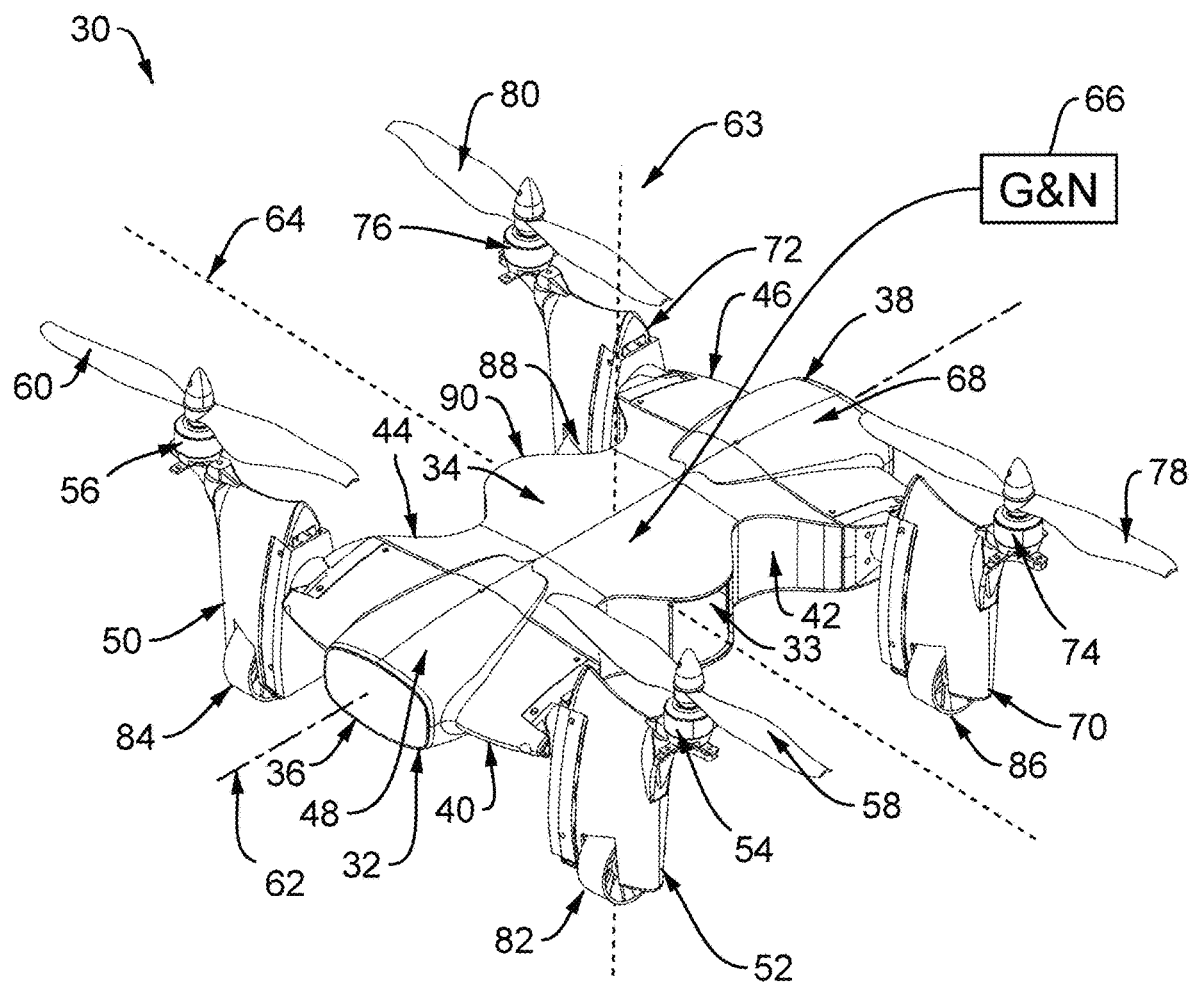
FIG. 1A illustrates a perspective view of one embodiment of a vehicle system where thrust vectoring modules are resting in a deployment-ready position.

One example of a system of play base-model 30 is illustrated in FIG. 1A. The system 30 is shown in a state having a fully fixed configuration (e.g. where all physical body modules are non-displaceable relative to one another and assembled in accordance to the subject design during manufacturing, however; modularized by design). The system of play base-model 30 is further comprised by re-configurations, re-orientations and/or actuation regimes of a variety of one or more supporting systems further allowing new mission applicability, scalability, and/or product-market fit as further discussed herein.

While, as an example only, a particular style in propulsive device is described herein, the propulsive apparatus contemplated in the subject system may further include propellers, turbines, fans, or other momentum exchanging devices, either in multiples or pairings or as a single unit, with any blade count as applicable, with or without counter rotation, centered or offset, of any diameter and/or physical attributes and/or dimensions, body and/or pod and/or module and/or tip-mounted, fixed-mounted and/or allowed to actuate, mounted in series and/or in parallel, mounted symmetrically or asymmetrically, and/or configured as a tractor and/or a pusher.

Further, the propulsive devices may be capable of deployment, stowage, folding, pitch/roll/yaw control, thrust control, and so on.

While, as an example only, a particular style in auxiliary locomotive device is described herein, the auxiliary locomotive device contemplated in the subject system may further include tracks, flanged wheel, tracking wheels, rollers, skids, threads, feet, pads, spring enabled device, energy enable device, and so on.

While, as an example only, a particular contoured body shape with cooperating modules creates a partially or substantially lift generating vehicle is described herein, the physical body modules may alternately be comprised of structural components having minimal to no aerodynamic/hydrodynamic value, or be comprised of blended structural and lift generating modules as to create a trade-off driven approach to manufacturability, affordability, accessibility, transportability, scalability, adaptability, modularity, mission migration needs or in combinations thereof.

For all figures below, while capturing certain aspects of orientational, translational, and rotational changes that enable various maneuvers, the system 30 retains stability and controllability along and about all vehicle 32 axes at all times.

FIG. 1A illustrates an isometric view of one embodiment of the system 30. In this embodiment, the vehicle 32 comprises a lifting body module 34, which includes a front body section (module) 36 and a rear body section (module) 38 which are preferably contoured in a manner to create a substantially aerodynamic/hydrodynamic shape that connects the forward edge/surface 40 to the lateral edges/surfaces, left 42 and right 44 respectively, leading to the rearward edge/surface 46. The contouring 90, provides aerodynamic properties, hydrodynamic properties, structural support/rigidity, or in combinations thereof, and can be applied to form simple and/or complex curvature as observed from one or more perspectives, with or without orthogonal relationship(s). The contouring 90 may additionally be configured to generate component fairing, opening, mounting, provide cooling features, enable propulsive flow around the body, unblock flow around the body, unblock sensory view around the body, etc.

The lifting body module 34 may be designed with a plurality of substantially lifting body modules, minimally lifting structural body modules, or blended lifting and structural body modules. The front body section 36 and the rear body section 38 may be displaceably connected generally in cooperation with the lifting body module 34. A plurality of other body modules may be created by any sectioning planes or sectioning curvatures in any orientation and location of the lifting body module 34 whereby their independent and aggregate functionality is generally user-defined. Further, a plurality of other body modules may be attached or removed whereby their independent and aggregate functionality is generally user-defined along with the desired number of accessibility port(s) 33.

The system 30 includes one or more right forward propulsive apparatus 50 and one or more left forward propulsive apparatus 52 and may or not include one or more forward positioned section/module 48. The system 30 further includes one or more left motor(s) 54 and one or more right motor(s) 58 driving their respective propulsive device: left propeller 58 and right propeller 60. While herein the forward propulsion system is shown externally, at least one motor may be positioned in the internal compartment defined in any of the lifting body modules. For example, the motor(s) may be located (entirely or partially) inside the propulsive apparatus and operatively coupled to the propulsive mechanism.

The system 30 includes one or more left forward propulsive apparatus 52 having one or more motors 54 driving one or more propulsive device(s), as shown, propeller 58 and one or more right forward propulsive apparatus 50 having one or more motors 56 driving one or more propulsive device, as shown, propeller 60 while optionally including one or more forward positioned body section/module 36. While herein the forward propulsion system is shown externally, one or more motor(s) may be positioned in an internal compartment defined in any of the lifting body modules. For example, the motor may be located (entirely or partially) inside the propulsive apparatus and operatively coupled to the propulsive mechanism.

The system 30 includes one or more left rearward propulsive apparatus 70 having one or more motors 74 driving one or more propulsive device(s), as shown, propeller 78 and one or more right rearward propulsive apparatus 72 having one or more motors 76 driving one or more propulsive device, as shown, propeller 80 while optionally including one or more rearward positioned body section/module 38. While herein the rearward propulsion system is shown externally, one or more motor(s) may be positioned in the internal compartment defined in any of the lifting body modules. For example, the motor may be located within the propulsive apparatus, and be operatively coupled to the propulsive mechanism.

The system 30 may also include auxiliary locomotive enabling devices 82, 84, 88, 86 equipped onto the one or more cooperating propulsive apparatus. For example, attached to the left front, right front, left rear, and right rear propulsive apparatus, 50, 52, 70, and 72 respectively are left front, right front, left rear, and right rear auxiliary locomotive enabling devices, 82, 84, 88, and 86 respectively.

It is further defined that when any one or more equipped propulsive apparatus is additionally equipped/driven with one or more tilt actuation mechanism(s), a mechanical drive system that allows tilting displacement about one or more axis creating one or more degrees of freedom, it then forms a thrust vectoring module, as referred to hereon. Further, the aggregate locomotive effect of the collection of the present propulsive apparatus, the collection of the present thrust vectoring module(s), or the collection of the plurality of present propulsive apparatus and thrust vectoring modules, is defined as the net locomotive system", as referred to hereon. It is further defined that the terms "locomotion and locomotive generally relates to the spatial changes typically derived from the change in translational, rotational, angular, mostly steady, mostly stabilized, or in combinations thereof effects, typically generated by the system 30, having impact of the system's 30 quasi-stationary, hovering, and non-stationary dynamics/behavior, as referred to in earlier sections and hereon.

According to this embodiment, the system 30 has a substantially lift generating shape, e.g., contouring 90, with reference to a central horizontal axis 62 extending along a horizontal direction (e.g. which is typical flight direction that substantially enables lift generation over the lifting body module 34). Central horizontal axis 62 is hereinafter referred to as the standard chord line or a centerline. All other nonstandard chord lines (also termed as chord line) run parallel to the horizontal direction, but do not imply vehicle symmetry. Further embodiments within the scope of this invention are not required to have a standard chord line. As such, the standard chord line 62 or any other chord line hereinafter defines a longitudinal axis if the system 30 has a generally defined forward or reverse locomotion along that reference axis.

Span line 64 extends perpendicular to the standard chord line 62 including any other existing chord lines, and generally runs along the narrower span of the vehicle (which may further generally support a lesser lift generating contribution to flight). The span line 64 generally does not carry any implication of symmetry on the aircraft. As such, the span line 64 hereinafter defines the lateral axis if the system 30 has a left or right locomotion along that axis.

However, the definition of mostly longitudinally aligned and mostly laterally aligned locomotion is further contextually driven by the operating agent(s) and additionally defined within the guidance and navigation system 66 along with its settings/coding generally comprising a plurality of inertial measurement unit, compass, magnetometer, altitude sensor, guidance and navigation supporting sensors, path planning supporting sensors, state estimator, controller, command and control architecture, adaptive control, operator/pilot, low level algorithm, low level algorithm supporting sensors, higher level algorithm, higher level algorithm supporting sensors, artificial intelligence, onboard cooperative computing, offboard cooperative computing, transponder, collision avoidance system, in combinations thereof, without or without assistance from a one or more cooperative external positioning system, internal positioning system, global positioning system, or combinations thereof. To aid graphical representation, the guidance and navigation system 66 is depicted as a box containing the letters G&N" whereby its location is dispersed internally, externally, or in a combination thereof throughout the system 30.

Herein shown in the majority of the figures, the generally forward and reverse locomotion more efficiently harness the substantial lift generation potential of the system 30 and/or substantial displacement benefits of the net locomotive system compared to the substantially left or right locomotion.

As such, the system 30 may be alternatively operated in a substantially forward or reverse locomotion such that substantial lift generation potential of the system 30 and/or substantial displacement benefits of the net locomotive system governs in the substantially left or right locomotion. Further included in the present disclosure, the aerodynamic lift generating potential of the vehicle 32 and displacement benefits of the net locomotive system may be substantially balanced for locomotion, substantially unbalanced for locomotion, or alternating between balanced and unbalanced for locomotion either by design or as influenced by the domain and/or environmental conditions.

It is further defined that the existing propulsive apparatus, thrust vectoring apparatus, auxiliary locomotive device(s), or combinations thereof attached to the system 30 can exert force independently of one another, in unison, in partial unison, partial independence of one another, or in combinations thereof.

Figure 1B:
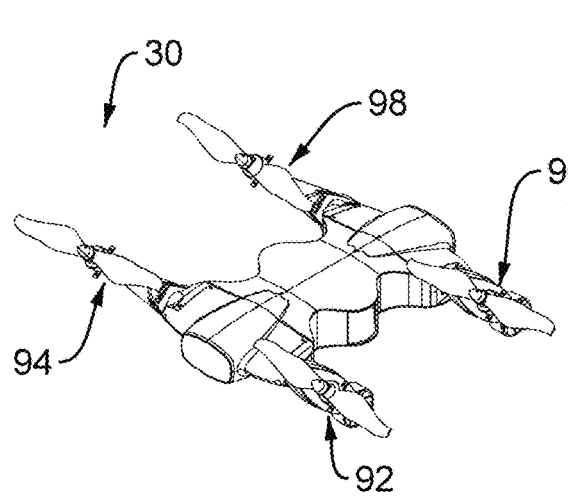
FIGS. 1B-1E illustrate perspective views of one embodiment of a vehicle system where the thrust vectoring modules are actuated in a first configuration (FIG. 1B), second configuration (FIG. 1C), third configuration (FIG. 1D) and fourth configuration (FIG. 1E)
Figure 1C:
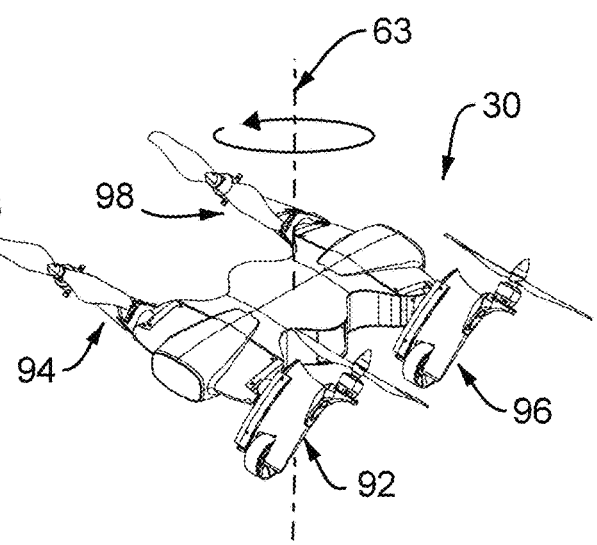
Figure 1D:
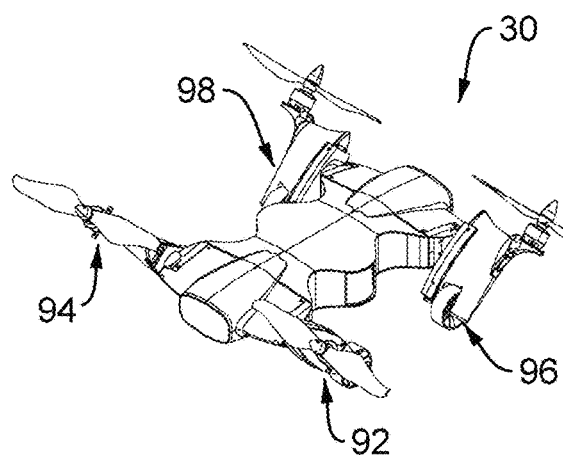

FIGS. 1B 1D illustrate isometric views of one embodiment of the system 30 containing the vehicle 32 where the equipped thrust vectoring modules contain one or more degrees of freedom.

FIG. 1B illustrates the existing left front, right front, left rear, and right rear thrust vectoring modules, 92, 94, 96, and 98, respectively, mostly deployed in unison.

FIG. 1C illustrates the existing left front, right front, lef rear, and right rear thrust vectoring modules, 92, 94, 96, and 98, respectively, in a mostly deployed alternating unison relative to the standard chord line 62.

FIG. 1D illustrates the existing left front, right front, left rear, and right rear thrust vectoring modules, 92, 94, 96, and 98, respectively, in a mostly deployed alternating unison relative to the span line 64.

FIG. 1D illustrates the existing left front, right front, left rear, and right rear thrust vectoring modules, 92, 94, 96, and 98, respectively, in a mostly deployed independent fashion. As shown, deployment configurations/actuation of the equipped thrust vectoring module(s) assist substantially in the locomotion of the system 30.

It is further defined that the existing propulsive apparatus, thrust vectoring apparatus, auxiliary locomotive device(s), or combinations thereof attached to the system 30 induce an insect-like operability, further discussed in subsequent figures. The phrase flight path is defined as the path in the air or space made or followed by an object in flight. This is not restricted to flight in air, as flight in other fluids, besides air is possible, like in water. The term air is defined as a fluid as it is studied in the field of Aerospace Engineering (aerodynamics or fluid mechanics) and often studied as a continuum. The phrase "insect-like operability is defined as a system's ability to abruptly change flight path/direction in either two or three-dimensions, substantial response to controller inputs, substantial response to actuated thrust vectored deflections, substantial response to thrust magnitude changes, or in combinations thereof.

Further, an additional improvement from conventional designs, herein disclosed, is the combination of having insect-like operability in conjunction of maintaining a mostly constant view/orientation of the horizon (surface reference).

Figure 2A:
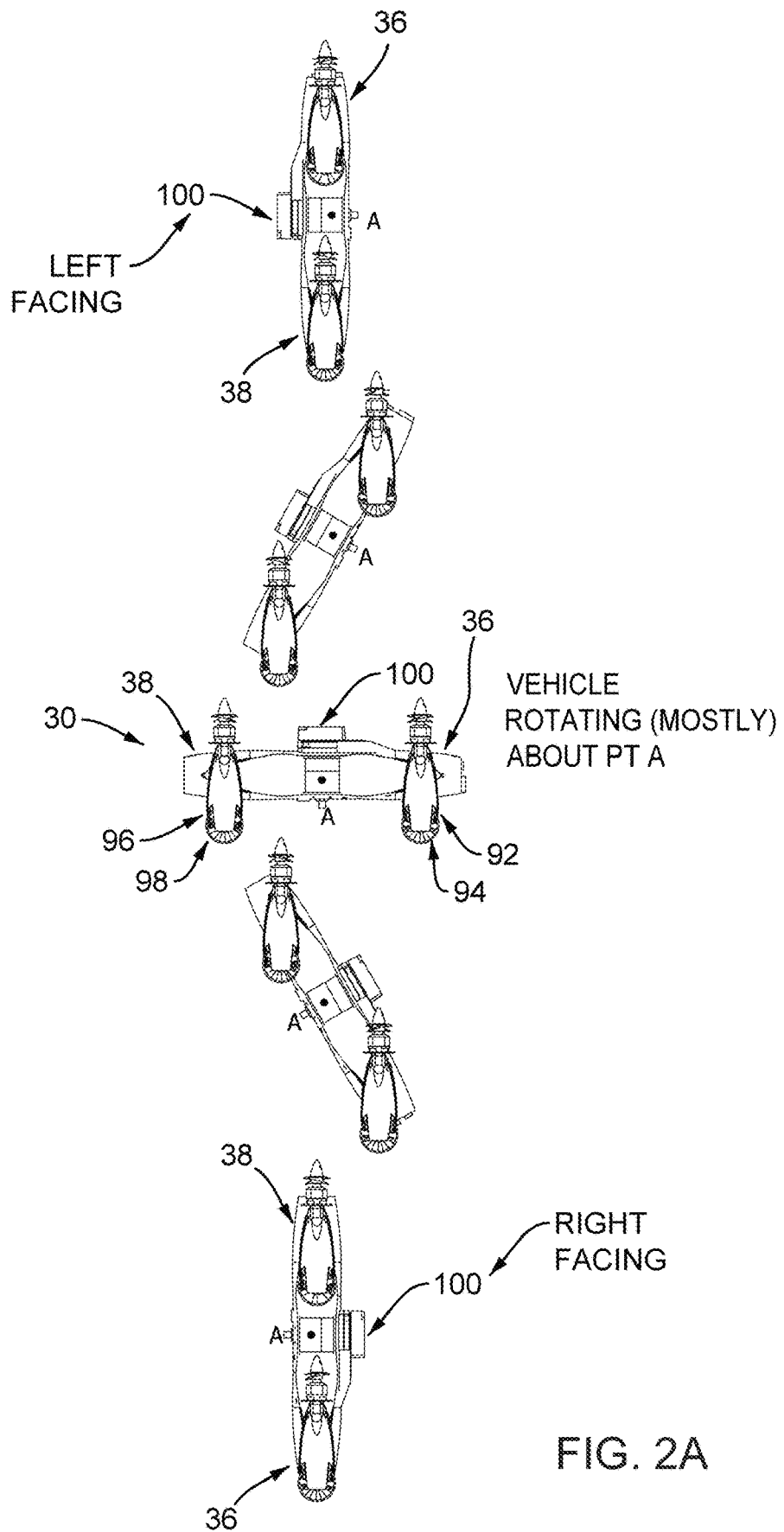
FIG. 2A illustrates a side view of one embodiment of a vehicle system showing one example of a sequence of vehicle angle of attack orientations during flight transition while in substantially hovering flight such that the vehicle migrates to and from the horizontal and vertical orientations.

FIG. 2A illustrates an embodiment of the system 30 containing the vehicle 32 further comprising a net locomotive effort, additionally aided by the ability to change the vehicle's 32 angle of attack relative to the surface/reference, enabling the vehicle 32 to substantially rotate in an interchangeable fashion about mostly centered/centroid point A of the system 30, constituting a substantially pitching maneuver.

Further, the point A is defined as the net center of dynamics of the system 30 typically affected by internally generated forces, internally generated moments, system generated forces, system generated moments, aerodynamic effects, external forces, external moments, other sources of locomotive interference, or combinations thereof. Further, the system 30 is configured to rotate in one of more directions with limited or unlimited angular displacement. This system's 30 net degree of freedom enables operations whereby one or more existing sensors, such as the upper mounted sensor package 100, is manipulated/redirected by the change of orientation of the system 30.

The ability of the system 30 to redirect the one or more existing sensors increases mission applicability of the present design. For example, gimbal actuation/mechanism(s) are made redundant or obsolete as the vehicles 32 capacity to change its orientation allows it to track objects or places of interest, align itself as needed for flight planning, and so on.

FIG. 2A illustrates one embodiment depicting the concept of relative orientation whereby an orientation reassignment strategy is possible given the system's 30 broad range of vehicle body angle of attack manipulation. For example, an airplane has a definite front or rear and top or bottom and so do helicopters or multirotors (e.g., tricopter, quadcopter, hexacopter, octocopter, referring to 3-, 4-, 6- and 8-rotor rotorcraft, respectively) or other typical ground/marine vehicles, but given the maneuverability of the system 30, top can become bottom then side then bottom again, front can become bottom then top then rear, etc. Further, for example, in the upper most view of FIG. 2A, the upper mounted sensor package 100 is left oriented/facing, as the system 30 rotates mostly about point A the upper mounted sensor package 100 becomes right oriented/facing, shown in the lowermost view. Therefore, given the system's 30 wide range of tilting actuation, the upper mounted sensor package can be directed upward, sideward, downward, etc. For example, if a fixed sensor is searching for hot spots on a floor surface, that same fixed mounted sensor can be used to search for hot spots on a ceiling surface, on a wall surface, or down a flight of stairs after the vehicle orients itself.

The tilting application described in FIG. 2A, when coupled with the yaw rotation about vertical axis 63, substantially allows the system 30 to become its own pan and tilt system; therefore, semi-rigidly or rigidly equipped sensing packages may not need their own gimbal actuators. The system 30 acts, as a whole, as an airborne gimbal in both stationary/hovering and non-hovering flights. For example, while in hover, the system 30 would be able to track autonomously a laser pointer reflecting on a surface as it moves in any direction: up, down and side-to-side. Also, in the same example, the vehicle would be able to track the same laser pointer reflection even as the system 30 is translating itself in any direction. In practice, for example, this capability applies to searching for points of interest, or tracking dynamic features inside while eliminating the need for an independent pan and tilt actuation device, thereby allowing the disclosed invention to weigh less, have lower cost, have fewer components, use less power, etc.

The concept of "panning and/or tilting" the entire system 30 to explore and/or manipulate an environment is valid for the assistance of all equipped hardware, including but not limited to: sensors, manipulators, communications device, antenna, payloads, payload delivery mechanism, landing gear system, and so on. The system-wide pan and tilt function is also useful for take-off or landing operations where the landing zone is uneven or dynamically changing orientation/attitude. The system-wide pan and tilt function is also useful for loss mitigation and failsafe operations. For example, if a propulsion module fails, the system 30 may automatically re-orient itself to re-gain stability/controllability or reduce impact force in the event of a crash. The system-wide pan and tilt function also assists in confined space operations. For example, the system 30 when mostly oriented as shown in the top or bottom view of FIG. 2A would be able to traverse a vertical shaft or while in this same orientation, the system would be able to knife-edge" into a partially opened door and so on. The system-wide pan and tilt functionality is further enhanced by the various embodiments discussed in the figures below.

Figure 2B:
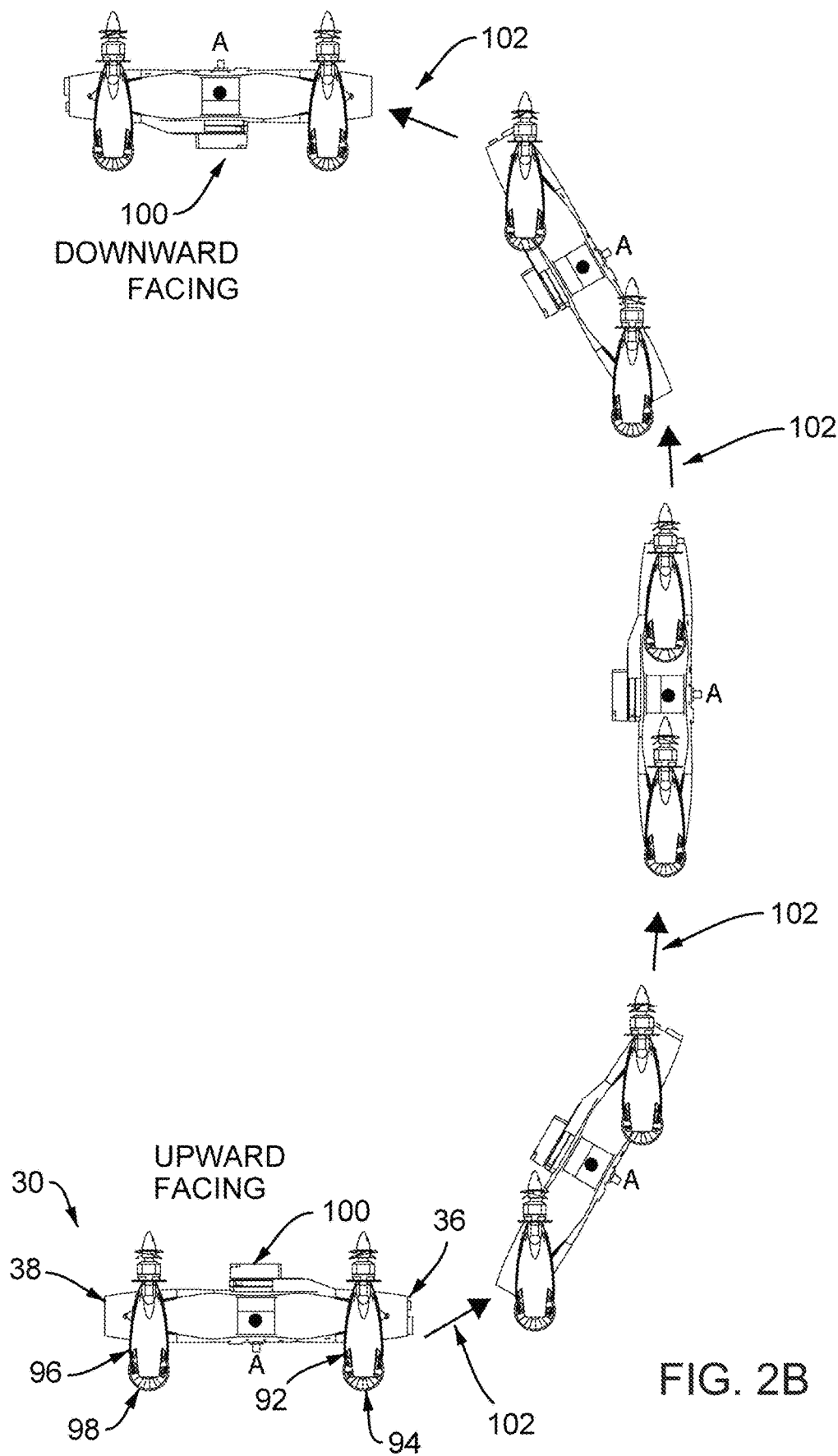
FIG. 2B illustrates a side view of one embodiment of a vehicle system showing one example of a sequence of vehicle angle of attack orientations during flight transition while in a substantially non-hovering flight, where a translational velocity vector exists, such that the vehicle migrates to and from, interchangeably, the horizontal and vertical orientations.

FIG. 2B illustrates an embodiment of the system 30 containing the vehicle 32 further comprising a net locomotive effort, additionally aided by the ability to change the vehicle's 32 angle of attack relative to the surface/reference, enabling the vehicle 32to, in an interchangeable fashion over the entire 360 degree range of orientations, partially translate about a general flight path arc center and partially rotate about the mostly centered/centroid point A of the system 30, constituting a mostly pitching maneuver. Further, the sequence of views provided illustrates the vehicle's angle of attack control authority and orientations during flight transition while in a substantially non-hovering flight, where a translational velocity vector 102 exists combined with a moment about point A, such that the vehicle migrates to and from, interchangeably, the horizontal (shown at the top and lowest views in the sequence) and vertical (shown at the right most view in the sequence) orientations. Further, the upper fixed sensor package 100, initially facing upward, is reoriented via the maneuver and ends facing downward, interchangeably, while migrating through several other orientations. Further, all sensors on-board may benefit the orientation migration in the process of the flight transition.

Figure 2C:
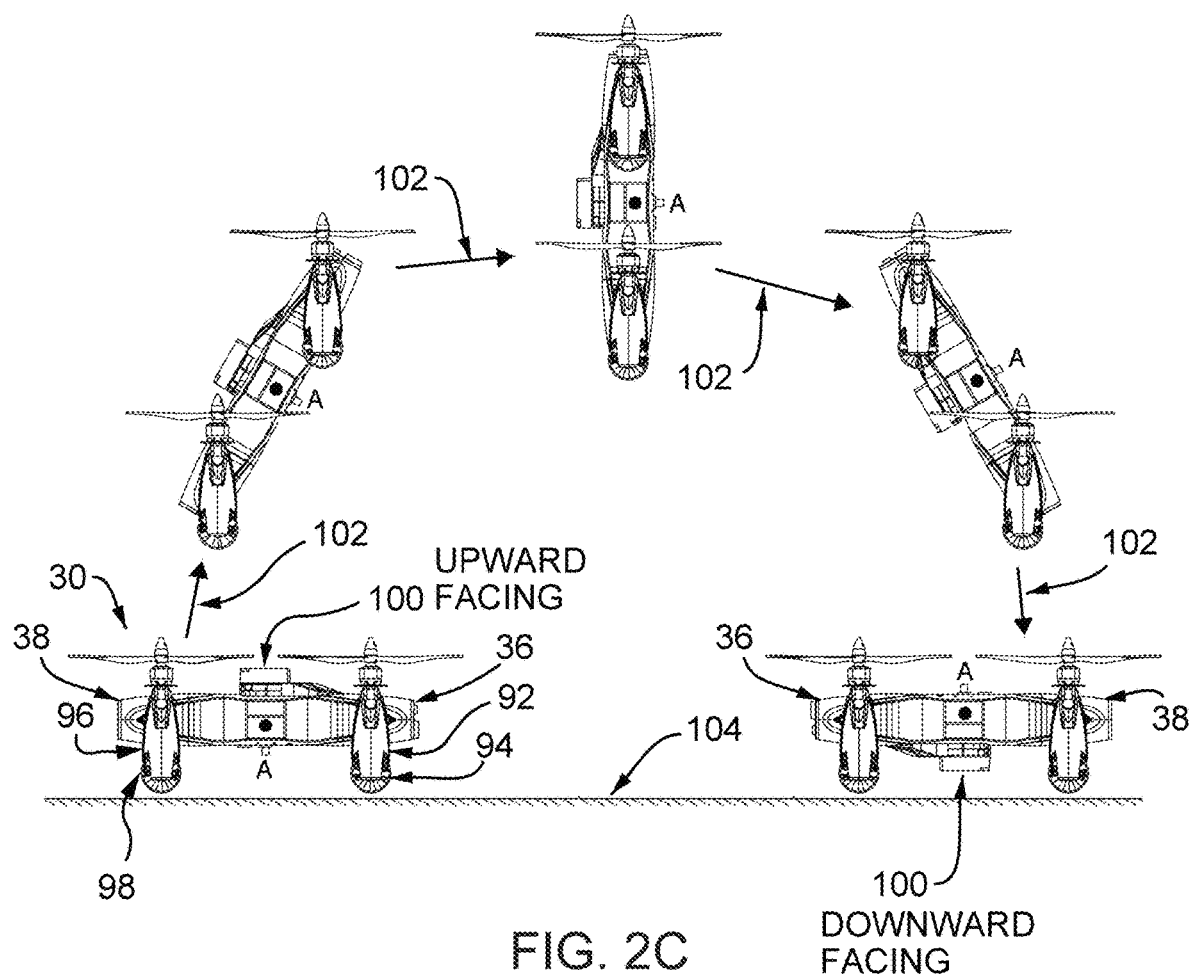
FIG. 2C illustrates a side view of one embodiment of a vehicle system showing one example of a sequence of vehicle angle of attack orientations during flight transition within the scope of take-off and landing procedure.

FIG. 2C illustrates an embodiment of the system 30 containing the vehicle 32 further comprising a net locomotive effort, additionally aided by the ability to change the vehicle's 32 angle of attack relative to the surface/reference 104, while enabling the vehicle 32 to partially translate about a general flight path arc center and partially rotate about the mostly centered/centroid point A as an added functionality to the types of take-off or landing orientations herein made possible. Further, the system 30 may land firstly on any one or more of its contact points with the surface depending on body angle of attack during descent. For example, the vehicle may "land on its front paws" or "land on its rear paws," e.g., similar to an animal after a jump. The system 30 is further configured to land mostly vertically, either having the rearward 38 or forward 36 body sections oriented towards the surface/reference 104, making it a tail sitting vehicle that is invertible on its mostly vertical landing configuration.

Figure 2D:
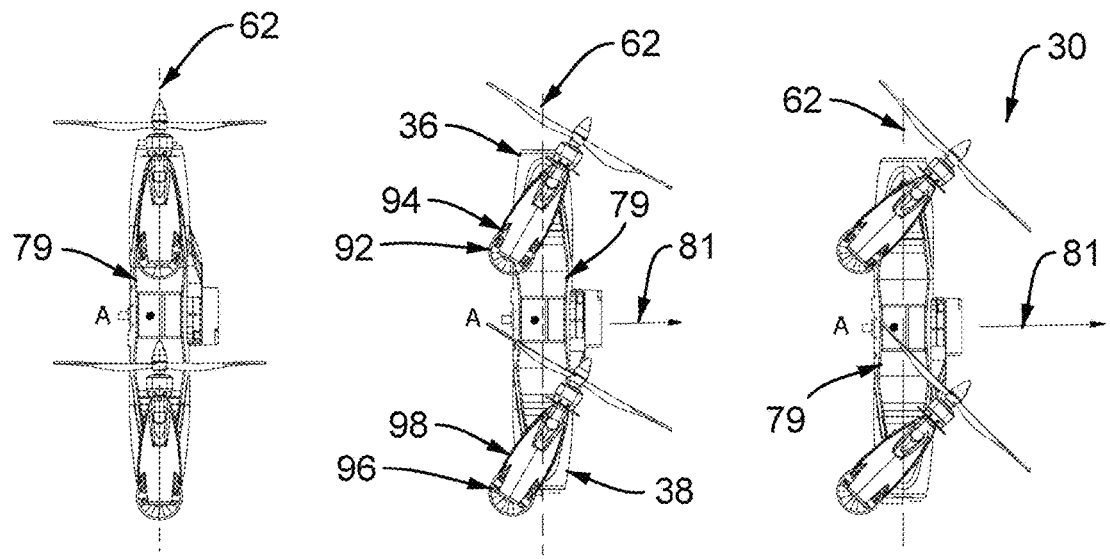
FIGS. 2D and 2E illustrate a side view of one embodiment of a vehicle system in mostly vertical flight utilizing thrust vectoring for translation.
Figure 2E:
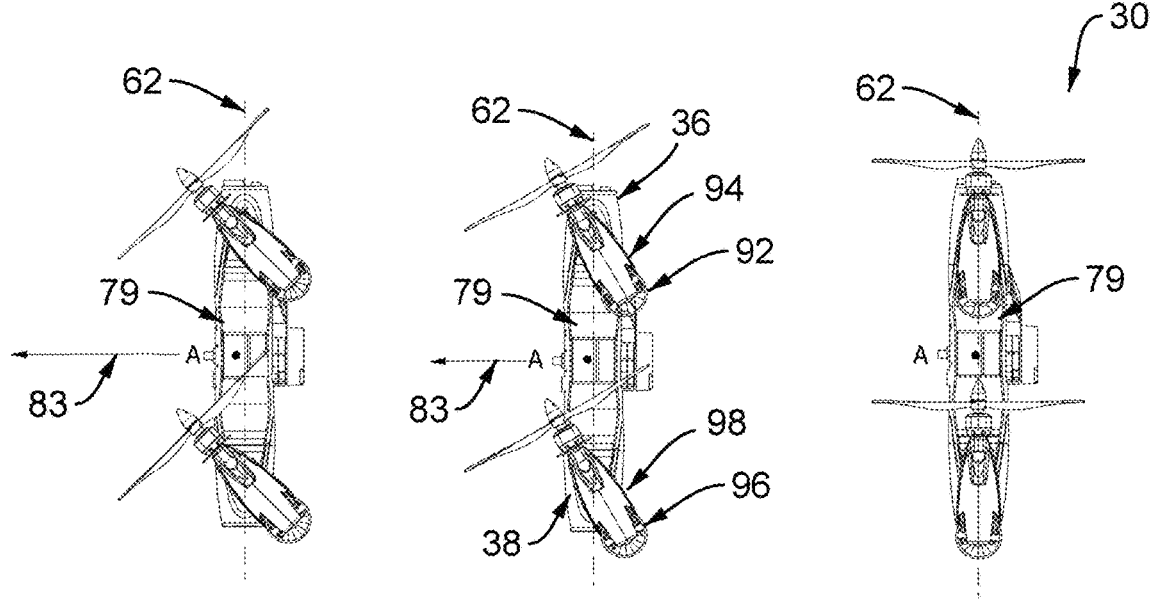

FIG. 2D and FIG. 2E illustrate an embodiment of the system 30 containing the vehicle 32 further comprising a net locomotive effort, additionally aided by the system's 30 ability to substantially hold a vertical (whereby the standard chord line 62 is mostly perpendicular relative to the surface/refence 104) orientation 79 and further deploying one or more thrust vectoring modules 92, 94, 96, and 98 in a mostly unison direction, while enabling the vehicle 32 to substantially translate to a rightward direction 81 (FIG. 2D) or leftward direction 83 (FIG. 2E).

Figure 2F:
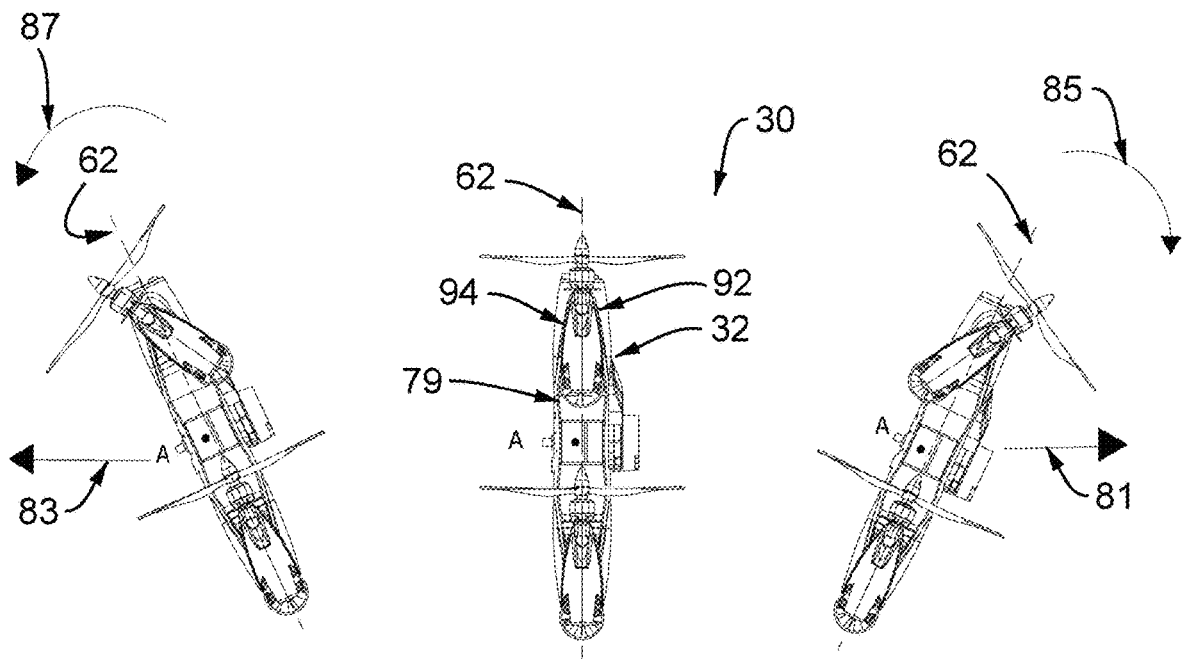
FIGS. 2F and 2G illustrate a side view of one embodiment of a vehicle system in mostly vertical flight utilizing thrust vectoring for combined translation and rotation.

FIG. 2F illustrates an embodiment of the system 30 containing the vehicle 32 further comprising a net locomotive effort, additionally aided by the system's 30 ability to substantially hold a vertical orientation 79 (whereby the standard chord line 62 is mostly perpendicular relative to the surface/refence 104) and further deploying one or more thrust vectoring modules, not aligned with the point A but located towards the forward half of the vehicle (96, and 98) in a mostly unison direction, while enabling the vehicle 32 to mostly rotate about the point A clockwise 85 and mostly translate point A to the rightward direction 81, or to mostly rotate about the point A counter clockwise 87 and to mostly translate point A to the leftward direction 83.

Figure 2G:
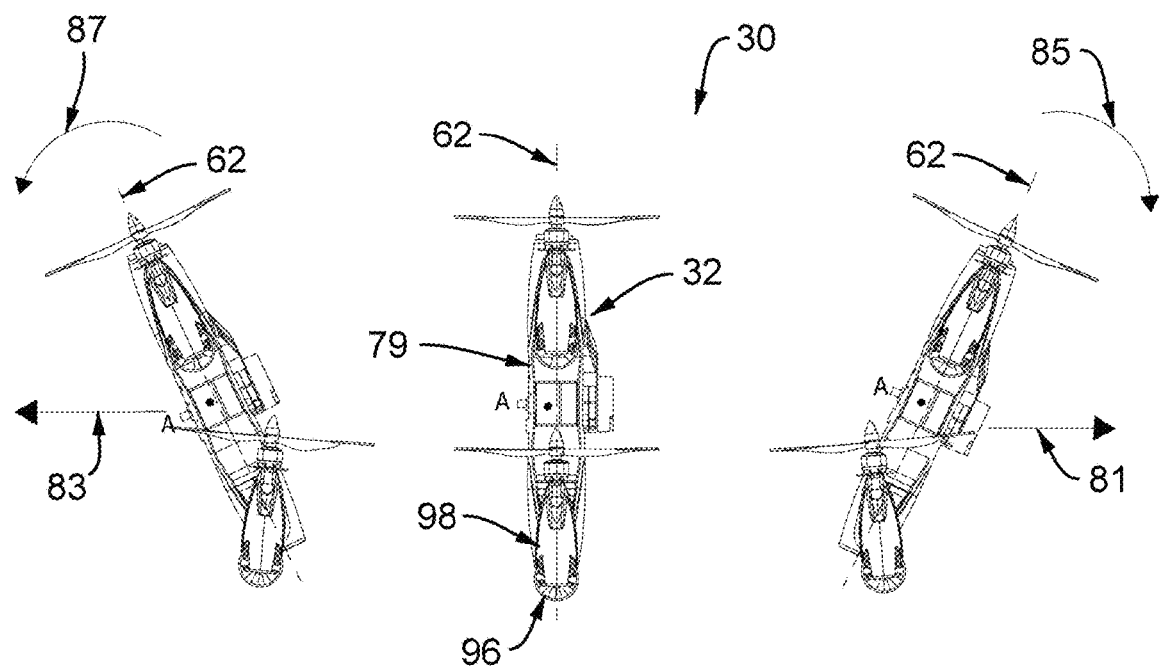

FIG. 2G illustrates an embodiment of the system 30 containing the vehicle 32 further comprising a net locomotive effort, additionally aided by the system's 30 ability to substantially hold a vertical orientation 79 (whereby the standard chord line 62 is mostly perpendicular relative to the surface/refence 104) and further deploying one or more thrust vectoring modules, not aligned with the point A but located towards the rearward half of the vehicle (96 and 98) in a mostly unison direction, while enabling the vehicle 32 to mostly rotate about the point A clockwise 85 and mostly translate point A to the rightward direction 81, or to mostly rotate about the point A counter clockwise 87 and mostly translate point A to the leftward direction 83.

Figure 2H:
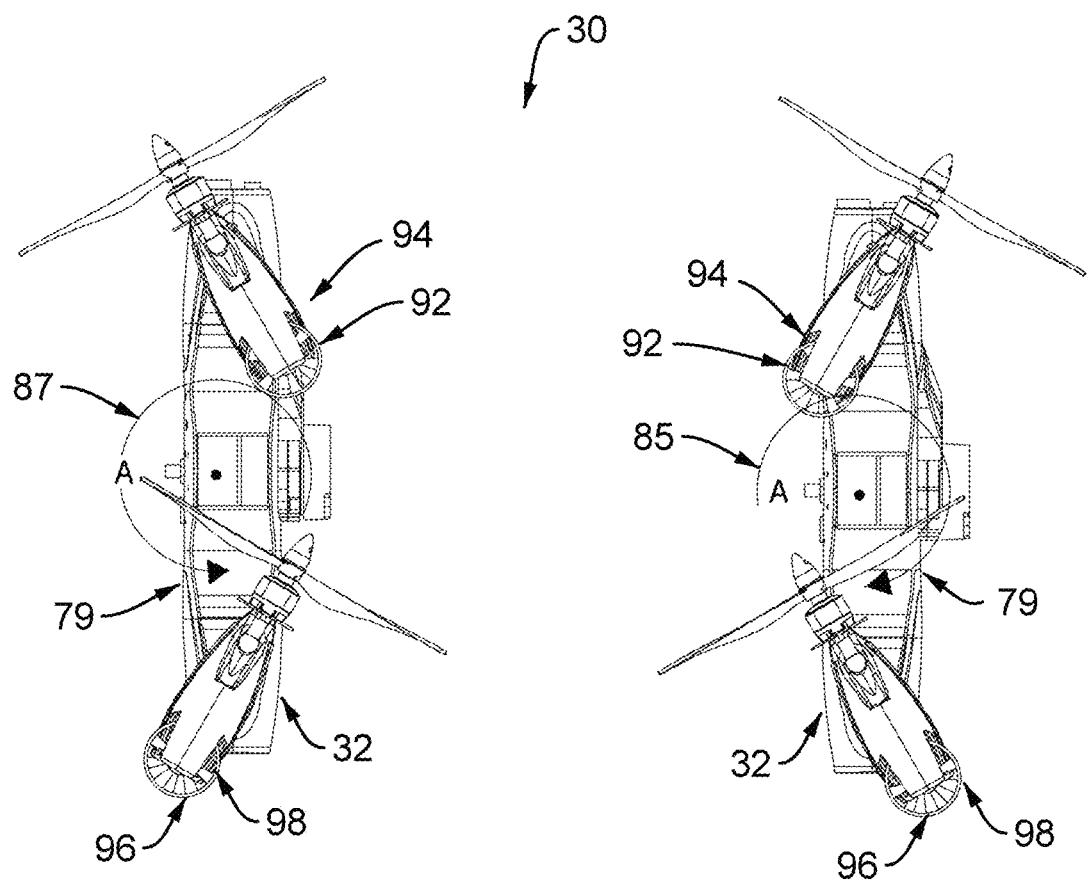
FIG. 2H illustrates a side view of one embodiment of a vehicle system in mostly vertical flight utilizing thrust vectoring for rotation.

FIG. 2H illustrates an embodiment of the system 30 containing the vehicle 32 further comprising a net locomotive effort, additionally aided by the system's 30 ability to substantially hold a vertical orientation 79 (whereby the standard chord line 62 is mostly perpendicular relative to the surface/refence 104) and further deploying one or more thrust vectoring modules, not aligned with the point A but located either towards the forward half of the vehicle (98 and 96) or the rearward half of the vehicle (92 and 94) in a mostly unison yet mostly opposing direction with respect to one another, while enabling the vehicle 32 to mostly rotate about the point A clockwise 85, or to mostly rotate about the point A counterclockwise 87. The above maneuver(s) may or may not cause a loss in altitude during flight operations, but is particularly important in fluid (submersed) operations where the vehicle may have substantial buoyancy; therefore, able to rotate mostly about the point A.

FIGS. 2A 2H, further comprise locomotive efforts, additionally aided by the ability to change the vehicle's angle of attack relative to the surface/reference 104, whereby the equipped thrust vectoring modules 92, 94, 96, and 98 produce a resultant thrust line mostly aligned with gravity.

The orientational changes and locomotive efforts illustrated in FIGS. 2F 2H, for example, when initiated from a mostly horizontal posture, whereby the standard chord line is mostly parallel with the surface/reference 104, constitute additional pitching maneuvers that may or may not benefit from the system's 30 aerodynamic generation capability.

Further, the system 30 is configured to retain operational authority in terms of forces along its axes and moment generation about its axes throughout all of its pan and tilt maneuvers and orientations.

Figure 3A:
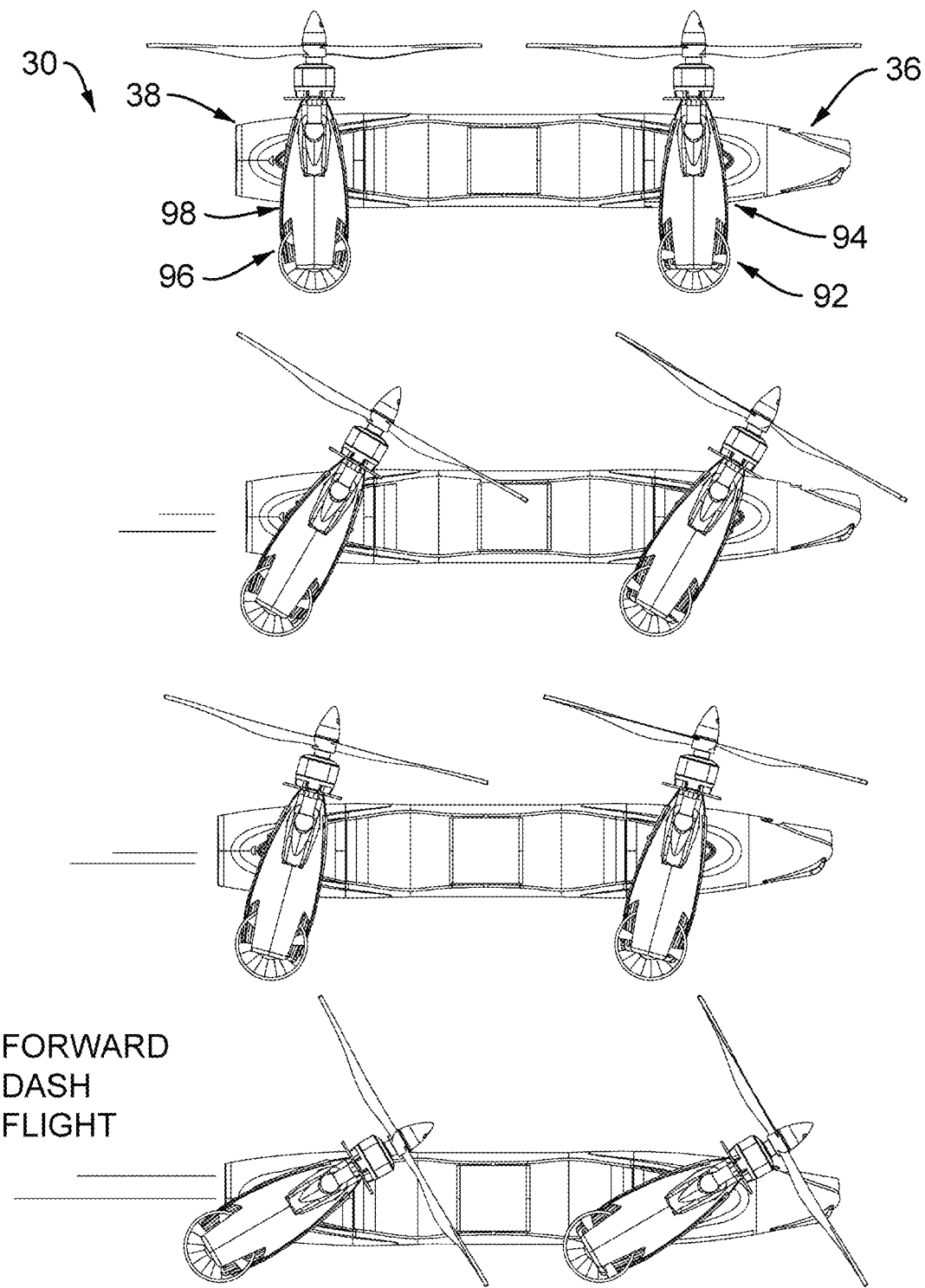
FIG. 3A illustrates a side view of one embodiment of a vehicle system showing one example of a sequence of tilt actuated thrust vectoring modules whose angle of attack orientations generate translational flight path as a vehicle holds a selected or commanded angle of attack.

FIG. 3A illustrates an embodiment of the system 30 containing the subject vehicle 32 further comprising a net locomotive effort, additionally aided by the ability to change the orientation of one or more thrust vectoring modules 92, 94, 96, and 98, further aided by the ability to select, preset, or command a given vehicle angle of attack relative to the ground, which enables the system 30 to dynamically translate. The additional ability to lean the net thrust vectoring apparatus while generating a mostly translational locomotion enables the system 30 to hold a preset angle of attack such that the existing orientation of the horizon remains in its flight path and subsequently in the desired sensory view (for example, in view of the camera when flying in first person). Fox example, this is particularly valuable for sensing and manipulating the environment. Additionally, the control authority inherent with the system 30 enabled by the ability to manipulate one or more rotational degrees of freedom (tilt angles) of the one or more thrust vectoring modules 92, 94, 96, and 98 further enables insect-like operations that include the ability to change flight path/direction abruptly in either two or three-dimensions, substantial response sensitivity to controller inputs, substantial response to actuated thrust vectored deflections, substantial response to thrust magnitude changes, or combinations thereof.

Figure 3B:
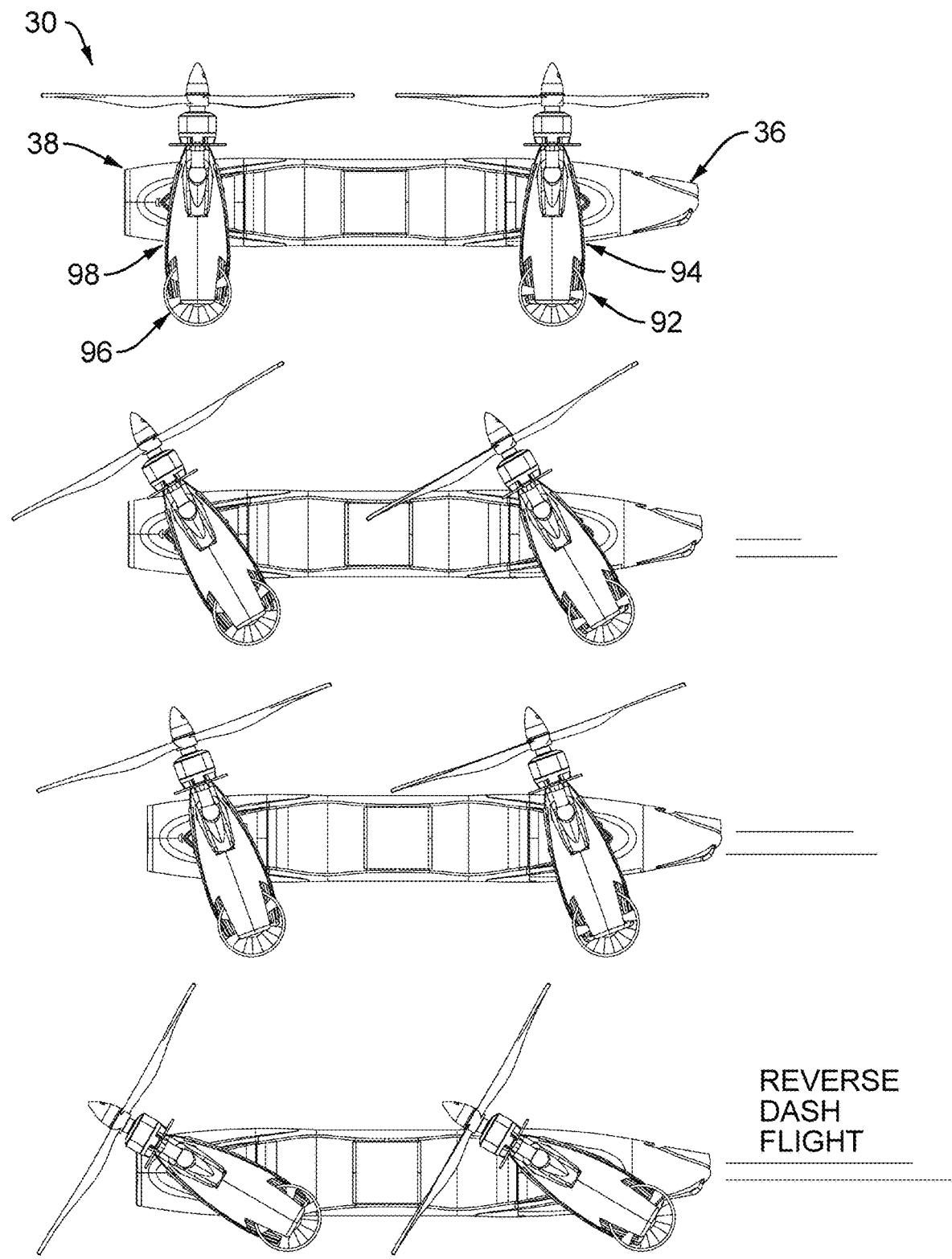
FIG. 3B illustrates a side view of one embodiment of a vehicle system showing one example a sequence of tilt actuated thrust vectoring modules whose angle of attack orientations generate an alternate (reverse) substantially translational flight path as a vehicle holds a selected or commanded angle of attack.

FIG. 3B illustrates an embodiment of the system 30 containing the vehicle 32 further comprising the ability to change the orientation of one or more thrust vectoring modules 92, 94, 96, and 98, further aided by the ability to select, preset, or command a given vehicle angle of attack relative to the ground, which enables the system 30 to dynamically translate in the opposing direction/flight path as FIG. 3A. The combined capabilities of forward, reverse, lateral translational flight while holding vehicle body angle of attack with the possibility of benefiting from the presence of aerodynamic lift is herein referenced "dash flight.

FIGS. 3A and 3B further reinforce the previously introduced concept of the absence of absolute orientation definition whereby the ability to change flight path, generally dictating the front of the vehicle has become the rear of the vehicle, and vice versa, occurs dynamically, with the added ability to hold the body angle of attack relative to the surface/reference throughout the entire available speed regime. Vehicles having helicopter-like flight regimes, like helicopters and traditional multi-rotors, must trade-off angle of attack relative with the ground to gain speed. Vehicles having airplane-like flight regimes, like in fixed-wing aviation, while being able to hold a set body angle of attack relative to the ground for their entire available speed range cannot achieve ambidirectional travel (i.e. in reverse direction to their original take-off path).

Figure 4A:
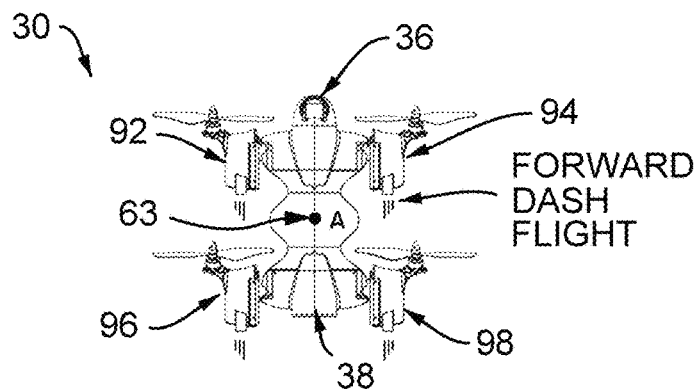
FIGS. 4A-4E illustrate a top view of one embodiment of a vehicle system detailing one example of transition from non-hovering flight, shown in FIG. 4A, to flight modes further governed by rotational or rotational with translational displacement components, shown in a first mode (FIG. 4B), second mode (FIG. 4C), third mode (FIG. 4D) and fourth mode (FIG. 4E)
Figure 4B:
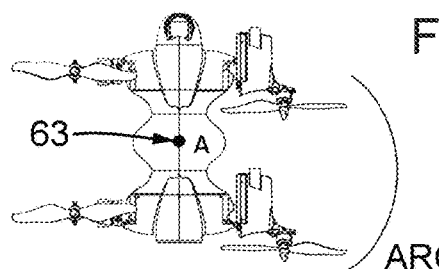
Figure 4C:
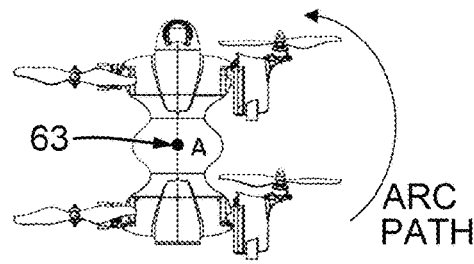
Figure 4D:
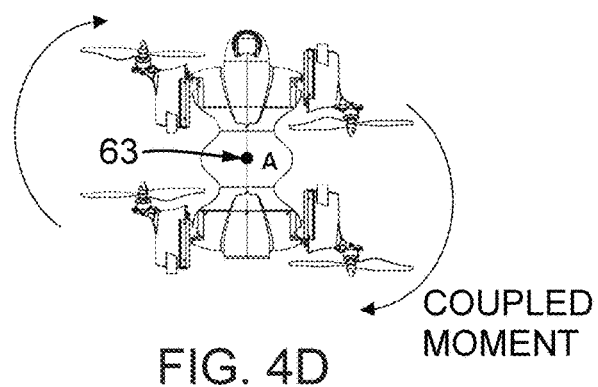
Figure 4E:
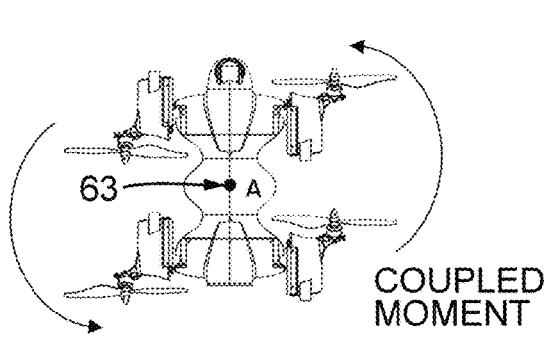

FIGS. 4A 4E illustrate top views of the embodiment illustrated in FIG. 1B.

Figure 1E:
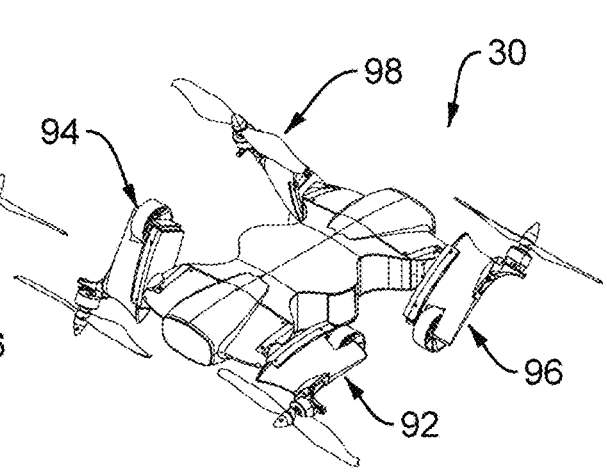

FIGS. 4B 4E illustrate additional deployments of the equipped thrust vectoring modules 92, 94, 96, and 98 from the embodiments illustrated in FIGS. 1B 1E.

FIG. 4B illustrates an embodiment of the system 30 containing the subject vehicle 32 further comprising a net locomotive effort, additionally aided by the capability to change the orientation of one or more thrust vectoring modules 92, 94, 96, and 98, while enabling the vehicle to partially translate about a general flight path arc center located to the left of the displayed vehicle, and partially rotate about the mostly centered/centroid point A, constituting a mostly yaw-like maneuver.

FIG. 4C illustrates an embodiments of the system 30 containing the subject vehicle 32 further comprising a net locomotive effort, additionally aided by the ability to change the orientation of one or more thrust vectoring modules 92, 94, 96, and 98, while enabling the vehicle to partially translate about a general flight path arc center located to the right of the displayed vehicle, and partially rotate about the mostly centered/centroid point A, constituting an opposing mostly yaw-like maneuver.

FIG. 4D illustrates an embodiment of the system 30 containing the subject vehicle 32 further comprising a net locomotive effort, additionally aided by the ability to change the orientation of one or more thrust vectoring modules 92, 94, 96, and 98, while enabling the vehicle to substantially rotate about the mostly centered/centroid point A, constituting a substantially yaw-like maneuver.

FIG. 4E illustrates an embodiment of the system 30 containing the subject vehicle 32 further comprising a net locomotive effort, additionally aided by the ability to change the orientation of one or more thrust vectoring modules 92, 94, 96, and 98, while enabling the vehicle to partially translate about a general flight path arc center located to the right of the displayed vehicle, and partially rotate about the mostly centered/centroid point A, constituting an opposing substantially yaw-like maneuver. It is further important to note that differential magnitude thrust generation of the one or more propulsive device also impacts vehicle body moments about each of the vehicle's 30 axes (longitudinal 62, lateral 64, vertical 63) or in combinations thereof. Further the unison, coupled, independent, or combinatorial magnitude thrust manipulation generation, acting along the vehicle's axes (longitudinal 62, lateral 64, vertical 63), while coupled with the tilt actuation of the numerous propulsive devices, additionally having one of more degrees of freedom, further enhances the system's 30 maneuverability by creating a plurality of either two-dimensional or 3three-dimensional translational, rotational, or combined controls.

As a result, the combinatorial capabilities to manipulate angle of attack relative to the surface/reference and manipulate yaw direction, while in a mostly or substantially stationery operation, as piece-wise depicted in the above figures, enables the system 30 to be its own gimbal, further enabling the system 30 to scan around a given space while in a mostly or substantially hovering flight regime. Moreover, as the system 30 is able to reorient top to bottom and vice versa, left to right and vice versa, the available ranges of rotation exceed conventional gimbaled travel limits.

The described locomotion in FIGS. 2A, 2B, 2C, 3A, 3B, 4B, 4C, 4D, and 4E are not possible in hybrid VTOL-style vehicles, rotary wing vehicles (including typical multirotor concepts), and airplane-like vehicles. The system 30 is configured to manipulate vehicle body angle of attack relative to the surface/reference both in airborne operations, non-airborne operations, transitioning operations, etc.

The partial or aggregate system 30 capability to maneuver as depicted in all of the figures contained herein further enables numerous algorithmic implementations, higher level operability, complex interaction, complex controls, complex physical guidance and navigation, in combinations thereof, with or without automation, and/or with or without global positioning system (GPS).

Figure 5A:
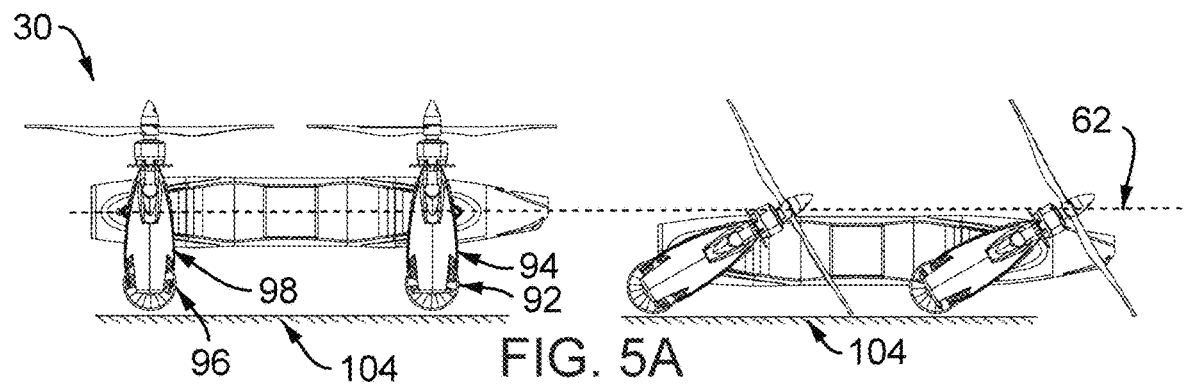
FIGS. 5A-5D illustrate side views of one embodiment of a vehicle system showing one example of unison tilt actuation of the thrust vectoring modules to manipulate ride height relative to the surface, shown in a first mode (FIG. 5A), second mode (FIG. 5B), third mode (FIG. 5C), and fourth mode (FIG. 5D)
Figure 5B:
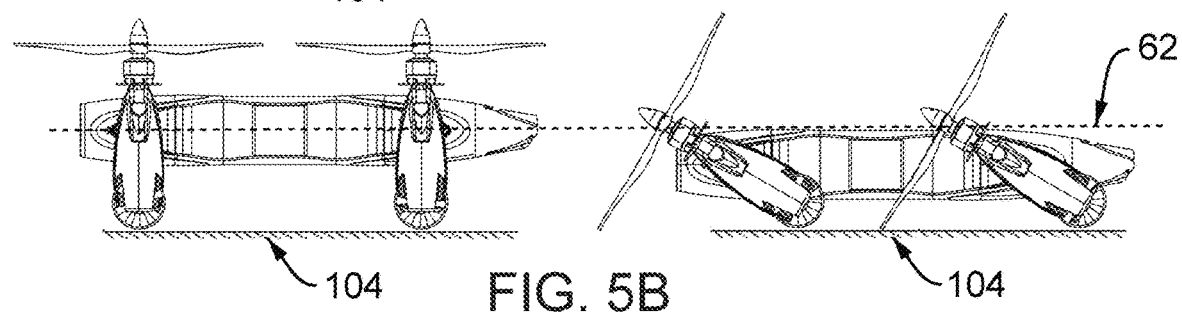
Figure 5C:
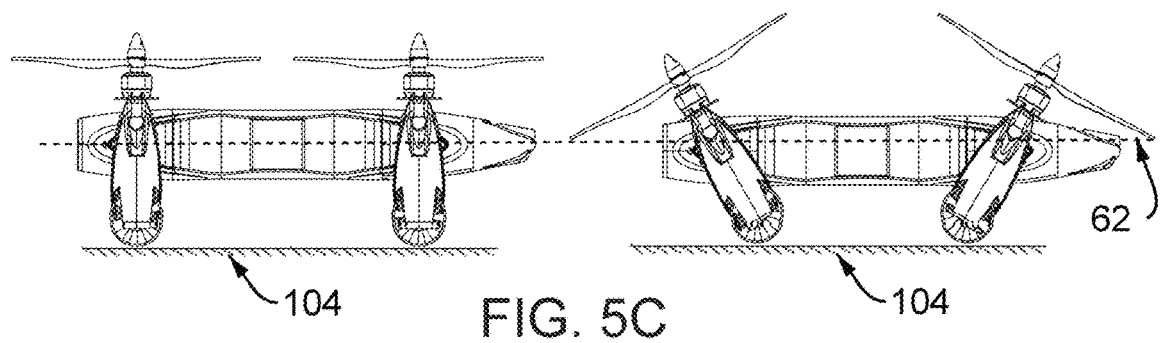
Figure 5D:
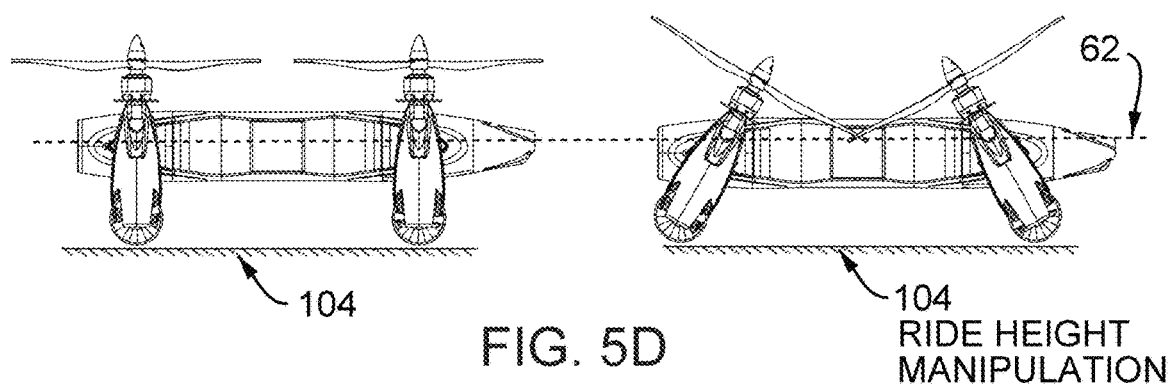

FIGS. 5A 5D illustrate side views of an embodiment of the system 30 containing the vehicle 32 further comprising the one or more tilt actuation of the equipped thrust vectoring modules 92, 94, 96, and 98 whose angle of attack orientations may or may not generate a locomotive effect to the system 30 over a surface while additionally changing the vehicle's 32 ride height relative to the surface whereby the chord span 62 remains substantially parallel with the surface/reference 104.

Figure 5E:
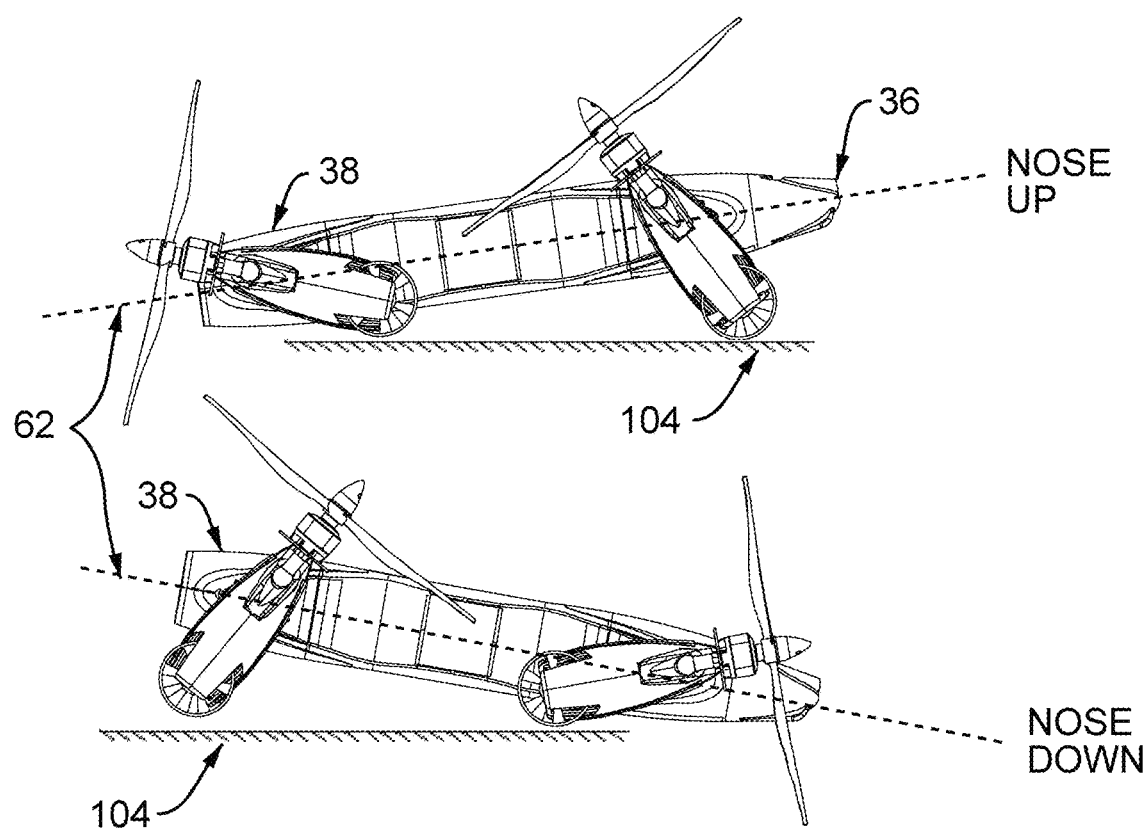
FIG. 5E illustrates side views of one embodiment of a vehicle system showing one example of independent tilt actuation of a thrust vectoring modules to manipulate both ride height and ride angle relative to the surface.

FIG. 5E illustrates side views of one embodiment of the system 30 containing the vehicle 32 further comprising the one or more tilt actuation of the equipped thrust vectoring modules 92, 94, 96, and 98 whose angle of attack orientations may or may not generate a locomotive effect to the system 30 over a surface while additionally changing the vehicle's 32 ride height and the ride angle relative to the surface.

Figure 5F:
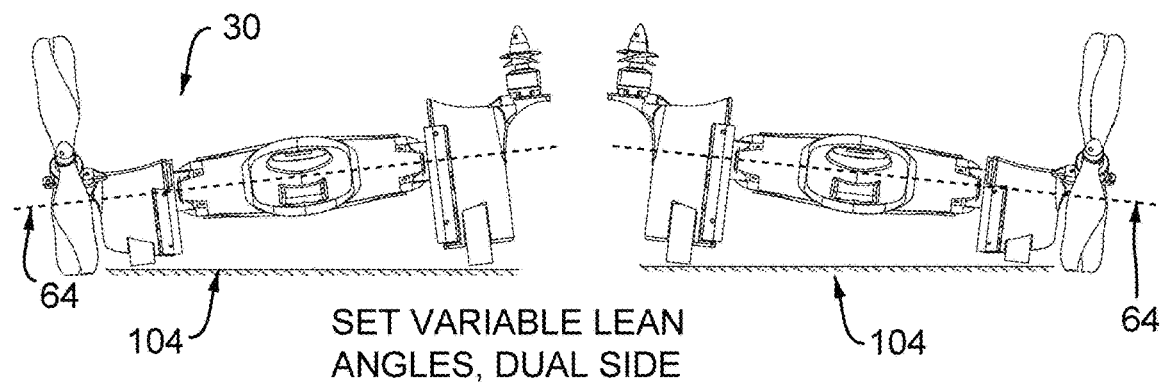
FIG. 5F illustrates front views of one embodiment of a vehicle system showing one example of independent tilt actuation of thrust vectoring modules to manipulate both ride height and lean angle relative to the surface.
Figure 5F:
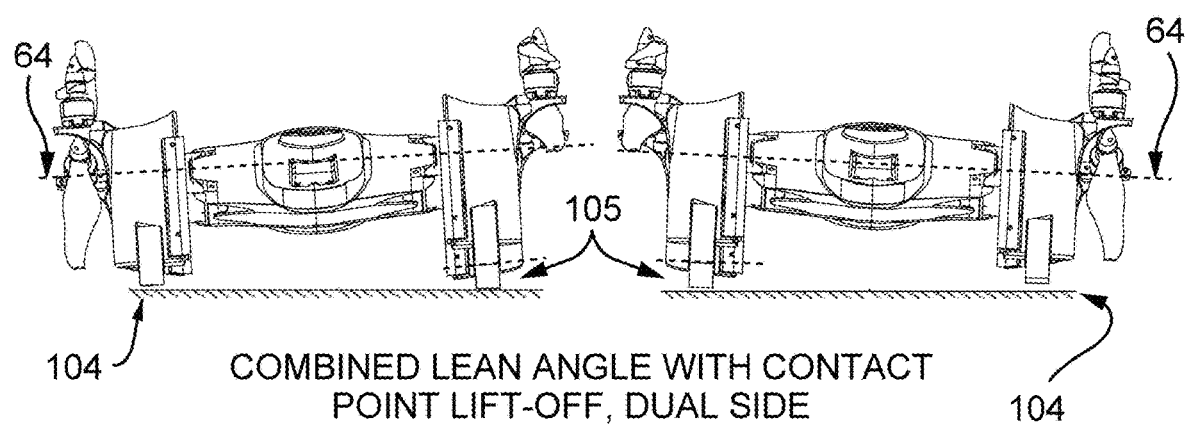

FIG. 5F illustrates front views of an embodiment of the system 30 containing the vehicle 32 further comprising the one or more tilt actuation of the equipped thrust vectoring modules 92, 94, 96, and 98 whose angle of attack orientations may or may not generate a locomotive effect to the system 30 over a surface while additionally changing the vehicle's lateral lean angle relative to the reference surface 104 (FIG. 5F TOP) or combinatorically changing the vehicle's lateral lean angle relative and ride angle relative to the reference surface 104 (FIG. 5F BOTTOM) further enabling one or more vehicle points of contact with the surface 105 to lift-off (raise) from the reference surface 104.

Further, for example, the combined maneuverability as described in FIGS. 5A 5F, along with the vehicle's angle of attack manipulation allows it for perform the following mission: take-off with a given sensor facing downward (FIG. 2C), efficiently fly forward while generating lift from the aerodynamic body shell (FIG. 7A & FIG. 7B), then transition and land so the same sensor is facing up (FIG. 2C), then lean the thrust vectoring modules forward to drive (FIG. 5A) and steer (FIG. 1C and FIGS. 4B 4E) over a surface propelling itself under a truck and inspecting it for contraband or hidden devices (upon positive identification prosecute the target if deemed a threat), further using other forms of leaning and tilt while under the truck (FIGS. 5E and 5F), then rolling out from under it in reverse (FIG. 5B), then perform a rolling take-off (FIG. 6), and return home.

Figure 6:
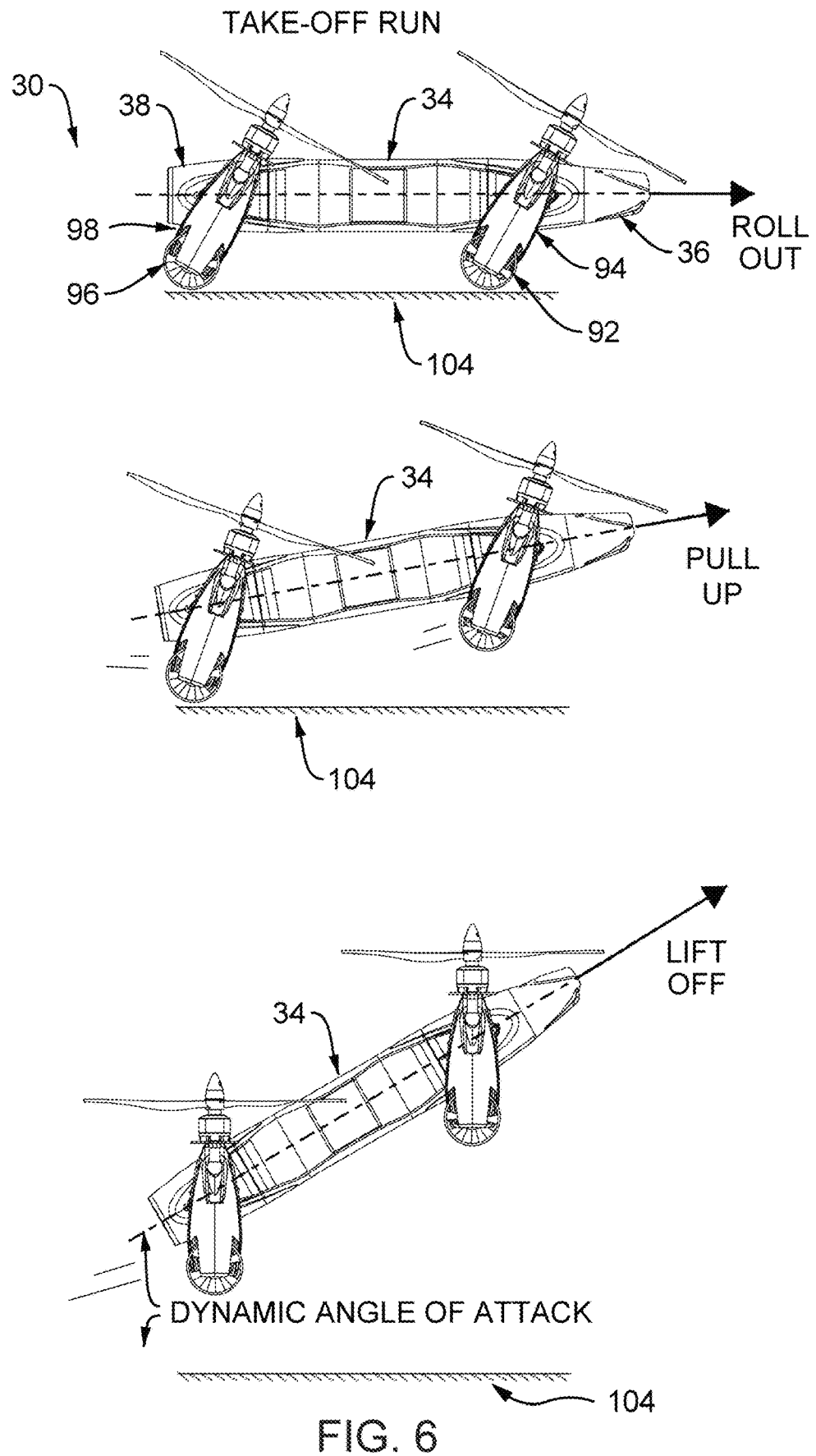
FIG. 6 illustrates a side view of one embodiment of vehicle system showing one example of tilt actuation of thrust vectoring modules in assistance of a rolling take-off run.

FIG. 6 illustrates side views of an embodiment of the system 30 containing the vehicle 32 further comprising tilt actuation of the thrust vectoring modules 92, 94, 96, and 98 in assistance of a rolling take-off run whereby the mostly short take-off may or may not benefit from aerodynamic lift generated by the lifting body module 34 with or without its other cooperating modules.

Figure 7A:
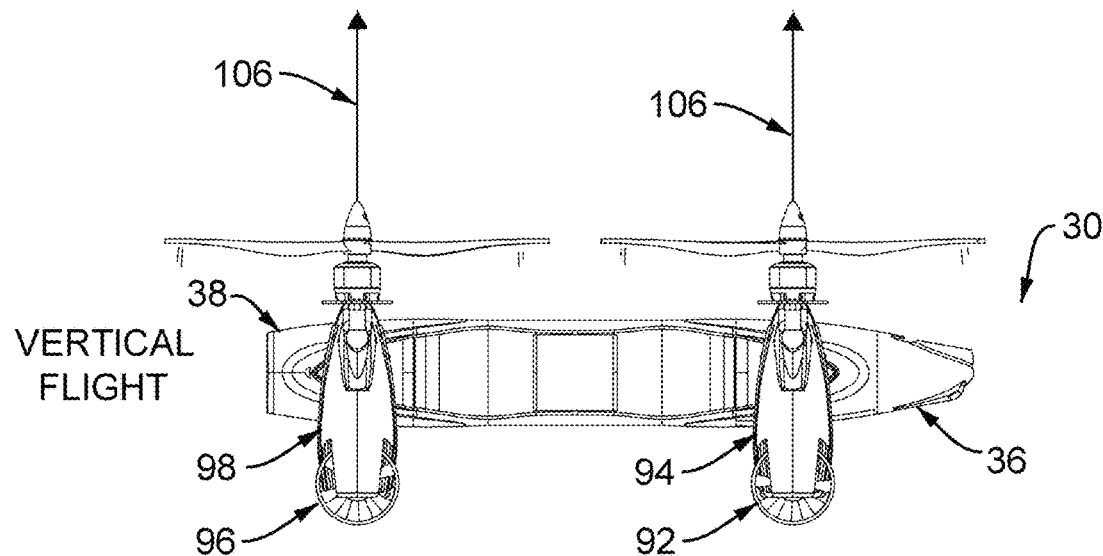
FIGS. 7A and 7B illustrate side views of one embodiment of a vehicle system showing one example of tilt actuation of thrust vectoring modules assisting flight mode transition while further assisted by aerodynamic lift.
Figure 7B:
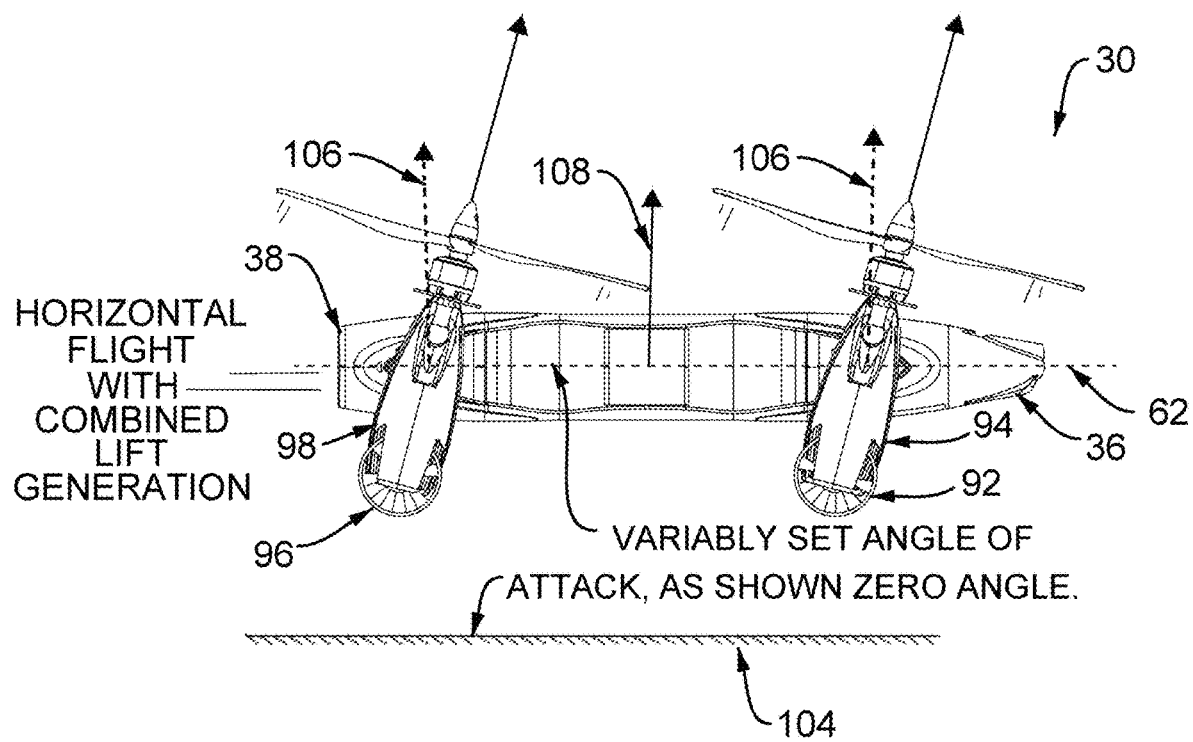

FIGS. 7A 7B illustrate side views of an embodiment of the system 30 containing the vehicle 32 further comprising tilt actuation of the thrust vectoring modules 92, 94, 96, and 98 while assisting flight mode transition from mostly hovering flight (FIG. 7A) to mostly forward (dash) flight (FIG. 7B) while partially sharing powered lift 106 generation of the thrust vectoring modules 92, 94, 96, and 98 with the partially aerodynamic lift 108 generated by the lifting body module 34 with or without its other cooperating body modules. Furthermore, while in horizontal (dash) flight, the system 30 further comprises the ability to automatically hold positive angles, negatives, and zero angle of attack relative with the reference surface (horizon) 104 such that aerodynamic lift generation can be directly manipulated (e.g. the system 30 can set an effective angle of incidence relative to the ground for cruise flight and additionally alter the angle of incidence dynamically during horizontal flight operation). For example, the system's 30 ability to set an angle of incidence allows the aerodynamic lift generation to offload power consumption from the powered lift generating thrust vectoring modules; therefore, reducing energy consumption and enhancing flight time, range, and/or payload weight capacity, and so on. Further, the ability to translate forward, while generating lift and having minimal cross-sectional drag area reduces drag and, again, increases the system's 30 performance. For example, a typical helicopter or multirotor must pivot (lean) into the intended flight path as rotary lift is "borrowed" to generated a forward pushing force vector; therefore, forward flight (e.g., for helicopters and conventional multirotors) comes at both the energy cost of reallocating the lift vector for a small forward vector component and of increasing the forward facing drag area by tilting the entire fuselage, these issues are solved in this disclosure at least due to the above descriptions as depicted in FIGS. 7A and 7B while also having the ability to achieve greater forward flight speeds.

Figure 8A:
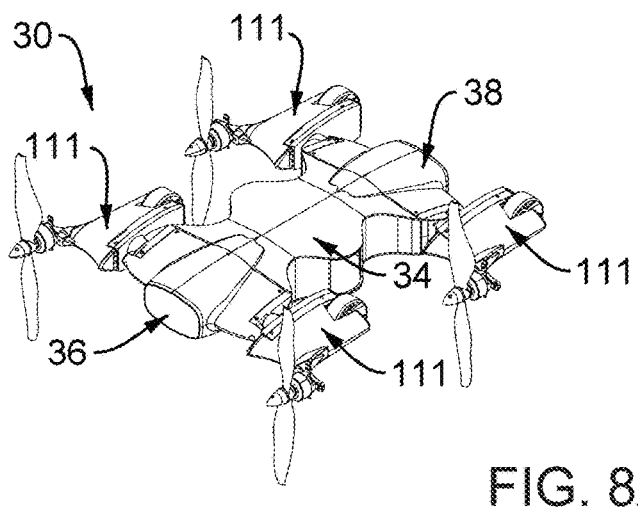
FIGS. 8A, 8B, and 8C illustrate embodiments of a multifunctional system of play enabled by plug-and-play ability of cooperating modules.
Figure 8A:
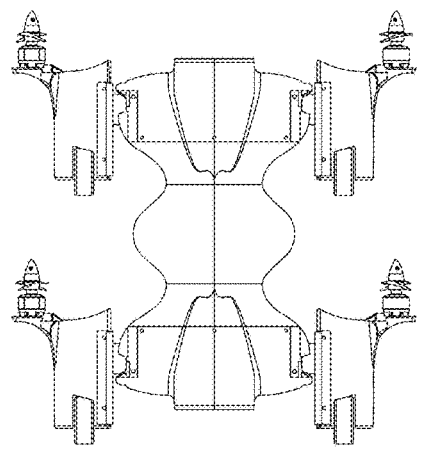
Figure 8B:
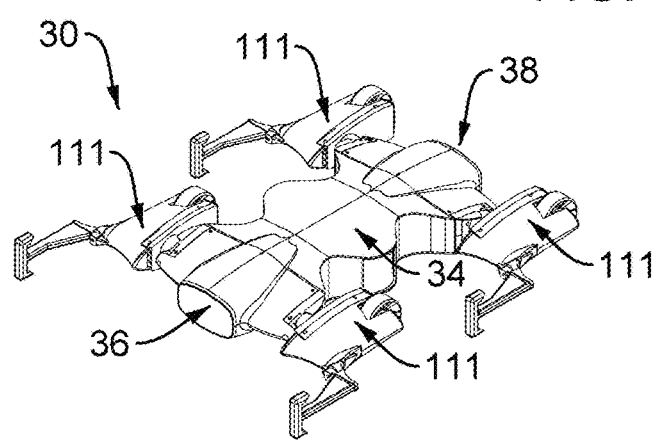
Figure 8B:
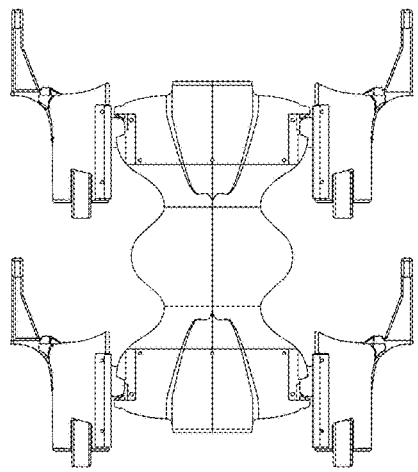
Figure 8C:
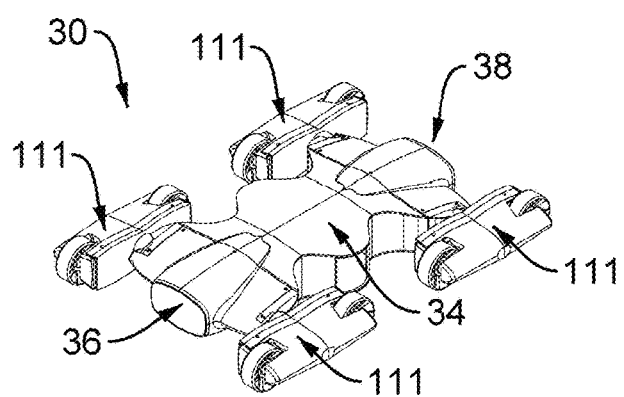
Figure 8C:
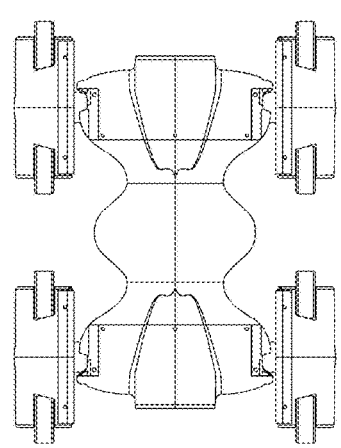

FIGS. 8A, 8B, and 8C illustrate isometric views with corresponding top views of an embodiment of the system 30 containing the vehicle 32 further comprising the modular nature of the one or more thrust vectoring modules 111 in cooperation with the lifting body module 34, the front body module 36, and the rear body module 38 while further illustrating the multifunctionality of the modular system of play 30 further enabled by the plug-and-play ability of the one or more blended propulsive cooperating modules.

Figure 9A:
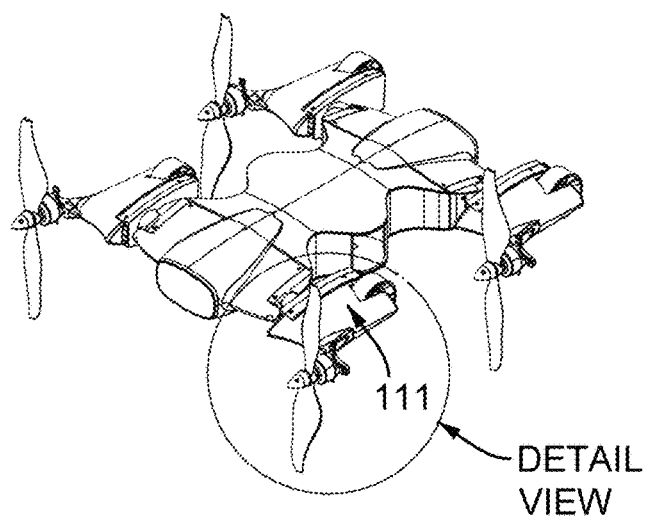
FIGS. 9A-9D illustrate embodiments showing multifunctionality of thrust vectoring modules in a combinatorial fashion, e.g., suitable for terrain applicability primarily utilizing fluid accelerating locomotive mechanisms, shown with first module (FIG. 9A), second module (FIG. 9B), third module (FIG. 9C) and fourth module (FIG. 9D)
Figures 9B, 9C, 9D:
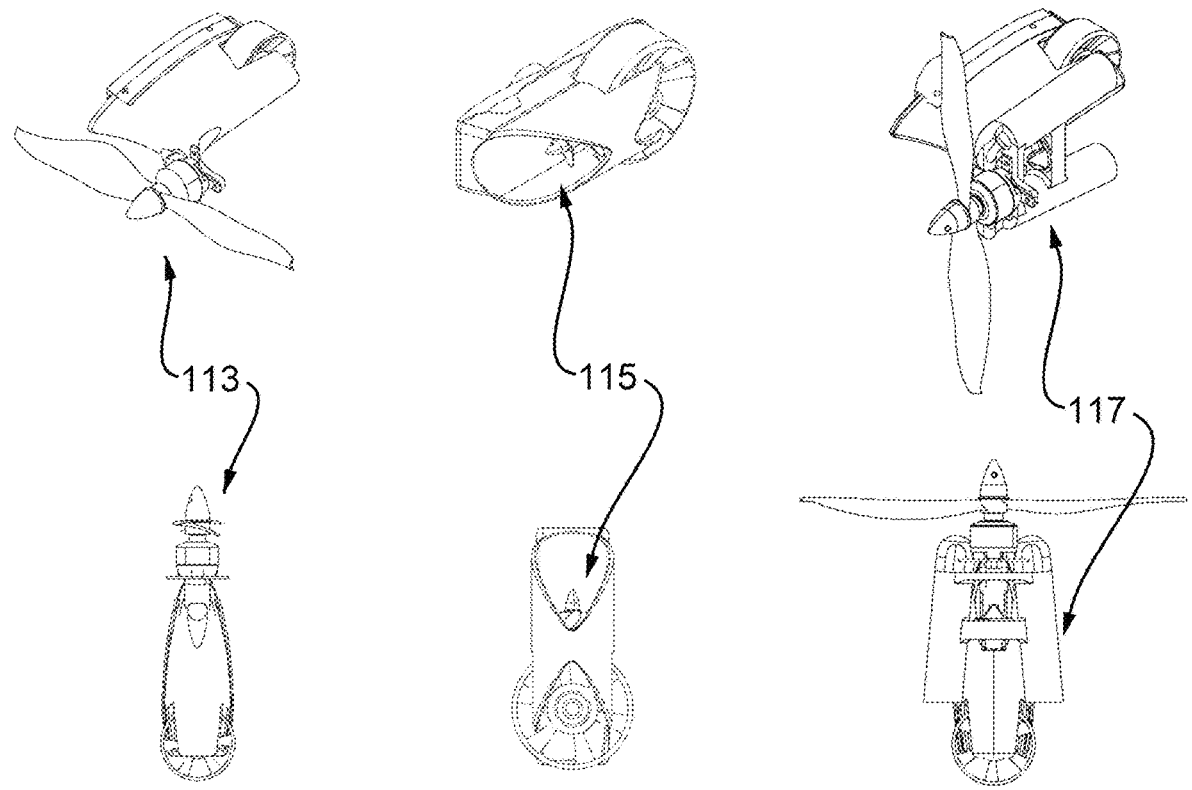

FIGS. 9A 9D illustrate an isometric view and related detail views (FIGS. 9B 9D, isometric and side views) of one embodiment of the system 30 containing the subject vehicle 32 further comprising the multifunctionality of the one or more blended modular propulsive cooperating modules 111, in a combinatorial fashion, suitable for terrain-based operability while primarily utilizing fluid accelerating locomotive mechanisms for airborne operations and auxiliary active and/or passive drive-type locomotive mechanisms. FIG. 9B (alternate detail embodiment view of 111) alternately utilizes propeller-type propulsive apparatus 113 for substantially airborne operation. FIG. 9C (alternate detail embodiment view of 111) alternately utilizes impeller-type propulsive apparatus 115 for substantially airborne operations. FIG. 9D (alternate detail embodiment view of 111) additionally utilizes exhaust-based propulsive apparatus 117 including self-contained (rocket), exhaust generating, energy bursting, and so on.

Figure 10A:
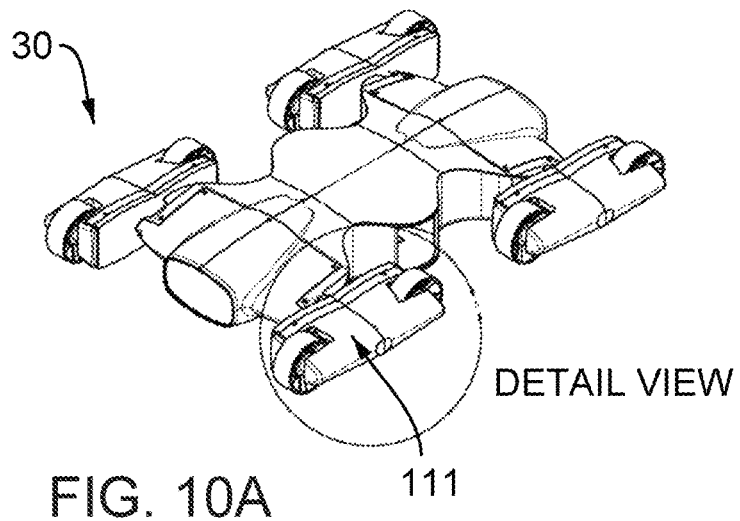
FIGS. 10A-10D illustrate embodiments showing multi-functionality of thrust vectoring modules in a combinatorial fashion, while converting the embodiment of the subject vehicle to non-aerial applications, e.g., suitable for multi-terrain applicability utilizing primary and auxiliary drive type locomotive mechanisms, shown with first module (FIG. 10A), second module (FIG. 10B), third module (FIG. 10C) and fourth module (FIG. 910D)
Figures 10B, 10C, 10D:
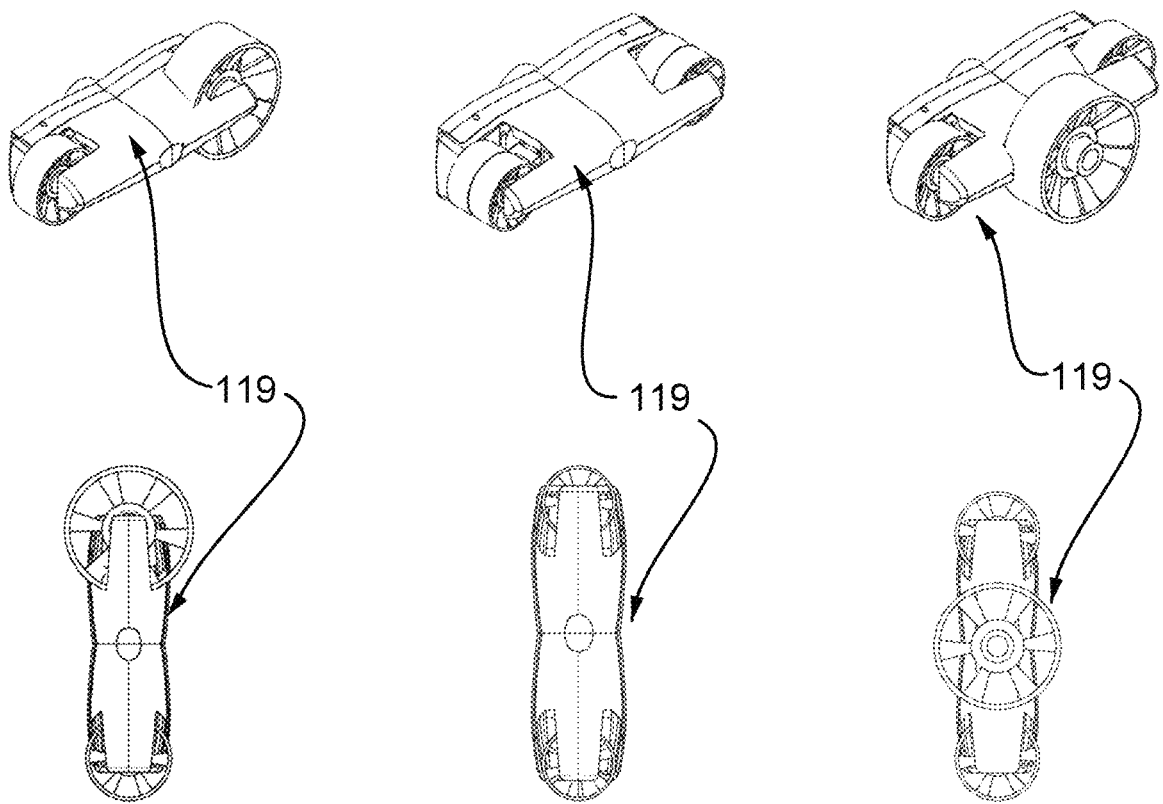

FIGS. 10A 10D illustrate an isometric view and related detail views (FIGS. 10B 10D, isometric and side views) of one embodiment of the system 30 containing the subject vehicle 32 further comprising the multifunctionality of the one or more blended modular propulsive cooperating modules 111, in a combinatorial fashion, while converting the depicted system embodiment to substantially non-aerial applications, suitable for multi-orientational and/or multi-terrain operability utilizing a diversity of one or more primary and auxiliary drive-type locomotive mechanisms 119 that are, in any combination, actively and/or passively driven.

FIG. 11A 11D illustrate an isometric view and related detail views (FIGS. 11B 11D, isometric and side views) contain a preferred embodiment of the system 30 containing the subject vehicle 32 further comprising the multifunctionality of the one or more modular propulsive cooperating modules 111, in a combinatorial fashion, while converting the depicted embodiment to substantially non-aerial applications, suitable for multi-orientational and/or multi-terrain operability while primarily utilizing active and/or passive extension-type locomotive mechanisms and auxiliary drive-type locomotive mechanisms. FIG. 11A (alternate detail embodiment view of 111) utilizes a primary locomotive mechanism that is substantially comprised of one or more grappling-type extension device 121. FIG. 11B (alternate detail embodiment view of 111) utilizes a primary locomotive mechanism that is substantially comprised of one or more mating/catching-type extension device 123. FIG. 11C (alternate detail embodiment view of 111) utilizes a primary locomotive mechanism that is substantially comprised of one or more scoop/skid-type extension device 125. FIG. 11D (alternate detail embodiment view of 111) utilizes a primary locomotive mechanism that is substantially comprised of one or more hooking/capturing-type extension device 127.

Figure 12A:
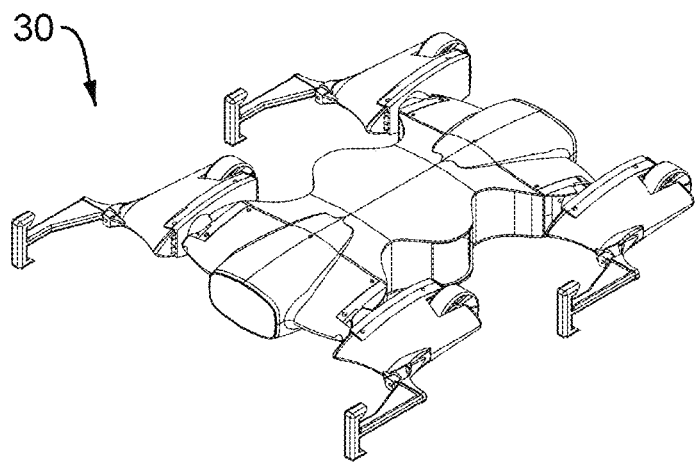
FIGS. 12A-12D illustrate isometric views of embodiments of a vehicle system converted to non-aerial applications detailing multifunctionality of modular thrust vectoring modules having various installed extension mechanism configurations, shown with first configuration (FIG. 12A), second configuration (FIG. 12B), third configuration (FIG. 12C) and fourth configuration (FIG. 12D)
Figure 12B:
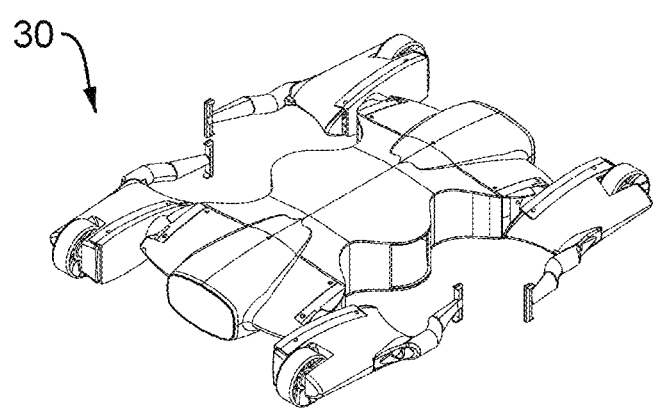
Figure 12C:
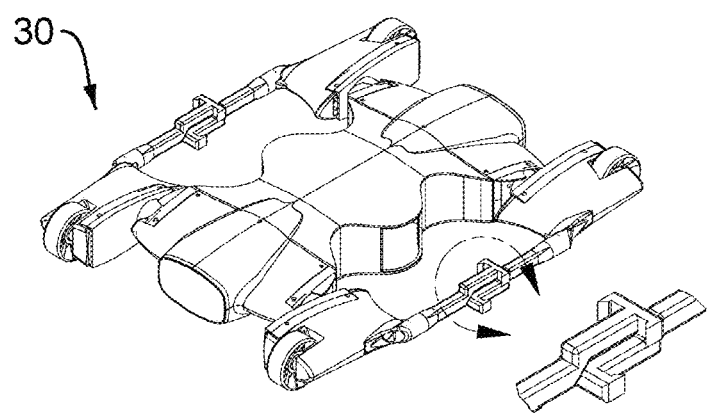
Figure 12D:
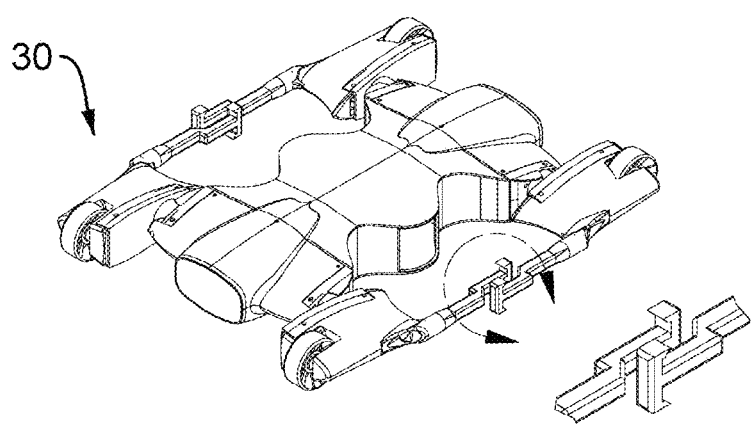

FIGS. 12A 12D illustrate isometric views of embodiments of the system 30 containing the vehicle 32 further comprising the cooperative orientation and/or positioning of the terrestrial-type active or passive locomotive devices to enhance the operability of the one or more modular thrust generating modules. In this case, the term thrust refers to how the vehicle can push itself as the tilt actuation rotates any given thrust vectoring module about its designated degree of freedom.

Figure 13A:
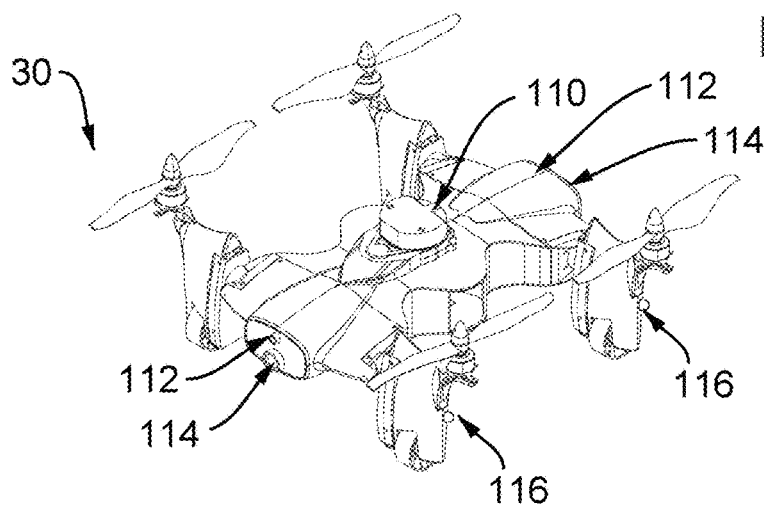
FIGS. 13A-13C illustrate embodiments showing examples of installed sensing packages dispersed throughout a vehicle system, shown with first sensing package configuration (FIG. 13A), second sensing package configuration (FIG. 13B), and third sensing package configuration (FIG. 13C)
Figure 13B:
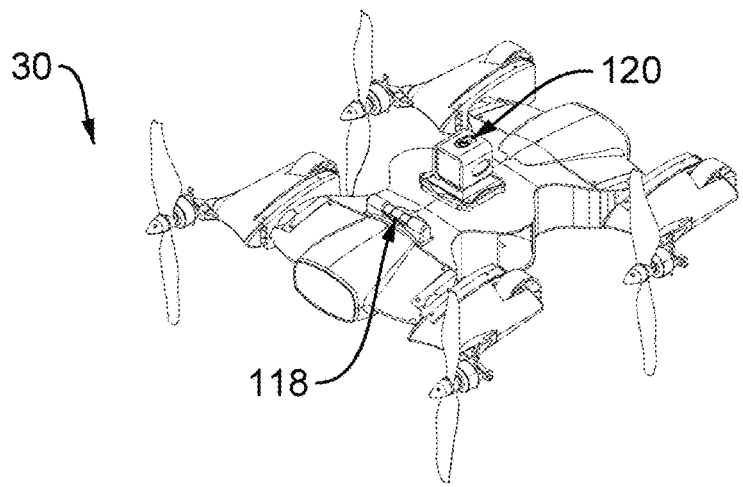
Figure 13C:
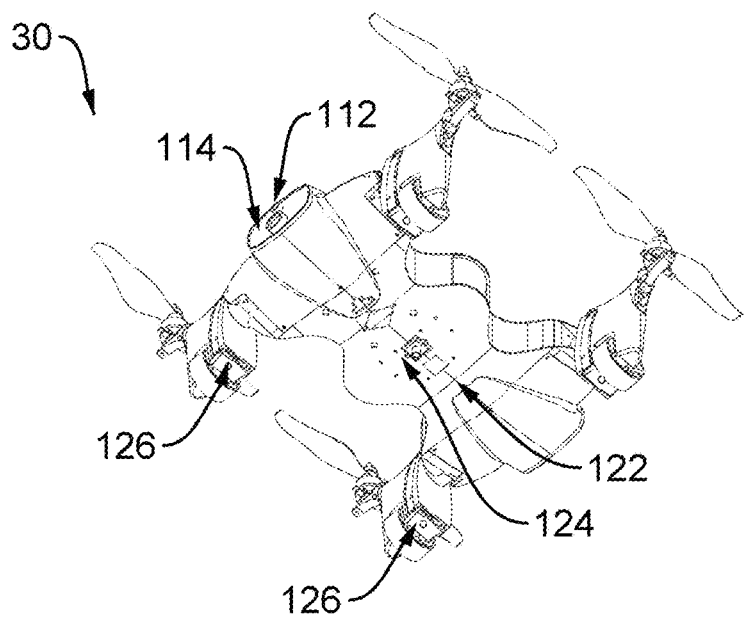

FIGS. 13A 13C illustrate isometric views of embodiments of the system 30 containing the vehicle 32 further comprising one or more sensing packages and supporting hardware placements dispersed throughout the vehicle; FIG. 13A illustrates placements for an actuated sensing package 110, for additional front and rear sensing packages 112 and additional front and rear supporting hardware 114, and for additional tilt actuated sensing packages 116, FIG. 13B illustrates placements for a surface mounted sensing package 118 and for an additional retractable sensing package 120. FIG. 13C illustrates placements for through-hole belly mounted sensing package 122 and additional supporting hardware 124 and for additional tilt actuated downward facing sensing package 126.

Figure 14A:
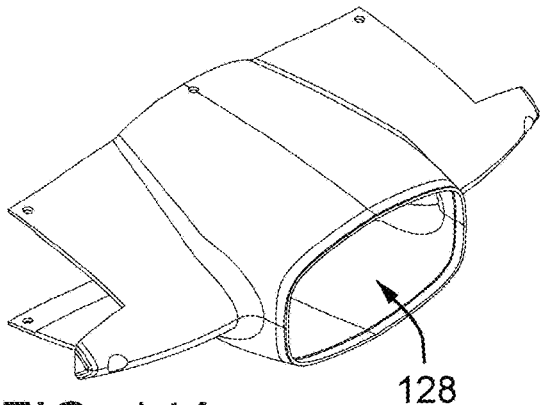
FIGS. 14A-14E illustrate exemplary body modules configured to host supporting components having various functionalities, shown with first configuration (FIG. 14A), second configuration (FIG. 14B), third configuration (FIG. 14C), fourth configuration (FIG. 14D) and fifth configuration (FIG. 14E)
Figure 14B:
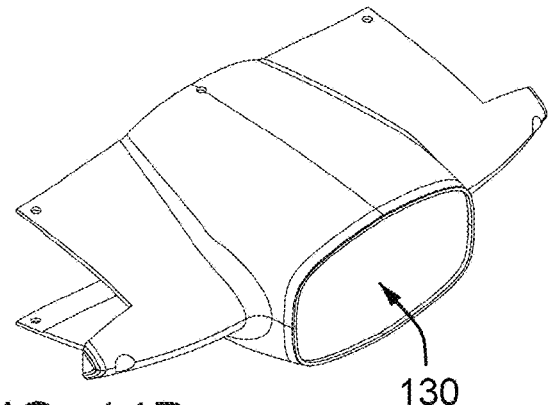
Figure 14C:
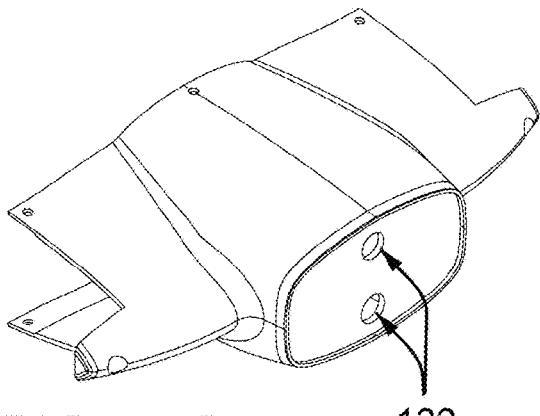
Figure 14D:
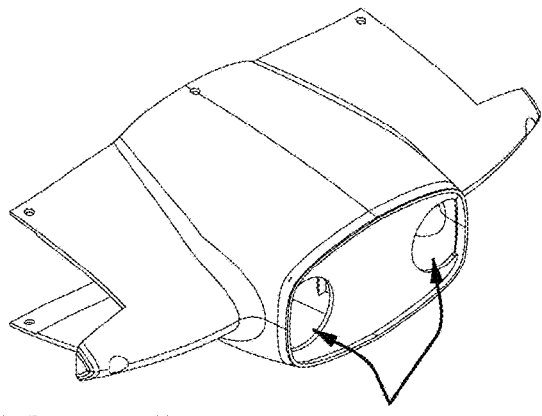
Figure 14E:
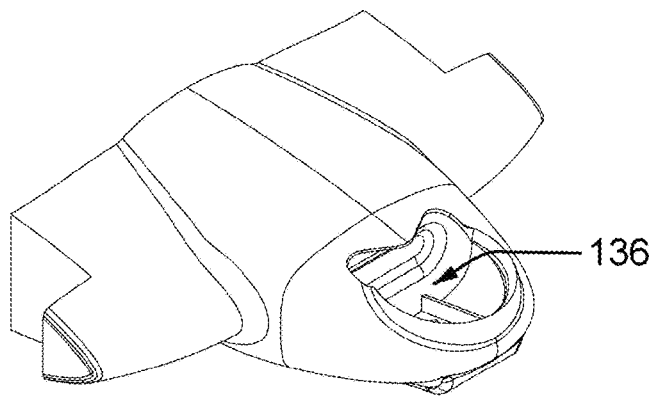

FIG. 14A 14E illustrate body modules, e.g., similar to those illustrated in FIGS. 13A 13C, configured to house one or more devices having a plurality of functionalities requiring one or more varied mounting strategies, but not limited to: open 128, enclosed 130, vertical opening(s) 132, horizontal opening(s) 134, and complex mounted 136.

Figure 15A:
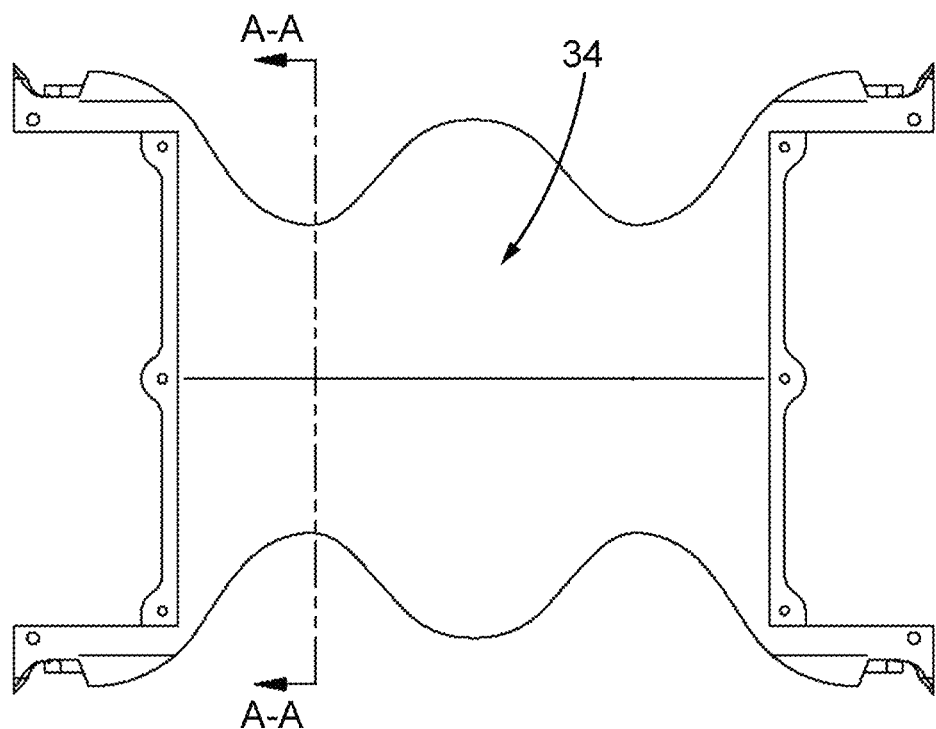
FIG. 15A illustrates a top view of one embodiment of a lifting body module with other supporting modules in isolation with a section cutout whose cut away view (FIG. 15B) illustrates the presence of structural component(s) with or without designed failure modes while additionally substantially forming internal compartment(s)
Figure 15B:
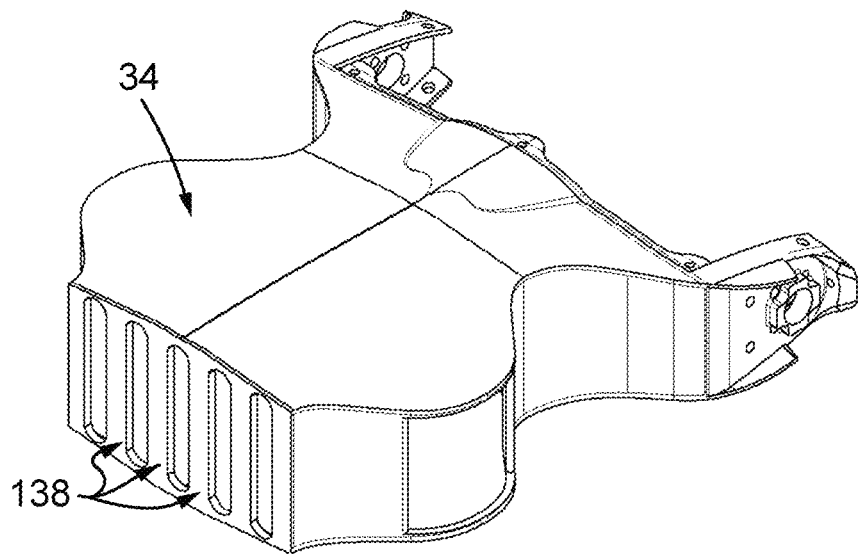

FIG. 15A illustrates a non-assembly top view of a representative lifting body module 34 with a section cutout whose cut away view (FIG. 15B) uncovers the presence of structural component(s) 138, further designating one or more internal compartmentalization strategies, with or without designed failure modes.

Figure 16A:
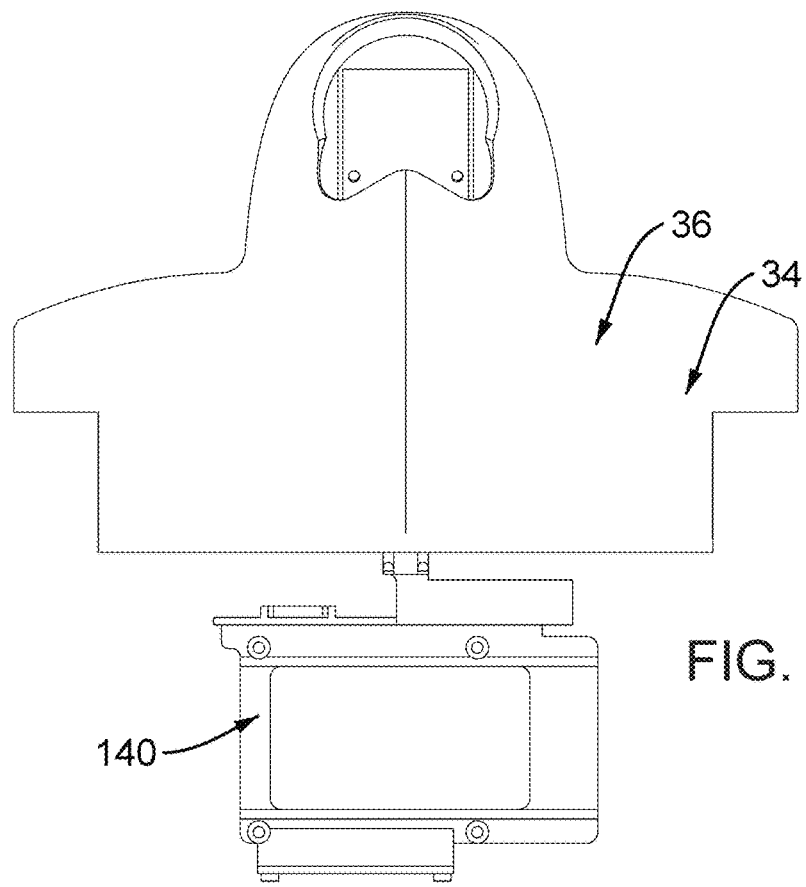
FIG. 16A illustrates a top view of one embodiment of a body module in isolation while illustrating an accompanying structure, detailed in FIGS. 16B and 16C, having accessible installation features, e.g., that may further include designed failure points.
Figure 16C:
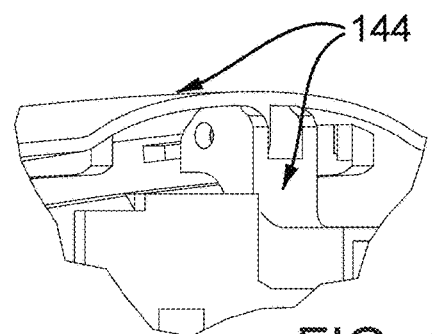
Figure 16B:
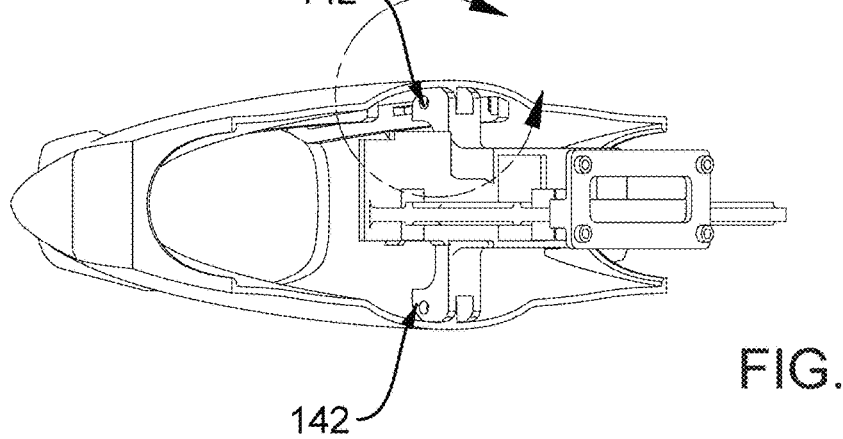

FIG. 16A illustrates a non-assembly top view of a representative interchangeable front body section (module) 36 or rear body section (module) 38 supporting a substantially internal and optionally breakaway hardware carrier 140. FIG. 16B details the overall placement and quick install system of the hardware carrier 142. FIG. 16C is a detail view of FIG. 16B illustrates one example of the designed failure mode of breakaway feature 144 that enhances the survivability of existing hardware due to adverse (designed or accidental) happenstance.

Figure 17A:
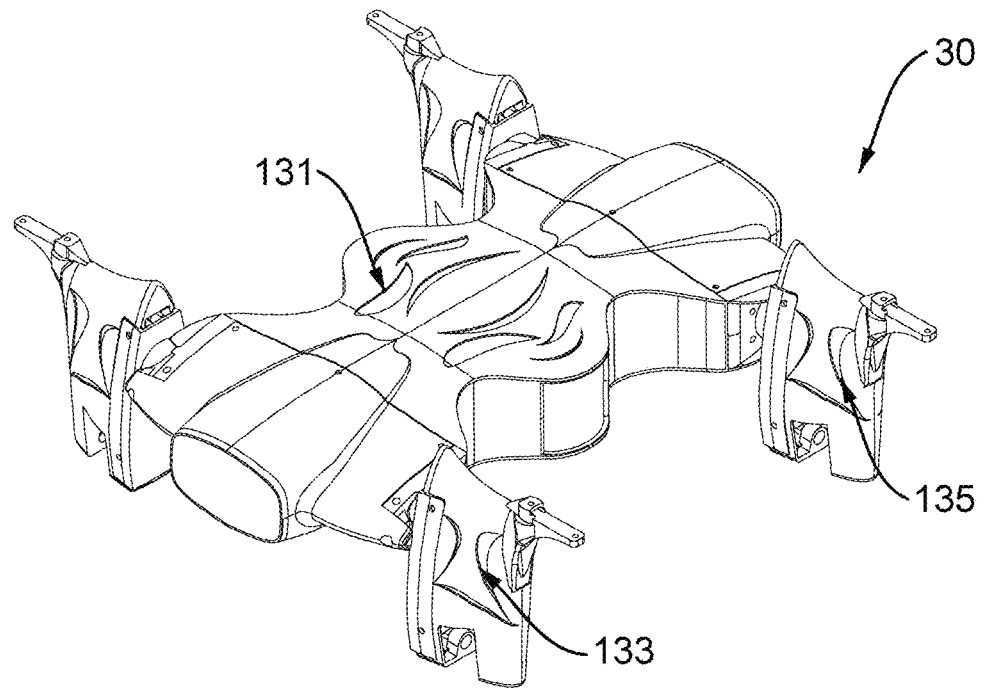
FIGS. 17A and 17B illustrate top and bottom isometric views, respectively, of embodiments of a vehicle system having imprinted features or markings.
Figure 17B:
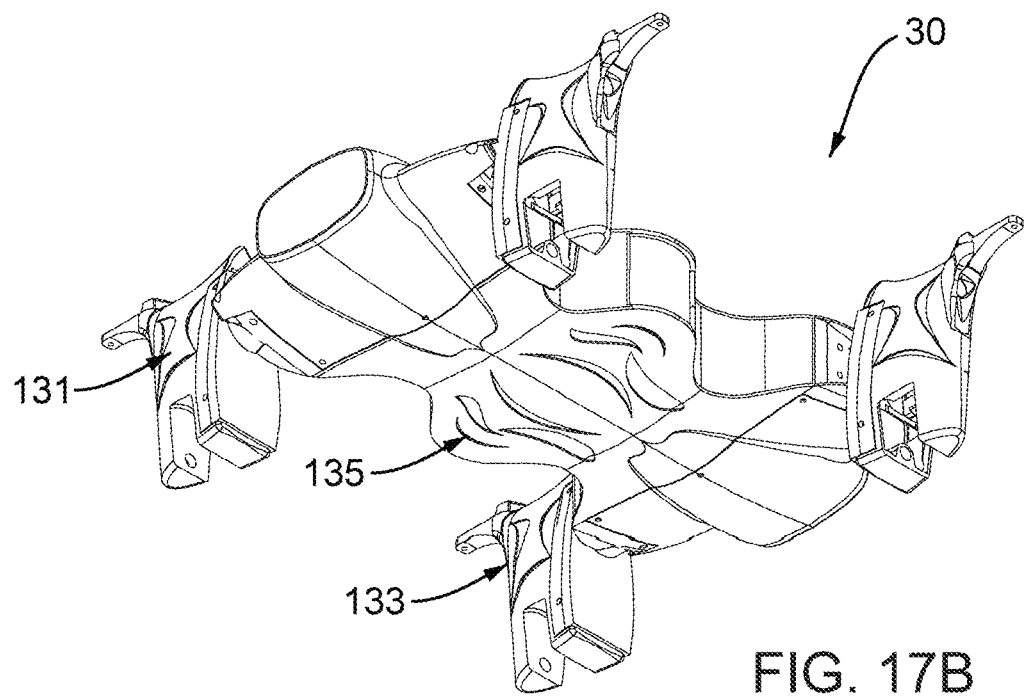

FIGS. 17A and 17B illustrate isometric top and isometric bottom views, respectively, of an embodiment of the system 30 containing the vehicle 32 further comprising preparation techniques stemming from additive manufacturing that may contain internally imprinted patterning, externally imprinted patterning, or print-through imprinted patterning, substantially inherent to the additive manufacturing design and fabrication processes, such that algorithms, including but not limited to those that are sensing-based, vision-based, tensorflow based, artificial intelligence based, or in combinatorial fashion, may identify the presence of one or more other vehicles while further identifying, for example, friend from foe, vehicle role, vehicle authenticity, vehicle configuration, vehicle status, vehicle distress, vehicle communication, vehicle authority, or combinations thereof. Such imprinted patterning may be further aided by illumination techniques as to allow daytime or nighttime recognition of such collection of patterning. Similarly, imprinted patterns installed in the environment may convey attributes or unique identification markings as to aid the vehicle in the course of its mission. Further, the imprinting may offer other passive attributes such as camouflage, marketing, visual recognition/differentiation, vehicle version distinction and so on.

Figure 18A:
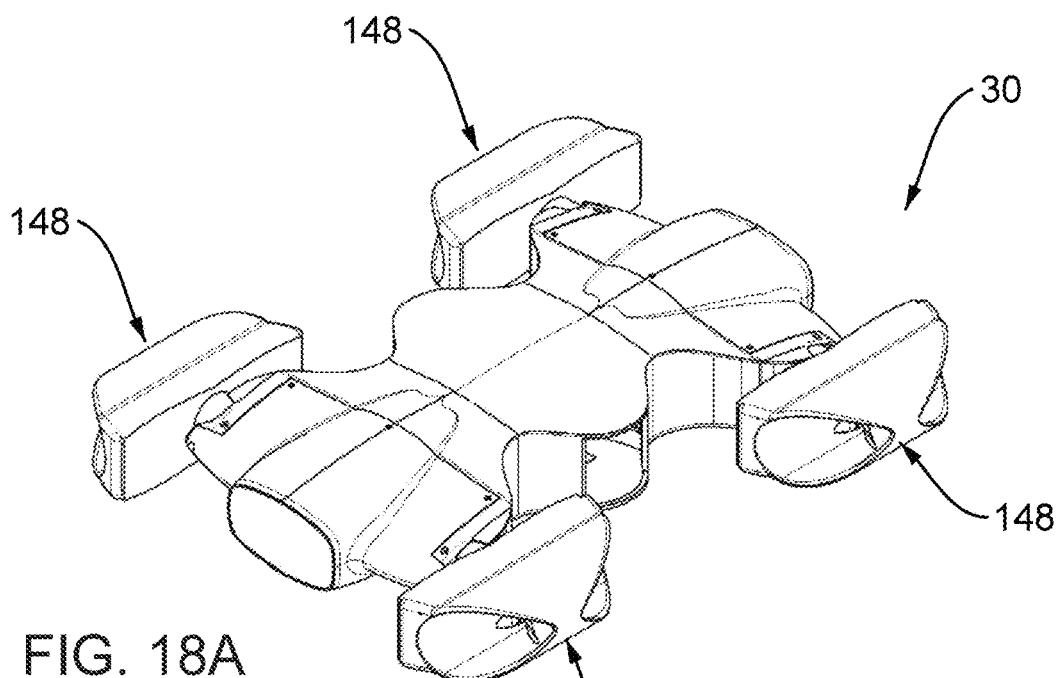
FIGS. 18A-18C illustrate isometric top (FIG. 18A), front (FIG. 18B), and side (FIG. 18C) views, respectively, of one embodiment of a vehicle system converted to non-aerial operability showing one example of multifunctionality of modular thrust vectoring modules having marine capability.
Figure 18B:
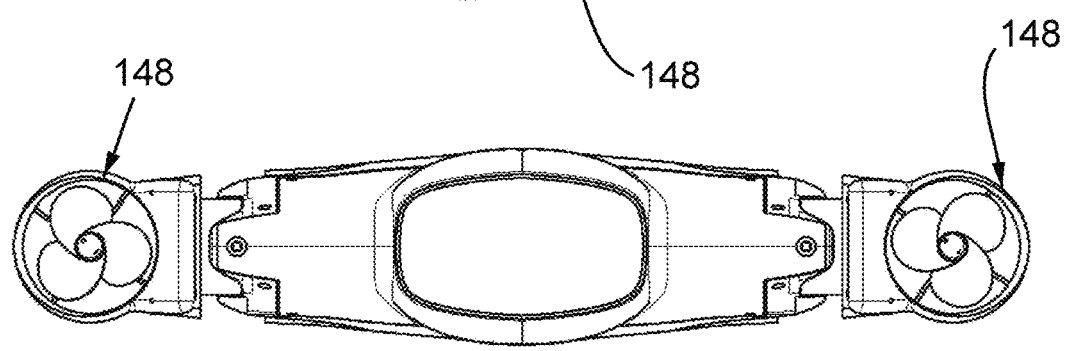
Figure 18C:
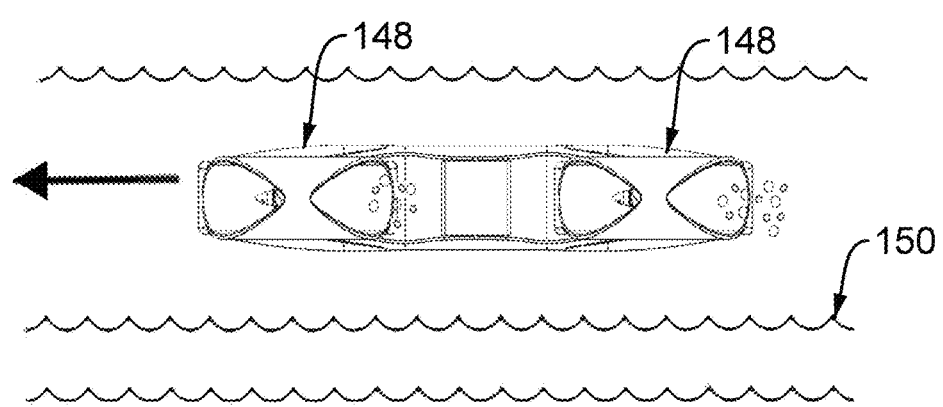

FIGS. 18A, 18B, and 18C illustrate isometric top, front and side views, respectively, of an embodiment of the system 30 containing the vehicle 32 further comprising a substantially dedicated functionality of the one or more modular marine thrust vectoring modules 148, in a hydrodynamic preparation, suitable for submerged applicability while primarily utilizing fluid accelerating locomotive mechanisms for in or on fluid 150 operations.

Figure 19A:
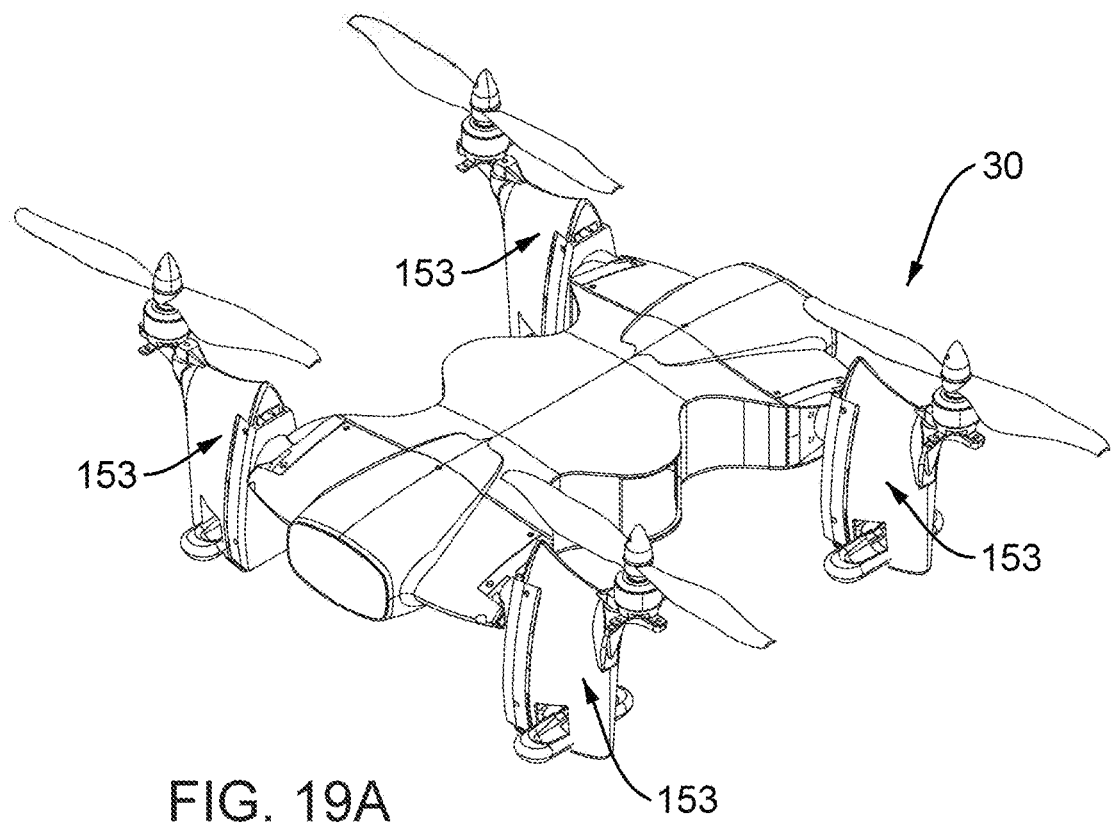
FIGS. 19A and 19B illustrate isometric top (FIG. 19A) and side (FIG. 19B) views, respectively, of one embodiment of a vehicle system converted to non-aerial operability showing one example of multifunctionality of a modular thrust vectoring modules having substantially unsubmerged or buoyant capability.
Figure 19B:
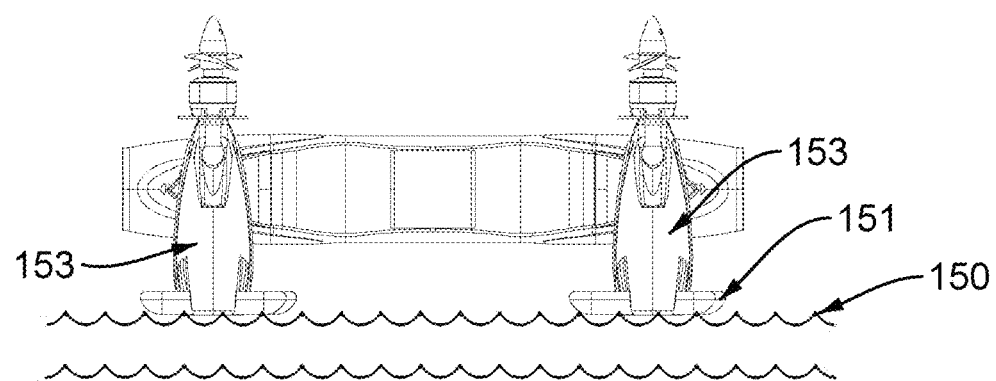

FIGS. 19A and 19B illustrate isometric top and side views, respectively, of an embodiment of the system 30 containing the vehicle 32 further comprising the multifunctionality of the one or more modular thrust vectoring modules, in a combinatorial fashion, suitable for aquatic applicability, substantially atop fluid 150, while primarily utilizing fluid accelerating locomotive mechanisms for airborne operations and auxiliary seagoing-type active or passive locomotive mechanisms.

Figure 20A:
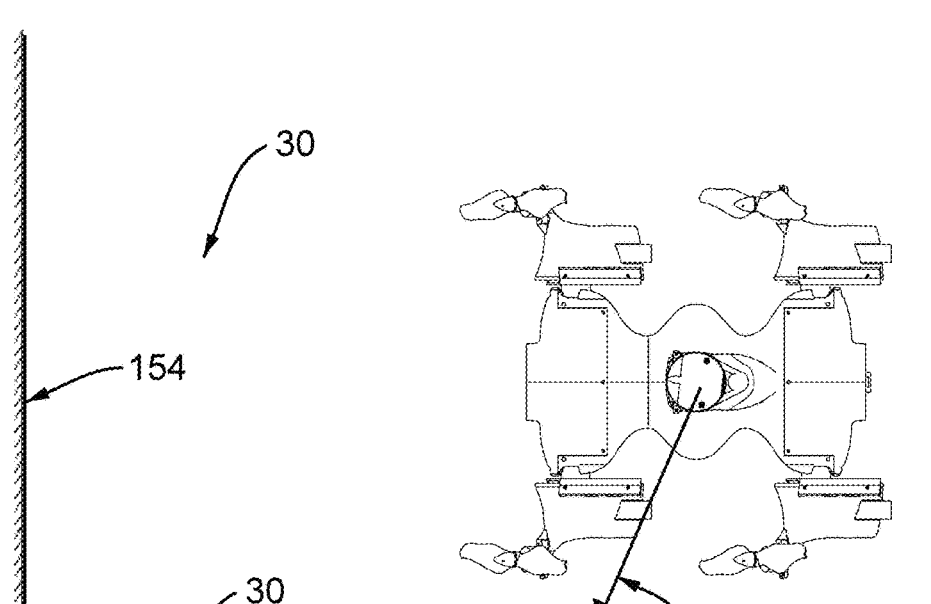
FIGS. 20A-20C illustrate a top view of one embodiment of a vehicle system utilizing substantially lateral displacement of a thrust vectoring modules in the assistance of collision avoidance response, e.g., in mostly confined spaces, shown in a first embodiment (FIG. 20A), second embodiment (FIG. 20B) and third embodiment (FIG. 20C)
Figure 20B:
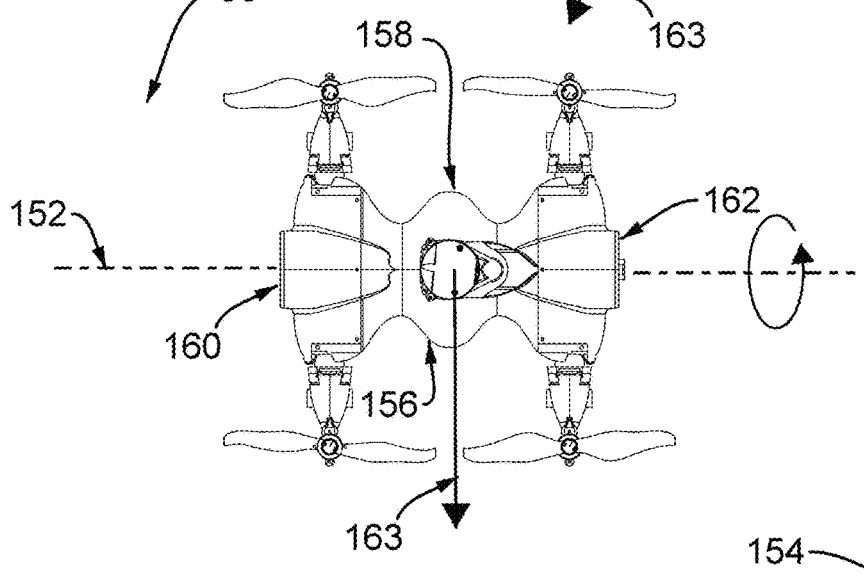
Figure 20C:
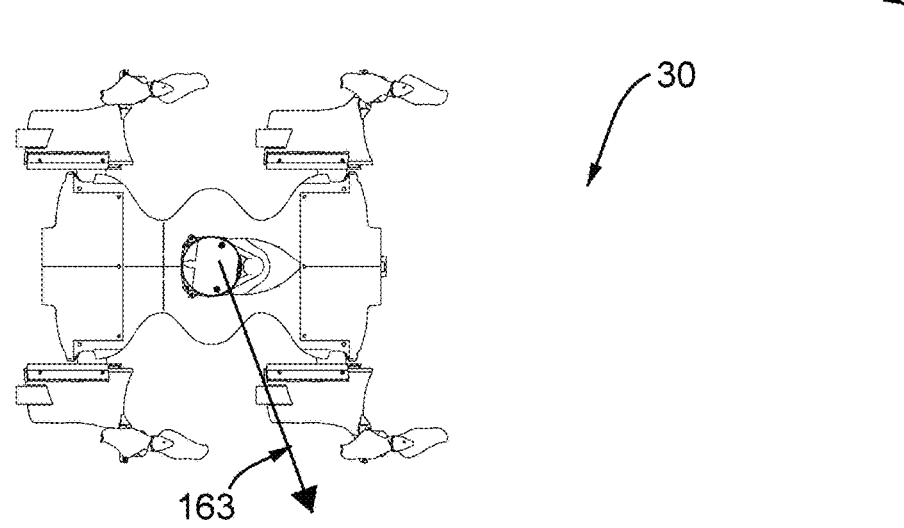

FIGS. 20A 20C illustrate mostly top views of an embodiment of the system 30 containing the vehicle 32 further comprising tilt actuation of the one or more thrust vectoring module(s) performing a substantially laterally aligned locomotion while primarily tilting the system about the chord span 152 as it is travelling in a substantially confined space. For this embodiment, the laterally aligned locomotion actuates mostly along the standard chord line. As such, due to the relative nature of the orientations offered by this invention, the front 156 and rear 158 orientations of the vehicle are defined to run mostly along the sidewalls 154 and the left 160 and right 162 orientations are defined towards either the left or right sidewalls 154. For example, to traverse the depicted space in the general direction shown by the arrows 163, the vehicle rotates about the chord span axis 152 to generate a partially forward directed force. To track the mostly centered path between the sidewalls 154, the equipped tilt actuated thrust vectoring modules, having substantially insect-like responsiveness while deployed to substantially assist in the lateral locomotive control, operates the vehicle as shown in FIGS. 20A 20C. The substantially greater lateral response of the system 30; therefore, when utilizing higher level algorithms and control strategies can quickly avoid collision with the sidewalls without having the carry-through momentum issues of traditional multirotor crafts that have to tilt away from the wall, often causing a drastic effect, especially in the presence of the wall's boundary layer and ground effects. The present disclosure minimizes or eliminates these negative effects since the tilt actuation provides a fast response and the vehicle body remains level with the surface, as observed from a front view, while traveling along the confined space, in the case of FIGS. 20A 20C.

Figure 21:
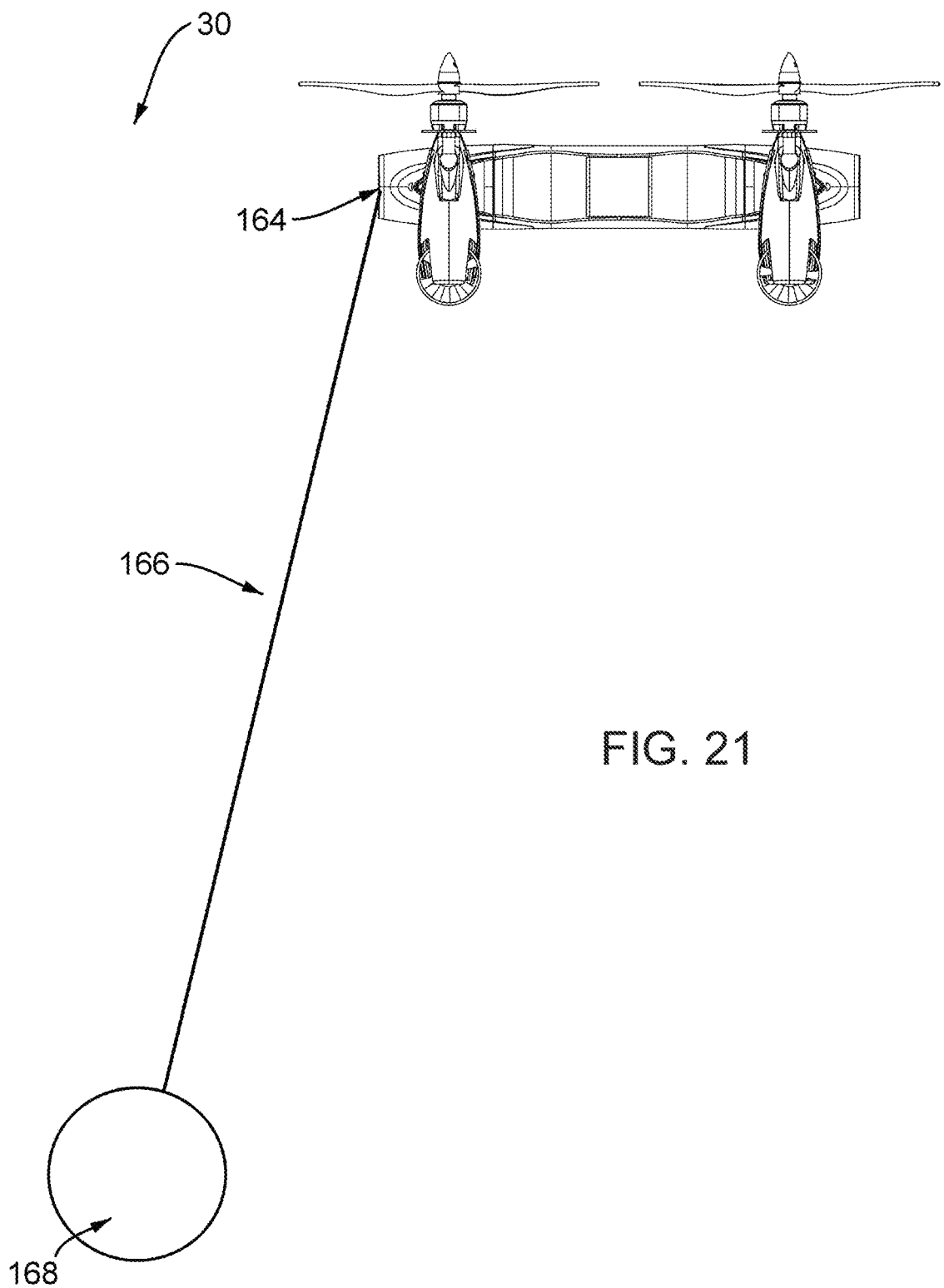
FIG. 21 illustrates one embodiment of a vehicle system utilizing a tethered system/arrangement.

FIG. 21 illustrates one embodiment of the vehicle system 30 where the vehicle 32 is connected via a tether 166 to a fixed or moving connection point 168 that may be aerial, grounded, amphibious, or marine. The tether 166 may carry, for example, electricity, fiber optics, other signal carrying components, or any combination thereof, in addition to the structural, load bearing tether structure.

A tether connection 164 may be situated on any location thereof, so that the connection 164 has the engaging capability, as well as the disengaging capability.

The tethered method of operation allows for tethered flight capability with the added benefit of disengaging the tether for on-command fly-away. Additionally, at least one or more tethers 166 may be connected to at least one or more towed objects 168 that are being transported by a carrier vehicle.

FIG. 22A illustrates an embodiment of the subject system 30 further comprising the ability to transport at least one occupant 170, whose well-being may or not be experiencing inconsistencies with life.

FIG. 22B illustrates an embodiment of the subject system 30 further comprising the ability to easily load or unload one or more occupants 170 as well as one or more generic payload(s) and/or one or more payload(s) serving any host of functions, by kneeling the subject vehicle, as additionally described in earlier figures of this disclosure, and additionally comprising one or more quick loading apparatus 176 (FIG. 22C) that may or may not substantially work in cooperation with one or more load assisting door(s) 172 and/or one or more hatch 174.

Figure 23:
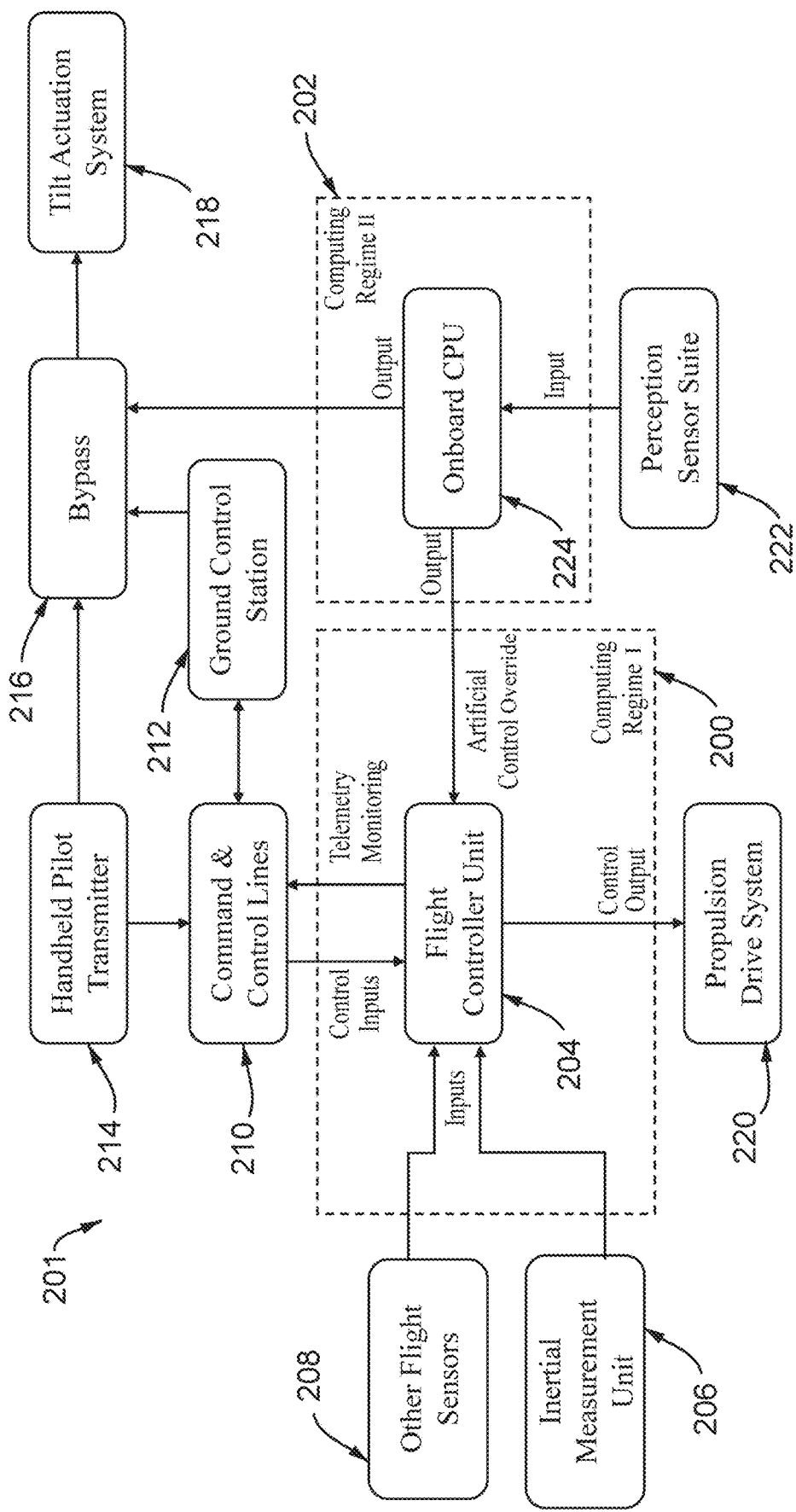
FIG. 23 illustrates a top-level functional block diagram of flightworthiness enabling system architecture embodiment of the present disclosure.

FIG. 23 illustrates a top-level functional block diagram of one embodiment of flightworthiness system architecture 201 comprised of two computing regimes: low level computing regime 200 and higher-level computing regime 202. The core (low-level) computational capacity required for stability and controls resides in the low level computing regime 200 that houses the flight controller unit 204, containing one or more cooperative algorithms (e.g. state estimator, etc.), whereby guidance sensors including one or more inertial measurement unit(s) 206 and other supporting flight sensors 208 provide inputs to the flight controller 204. The inertial measurement unit (IMU) 206, may include, but are not limited to accelerometer, magnetometer, gyroscope(s), compass, barometer, or combinations thereof. Further the flight controller 204 may have its own IMU sensor package either for primary or auxiliary (failsafe) operations.

The other flight sensors 208 typically pertaining to change detection, seeking, and/or tracking of the external environment information, may include, but are not limited to, global positioning sensors (e.g. GPS, etc.), local positioning sensors (e.g. optical flow, etc.), range finder (e.g. lidar, etc.), or in combinations thereof. Further, one or more command and control (C&C) lines 210 may communicate with the flight controller unit 204 wirelessly whereby control commands are transmitted remotely to the respective onboard receiver (s). The command and control line 210 block positioned to simplify the overall block diagram and generally indicates that the remote command and control of the flightworthiness system architecture 201 is achievable from more than one source. As such, the command and control line 210 block also generally depicts the directional nature of the signals whereby inputs to the flight controller unit 204 are typically control inputs and signals emitted from the flight controller unit 204 are substantially for telemetry monitoring. Further, the command and control line 210 block also generally depicts the presence of a wireless communication system handling the sending and receiving of signals.

The command and control lines 210 may be generated from either one or more hand-held pilot transmitter(s) 214 or one or more ground control station(s) (GCS) 212. Further, the system 30 does not require the presence of a laptop-based GCS and does not require telemetry feedback. In full autonomous mode, both handheld pilot transmitter 214 and GCS 212 may be disabled or not installed as part of the architecture.

The flight controller unit 204 has direct or switchable control authority of the propulsion drive system 220 that may include, but is not limited to, electronic speed controller and motors.

The core (higher-level) computational capacity required for conditional (e.g. sense and avoid, etc.), high autonomy (sense and navigate, etc.) and/or full autonomy (navigate and prioritize) resides in the higher level computing regime 202, containing one or more cooperative algorithms (odometry, mapping, etc), houses one or more central processing unit (CPU) 224, with or without graphics processing unit (GPU) capability substantially supported by a perception sensor suite 222 that may include, but is not limited to, stereo camera, monocular camera, compound camera, radar, sonar, lidar (rotating or fixed), thermal, and so on. For example, trained artificial intelligence (AI) algorithms running in the onboard CPU 224 while searching for signs of life or movement in the viewing frame of an equipped camera may guide the controller to autonomously fly towards a location of interest.

Bypass 216 is a junction where controls of the tilt actuation system may be optionally shared by the handheld pilot transmitter 214, GCS 212, or onboard CPU 224. Given the presence of a robust flight controller unit 204, the controls of the tilt actuation of the system 30 via the available tilt actuated thrust vectors, as described in numerous prior figures, may occur mimicking a momentary or sustained perturbation to the flight controller 204, or more generalized, to the flightworthiness system architecture 201. The result is that the system 30 either tilts its body angle of attack to counteract the externally commanded tilt of one or more thrust vectoring modules (as substantially discussed in FIGS. 2A 2H) or holds a commanded body angle of attack while allowing the tilt of the one or more thrust vectoring modules to substantially propel the vehicle in some fashion (as substantially discussed in FIGS. 3A and 3B, FIGS. 4D-AE, FIG. 6, and FIGS. 7A and 7B). Further, the bypass 216 can exist inside of the flight controller unit 204, physically connected to it, whereby tilt actuation commands may or may not be further conditioned/altered by the flight controller unit 204 itself; however, the flight controller unit 204, regardless of altering the signal or not, may sense the presence of the commanded input to tilt the vehicle such that its own controls laws may adapt to the commanded change in orientation.

Further, intelligent robotics behavior, possibly leveraging the system's 30 broad flight envelope is substantially performed at the higher-level computing regime 202. For example, a rotating lidar may be used to map a cave, but given the lidar's limited field of view, the system 30 may be flow at a 35 degree nose up orientation. The tilt of the system 30 would allow the rotating lidar to simultaneously map the ceiling of the cave, the sides walls of the cave, and the floor of the case. Furthermore, knowledge/sensing of the environment as far as obstacles hanging down (stalactites) would allow obstacle avoidance algorithms to artificially override piloted controls or autonomously avoid the obstacle(s). Further, by tilting the vehicle as described in the above example, a redundant sensor just to track the ceiling features is not needed.

Figure 24:
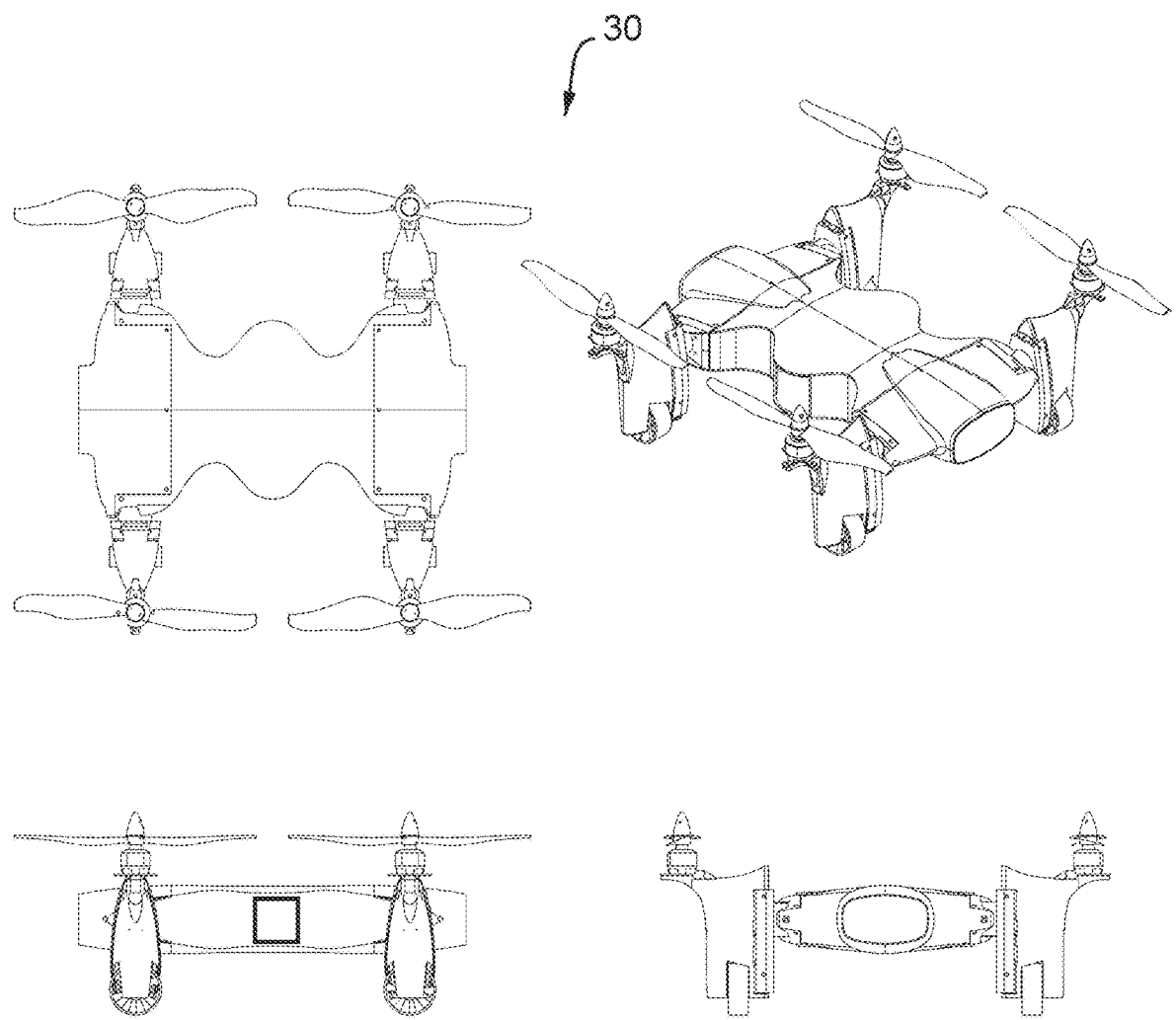
FIG. 24 illustrates one embodiment of a vehicle.

FIG. 24 illustrates views of one embodiment of the system 30.

Figure 25:
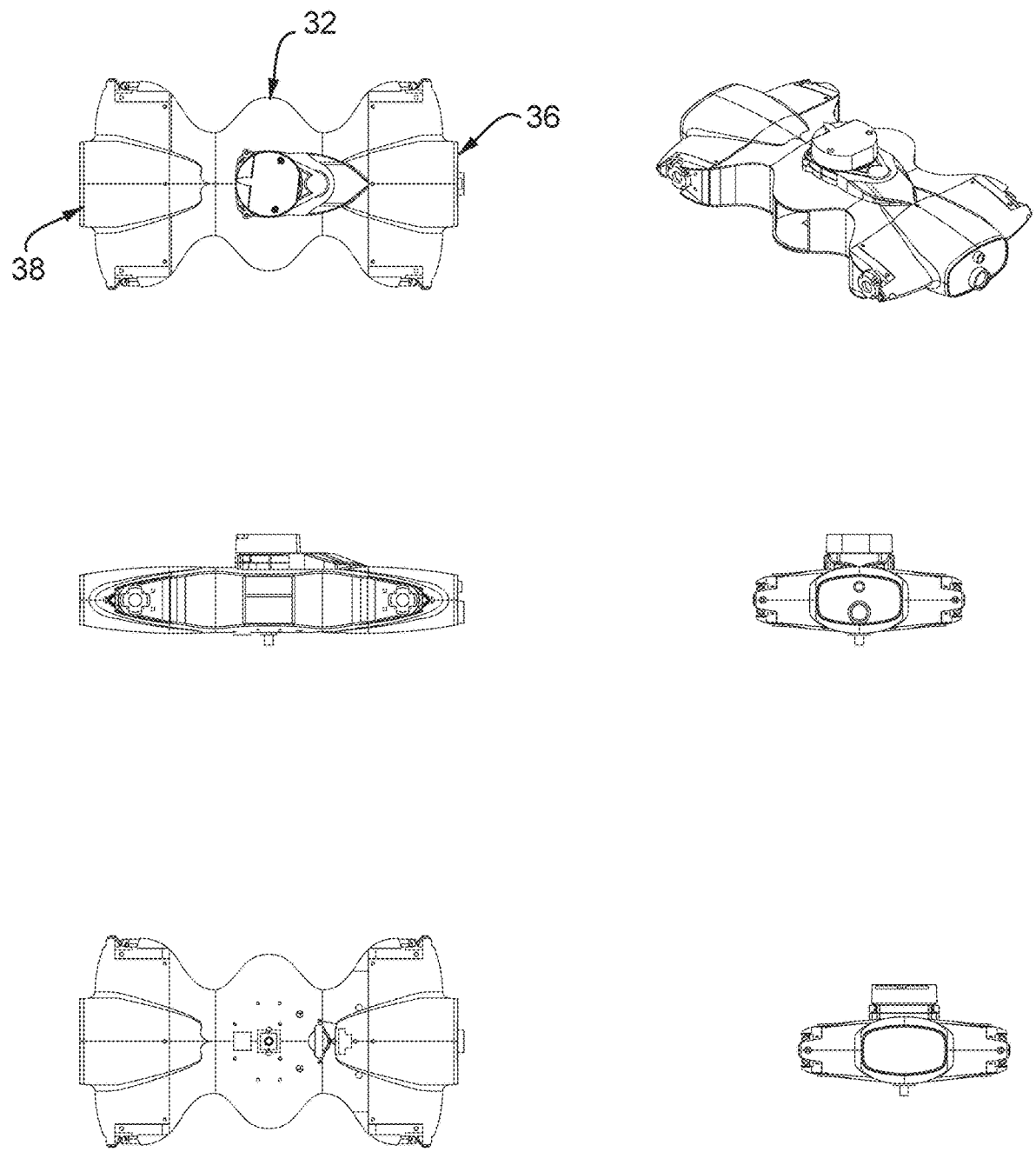
FIG. 25 illustrates one embodiment of a main body section.

FIG. 25. illustrates various view perspectives of an embodiment of the vehicle lifting body 32 further containing the front body section 36 and the rear body section 34.

It is further noted that attitudes and/or orientations are further possible given the styles of actuation, propulsive devices, and mechanisms having additional degrees of freedom, in a combinatorial fashion, while not departing from the spirit or scope of this invention. As such the vehicle retains the ability to translate in all directions and generate body moments (typically called roll, pitch, and yaw in Aerospace Engineering terms) about all vehicle axes, in a singular or combinatorial fashion, to create the generalized stability and controls needed for the operation worthiness in the various operational domains while each domain having various environmental impacts to the system 30 for all discussed embodiments and all of the various embodiments having additional forms and variations within the spirit or scope of the invention.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

We claim:

1. A system of play vehicle platform comprising:
a flight controller;
a lifting body; and
a plurality of thrust vectoring modules coupled to the lifting body, wherein
each of the plurality of thrust vectoring modules comprises a propulsive device controlled by the flight controller and configured to perform thrust vectoring of the lifting body,
each of the plurality of thrust vectoring modules, controlled by the flight controller, is configured to tilt in at least one axis,
at least one of the plurality of thrust vectoring modules is dynamically controlled by the flight controller to manipulate said vehicle platform's angle of attack during a flight, while gradually flipping said vehicle platform during the flight, such that said vehicle platform inverts during the flight,
said system of play vehicle platform acts, as a whole, as a pan and/or tilt system, and
said system of play vehicle platform is configured to maneuver as an airborne gimbal during hovering modes, non-hovering modes, transitioning from hovering mode to non-hovering modes, and transitioning from non-hovering modes to hovering modes while retaining the ability of holding the orientation of said vehicle platform at any point on the maneuver or sequence of maneuvers.

2. The system of play vehicle platform of claim 1, wherein
at least one of the plurality of thrust vectoring modules is dynamically controlled by the flight controller to manipulate said vehicle platform's angle of attack along an arcuate path during a translational flight operation, and gradually flip said vehicle platform during a hovering flight operation or translational flight operation.

3. The system of play vehicle platform of claim 1, wherein
each of the plurality of thrust vectoring modules comprises a locomotive enabling device, and
the locomotive enabling device is configured to interact with a landing surface.

4. The system of play vehicle platform of claim 1, wherein
modes of operation affected by at least one of the thrust vectoring modules include at least one of the following: short take-off, short landing, horizontally oriented body vertical take-off, horizontally oriented body vertical landing, horizontally oriented body up-side-down vertical take-off, horizontally oriented body up-side-down vertical landing, externally assisted take-off, externally assisted landing, vertically oriented body with nose up vertical take-off, vertically oriented body with nose down vertical take-off, vertically oriented body with nose up vertical landing, vertically oriented body with nose down vertical landing, and
wherein the propulsive device comprises a first propulsive device and a second propulsive device each controlled by the flight controller to operate in a counter rotation regime relative to each other, thus generating airflows over the lifting body having opposing vorticity flow fields.

5. The system of play vehicle platform of claim 1, wherein
at least one of the plurality of thrust vectoring modules is configured to steer said vehicle platform during non-airborne operations and to tilt said vehicle platform during non-airborne operations, thereby manipulating ride height of said vehicle platform with reference to a landing surface.

6. The system of play vehicle platform of claim 1,
wherein at least one of the thrust vectoring modules is configured to control roll, pitch, and yaw moments of said vehicle platform, and
wherein at least one of the thrust vectoring modules is configured to control one dimension, two dimension, or three dimension translation of said vehicle platform.

7. The system of play vehicle platform of claim 1,
wherein the at least one thrust vectoring module comprises a compartment defined therein, the compartment configured to house a component, and
wherein the component is one or more components selected from a group consisting of avionics system, sensors system, weapon system, navigation and guidance system, communication system, power system, energy storage unit, payload system, payload, propulsion system, fuel cell, landing gear system, docking system, tether system, flight assist system, collision avoidance system, deceleration system, flight termination system, ballast system, buoyancy system, mechanical systems, and electronics, and wherein at least one breakaway hardware carrier is configured to provide quick installation, and component protection via a designed structural failure mode.

8. The system of play vehicle platform of claim 1, wherein
the vehicle body comprises an interchangeable front body section and rear body section,
at least one of the interchangeable front body section and rear body section is configured to house components selected from a group consisting of avionics system, sensors system, weapon system, navigation and guidance system, communication system, power system, energy storage unit, payload system, payload, propulsion system, fuel cell, landing gear system, docking system, tether system, flight assist system, collision avoidance system, deceleration system, flight termination system, ballast system, buoyancy system, mechanical systems, and electronics, and wherein at least one breakaway hardware carrier is configured to provide quick installation, and component protection via a designed structural failure mode, and the interchangeable front body section and rear body section are both removable and modular sections.

9. The system of play vehicle platform of claim 1, wherein at least one of the thrust vectoring modules is dynamically controlled by the flight controller to manipulate said vehicle platform's angle of attack about an internal point of rotation during hovering flight operation.

10. The system of play vehicle platform of claim 1, wherein the vehicle body, the thrust vectoring modules, and the propulsive devices are configured to have modular or interchangeable relationship with each other.

11. A method of operating a system of play vehicle platform, said method comprising:

controlling thrust vectoring of an aerodynamic contoured lifting body with a plurality of propulsive devices;

coupling a plurality of thrust vectoring modules to the lifting body; and manipulating the lifting body to tilt along one or more axes by controlling the plurality of thrust vectoring modules, wherein each of the plurality of thrust vectoring modules comprises a propulsive device controlled by a flight controller and configured to perform thrust vectoring of the lifting body, during a launch operation, controlling at least one of the thrust vectoring modules to launch said vehicle platform from an upward or downward facing launch position, and during a landing operation, controlling at least one of the thrust vectoring modules to return said vehicle platform following the launch to a position inverted from the launch position.

12. The method of operating a system of play vehicle platform according to claim 11, wherein said vehicle platform is configured to perform three dimensional operations in air or in a fluid, and said vehicle platform is further configured to operate in hover flight with or without functionality to preset a desired body angle of attack, or vertical flight with or without functionality of dynamically manipulating body angle of attack, or hover flight with or without functionality of dynamically manipulating body angle of attack, or on-station airborne flight with or without operating in a combined arc path with body rotation, or hovering flight over a set location with or without functionality of manipulating body angles, or forward flight with and without power consumption preservation via aerodynamic lift generation, or short take-off, or short landing, or vertical take-off, or in combinations thereof.

13. The method of operating a system of play vehicle platform according to claim 11, wherein the landing position comprises a vertical body section posture approximately vertical in orientation with respect to a landing surface, or wherein the landing position comprises a horizontal body section posture approximately parallel in orientation with respect to the landing surface.

14. The method of operating a system of play vehicle platfom according to claim 11, further comprising:

coupling a first subset or all of the thrust vectoring modules configured to interchangeably swap with a second subset or full set of modular propulsive cooperating modules suitable for non-aerial multi-orientational operability or multi-terrain operability.

15. The method of operating a system of play vehicle platform according to claim 11, further comprising:

coupling a first subset or all of the plurality of thrust vectoring modules further configured to expand airborne operability with other environments such as in terrestrial, subterranean, marine, and submersed domains.

16. The method of operating a system of play vehicle platform according to claim 11, further comprising:

attaching a CPU comprising an on-board higher-level algorithm to said vehicle platform, wherein the on-board higher-level algorithm is configured to assist in partial or full autonomous operation of said vehicle platform in-flight, in a fluid medium, on a fluid medium, or on terrain.

17. The method of operating a system of play vehicle platform according to claim 11, further comprising:

configuring the at least one thrust vectoring module and body section with at least one component internally or externally mounted, and wherein the at least one component is selected from the group consisting of: people, payload, weaponization, non-kinetic attack systems, counter measures system, communication system, guidance and navigation system, flight sensors, perception sensors, higher level computing suite with or without artificial intelligence, mission-specific hardware, propulsion system, energy storage system, ballast system, sensing system, suspension system, braking system, dampening system, airbag, parachute, deceleration apparatus, drive apparatus, steering apparatus, vibration apparatus, landing gear apparatus, charging apparatus, discharging apparatus, electromagnet device, flight assisting device, locomotion assisting device, multi-terrain device, maneuvering assisting device, docking apparatus with or without electrical connectivity to a respective docking base, anchoring device, gripping device, grappling device, clawing device, floating device, retrieving device, and capturing device.

18. The method of operating a system of play vehicle platform according to claim 11, further comprising:

coupling a higher-level computing system to a flightworthiness system of said vehicle platform wherein a core computational capacity and a high-level computing regime work collaboratively on-board of said vehicle platform.

19. The method of operating a system of play vehicle platform according to claim 11, wherein at least one of the thrust vectoring modules is dynamically controlled to manipulate said vehicle platform's angle of attack about an internal point of rotation during hovering flight operation.

20. The method of operating a system of play vehicle platform according to claim 11, wherein at least one of the thrust vectoring modules is dynamically controlled to manipulate said vehicle platform's angle of attack along an arcuate path during a translational flight operation, and gradually flip said vehicle platform during a hovering flight operation or translational flight operation.

21. The system of play vehicle platform of claim 1, wherein said system of play vehicle platform does not include independent gimbal actuation for sensors/hardware.

22. The system of play vehicle platform of claim 1, further comprising sensors/hardware mounted directly to the lifting body, wherein the sensors/hardware are inherent to the operability of the system of play vehicle platform.

23. The system of play vehicle platform of claim 1, wherein the pan and/or tilt function enables the lifting body to automatically re-orient itself to regain stability.

24. The system of play vehicle platform of claim 1, wherein:
   the flight controller or higher-level computational package comprises a sensory package, and
   the sensory package is configured to reorient via the pan and/or tilt operation of the lifting body, from an upward facing position to a downward facing position.

25. The system of play vehicle platform of claim 1, wherein said system of play vehicle platform is configured to allow simply affixed hardware to be mounted, wherein
   the said system of play vehicle platform can be reconfigured by directly swapping out the simply affixed hardware, or
   wherein the said system of play vehicle platform can be reconfigured by directly swapping out structural or non-structural components of the system of play vehicle platform to enable reconfiguration, refit, or retrofit of the newly desired simply affixed hardware or hardware package.

26. The system-of-play vehicle platform of claim 1, wherein
   said system of play vehicle platform acts, as a whole, as pan and/or tilt system for sensing/perceiving a surrounding environment and/or manipulating the lifting body.

27. The system-of-play vehicle platform of claim 1, wherein
   said system of play vehicle platform acts, as a whole, as pan and/or tilt system for interacting with a surrounding environment and/or manipulating a surrounding environment.

* * * * *